(12) United States Patent
Fleischhacker et al.

(10) Patent No.: US 12,172,565 B2
(45) Date of Patent: Dec. 24, 2024

(54) FOLD-OUT TRANSPORTABLE PARTIAL OR COMPLETE ENCLOSURE

(71) Applicant: AWOL Outdoors, Inc., Somerset, WI (US)

(72) Inventors: Kevin Fleischhacker, Mound, MN (US); Cedar Vandergon, New Brighton, MN (US)

(73) Assignee: AWOL Outdoors, Inc., Eden Prairie, MN (US)

( * ) Notice: Subject to any disclaimer, the term of this patent is extended or adjusted under 35 U.S.C. 154(b) by 176 days.

(21) Appl. No.: 17/826,740

(22) Filed: May 27, 2022

(65) Prior Publication Data
US 2023/0115999 A1 Apr. 13, 2023

Related U.S. Application Data

(63) Continuation of application No. 16/136,581, filed on Sep. 20, 2018, now Pat. No. 11,345,270, which is a
(Continued)

(51) Int. Cl.
*B60P 3/34* (2006.01)
*B60P 3/42* (2006.01)
(Continued)

(52) U.S. Cl.
CPC .................... *B60P 3/34* (2013.01); *B60P 3/42* (2013.01); *B62D 63/061* (2013.01); *B60S 9/02* (2013.01)

(58) Field of Classification Search
None
See application file for complete search history.

(56) References Cited

U.S. PATENT DOCUMENTS

| 243,216 A | 6/1881 | Conner |
| 1,216,986 A | 2/1917 | Habig |

(Continued)

FOREIGN PATENT DOCUMENTS

| CH | 635393 A5 | 3/1983 |
| DE | 3824142 A1 | 1/1990 |
| EP | 0007580 A1 | 2/1980 |
| EP | 0040108 A1 | 11/1981 |
| FR | 2944239 A1 | 10/2010 |

(Continued)

OTHER PUBLICATIONS

Photographs of awnings identified "A"-"K" made by Canvas Craft, Inc. of Otsego, MN prior to Dec. 1, 2016.
(Continued)

*Primary Examiner* — Joseph D. Pape
(74) *Attorney, Agent, or Firm* — Steven M. Koehler; Westman, Champlin & Koehler, P.A.

(57) ABSTRACT

A transportable fold-out at least partial enclosure includes in one aspect of the invention a stationary platform having a major surface defining a stationary plane, a plurality of side edges, a front edge and a back edge. A primary platform has a major surface defining a primary plane, an inside edge, an outside edge, a front edge, a back edge, the inside edge being joined to the stationary platform, the primary platform having a folded position in which the primary plane and stationary plane are oblique or orthogonal, and the primary platform having an extended position where the primary platform is unfolded from the stationary platform. An end wall assembly has at least two segments, each segment having a major surface defining a segment plane, side edges, a top edge and a bottom edge, the side edges of the segments being joined to each other, the bottom edges of each segment being joined to one of the stationary platform and the primary platform. The end wall assembly has an extended position in which the segment planes are at an angle to form a wall to both the stationary plane and the primary plane, and
(Continued)

the end wall assembly having a folded position. At least one actuating mechanism is joined to at least one of the segments and the stationary platform or the primary platform to which said at least one of the segments is joined, said at least one actuating mechanism configured to provide a force to urge said at least one of the segments to the extended position.

14 Claims, 53 Drawing Sheets

Related U.S. Application Data continuation of application No. PCT/US2017/023251, filed on Mar. 20, 2017.

(60) Provisional application No. 62/429,075, filed on Dec. 2, 2016, provisional application No. 62/373,124, filed on Aug. 10, 2016, provisional application No. 62/310,727, filed on Mar. 20, 2016.

(51) Int. Cl.
*B62D 63/06* (2006.01)
*B60S 9/02* (2006.01)

(56) References Cited

U.S. PATENT DOCUMENTS

| | | |
|---|---|---|
| 1,276,388 A | 8/1918 | Marx |
| 1,560,802 A | 11/1925 | Julstedt |
| 1,564,257 A | 12/1925 | Lippman |
| 1,568,895 A | 1/1926 | Lyons |
| 1,595,541 A | 8/1926 | Borah |
| 1,596,924 A | 8/1926 | Curtis |
| 2,589,602 A | 3/1952 | Clark |
| 2,923,305 A | 2/1960 | Cline |
| 2,939,691 A | 6/1960 | Lewis |
| 2,986,150 A | 5/1961 | William |
| 3,198,486 A | 8/1965 | Allen |
| 3,200,545 A | 8/1965 | Bunge |
| 3,239,274 A | 3/1966 | Weiss |
| 3,288,520 A | 11/1966 | Krutzikowsky |
| 3,343,866 A | 9/1967 | Massey |
| 3,371,954 A | 3/1968 | Larsson |
| 3,375,035 A | 3/1968 | Schultz |
| 3,394,961 A | 7/1968 | Matte |
| 3,516,708 A | 6/1970 | Cox |
| 3,556,581 A | 1/1971 | Da Silva |
| 3,558,181 A | 1/1971 | Peterson |
| 3,560,042 A | 2/1971 | McCarthy |
| 3,652,122 A | 3/1972 | Beauregard |
| 3,670,747 A | 6/1972 | Pohl |
| 3,698,734 A | 10/1972 | Drake |
| 3,715,141 A | 2/1973 | Cary |
| 3,744,191 A | 7/1973 | Bird |
| 3,768,855 A | 10/1973 | Laue |
| 3,811,454 A | 5/1974 | Huddle |
| 3,875,623 A | 4/1975 | Johnston |
| 3,970,096 A | 7/1976 | Nicolai |
| D243,216 S | 2/1977 | Elsby |
| 4,034,772 A | 7/1977 | Huddle |
| 4,067,347 A | 1/1978 | Lipinski |
| 4,102,352 A | 7/1978 | Kirkham |
| 4,119,224 A | 10/1978 | Moody |
| 4,165,117 A | 8/1979 | Kasier |
| 4,201,359 A | 5/1980 | Baslow |
| 4,221,398 A | 9/1980 | Pautrat |
| 4,240,677 A | 12/1980 | Payne |
| 4,268,066 A | 5/1981 | Davis |
| 4,358,133 A | 11/1982 | Stucky |
| 4,452,294 A | 6/1984 | Fukuchi |
| 4,531,847 A | 7/1985 | F'Geppert |
| 4,577,876 A | 3/1986 | Harris |
| 4,719,934 A | 1/1988 | Mydans |
| 4,772,038 A | 9/1988 | MacDonald |
| 4,817,655 A | 4/1989 | Brooks |
| 4,826,235 A | 5/1989 | Zwick |
| 4,878,322 A | 11/1989 | Ikeda |
| 4,942,895 A | 7/1990 | Lynch |
| D310,806 S | 9/1990 | Hertzberg et al. |
| D311,165 S | 10/1990 | Moore |
| 4,976,074 A | 12/1990 | Delamare |
| D318,446 S | 7/1991 | Magyar et al. |
| 5,080,423 A | 1/1992 | Merlot et al. |
| 5,107,881 A | 4/1992 | Feldman |
| D327,463 S | 6/1992 | Williams |
| 5,118,245 A | 6/1992 | Dunkel |
| D333,289 S | 2/1993 | Shirlin et al. |
| 5,234,011 A | 8/1993 | Lynch |
| 5,477,876 A | 12/1995 | Moss |
| 5,487,692 A | 1/1996 | Mowrer |
| 5,490,656 A | 2/1996 | Frisby |
| 5,526,610 A | 6/1996 | Delamare |
| 5,575,492 A | 11/1996 | Stone |
| 5,613,543 A | 3/1997 | Walton |
| D382,248 S | 8/1997 | Long |
| 5,784,842 A | 7/1998 | Wackerbauer |
| D397,699 S | 9/1998 | Komick |
| 5,815,988 A * | 10/1998 | Molina ............ B60P 3/34 52/79.5 |
| 5,829,820 A | 11/1998 | Cowsert |
| 5,853,016 A | 12/1998 | Cowan |
| 5,953,875 A | 9/1999 | Harkins |
| 6,095,474 A | 8/2000 | Arnold |
| 6,101,750 A | 8/2000 | Blesener |
| 6,217,106 B1 | 4/2001 | Reckner, Jr. |
| 6,257,167 B1 | 7/2001 | Joaquim |
| 6,290,450 B1 | 9/2001 | Humphries |
| 6,345,638 B1 | 2/2002 | Warner |
| 6,474,022 B1 | 11/2002 | Double et al. |
| 6,499,497 B1 | 12/2002 | Swetish |
| 6,502,593 B1 | 1/2003 | Stafford |
| 6,530,165 B2 | 3/2003 | Griesemer |
| 6,550,802 B2 | 4/2003 | Sheehan |
| 6,564,513 B2 | 5/2003 | Henbid |
| 6,679,542 B1 | 1/2004 | Semotuk |
| 6,712,414 B2 * | 3/2004 | Morrow ............ B60P 3/34 52/79.5 |
| 6,746,040 B2 | 6/2004 | Bordeleau |
| 6,832,571 B2 | 12/2004 | Eagles |
| D503,143 S | 3/2005 | Napieraj |
| D516,497 S | 3/2006 | Napieraj |
| 7,017,975 B2 | 3/2006 | Parmer |
| 7,052,065 B2 | 5/2006 | Rasmussen |
| 7,073,816 B1 | 7/2006 | Larson |
| 7,186,030 B2 | 3/2007 | Schlanger |
| 7,188,842 B2 | 3/2007 | Thorpe |
| 7,216,896 B1 | 5/2007 | McGhie |
| 7,234,747 B2 | 6/2007 | Rasmussen |
| 7,287,806 B1 | 10/2007 | Crean |
| 7,452,000 B2 | 11/2008 | Winter |
| D583,746 S | 12/2008 | Napieraj |
| D583,747 S | 12/2008 | Napieraj |
| 7,677,625 B2 | 3/2010 | Gosselin |
| 7,681,941 B2 | 3/2010 | Freeman |
| 7,721,746 B2 | 5/2010 | Yul |
| D619,077 S | 7/2010 | Frankham |
| D619,078 S | 7/2010 | Frankham |
| 7,789,452 B2 | 9/2010 | Dempsey |
| 7,810,866 B2 | 10/2010 | Dempsey |
| 7,967,369 B2 | 6/2011 | Davidson |
| 7,987,863 B2 | 8/2011 | Warner |
| D651,678 S | 1/2012 | Muggleton |
| 8,439,426 B2 | 5/2013 | Dempsey |
| 8,549,794 B2 | 10/2013 | Hotes |
| 8,567,811 B1 | 10/2013 | Jones |
| 8,899,610 B2 | 12/2014 | Venn |
| D732,460 S | 6/2015 | Seneker |
| 9,205,881 B2 | 12/2015 | Vandergon et al. |
| D775,056 S | 12/2016 | Wheel |
| D780,088 S | 2/2017 | Gholston |
| D785,542 S | 5/2017 | Patel et al. |
| D796,420 S | 9/2017 | Abrams |

(56) References Cited

U.S. PATENT DOCUMENTS

| | | |
|---|---|---|
| D812,545 S | 3/2018 | Donohoe |
| D813,783 S | 3/2018 | Dowdey |
| 9,926,026 B2 | 3/2018 | Vandergon et al. |
| D836,532 S | 12/2018 | King |
| D865,642 S | 11/2019 | Davidson |
| 10,501,133 B2 | 12/2019 | Fleischhacker |
| 11,345,270 B2 | 5/2022 | McGregor et al. |
| 2002/0084664 A1 | 7/2002 | McManus |
| 2003/0197352 A1 | 10/2003 | Bordeleau |
| 2007/0262611 A1 | 11/2007 | Freeman |
| 2008/0055170 A1 | 3/2008 | Madden |
| 2008/0265617 A1 | 10/2008 | Davidson |
| 2009/0188538 A1 | 7/2009 | Kim |
| 2009/0224512 A1 | 9/2009 | Winter |
| 2011/0181006 A1 | 7/2011 | Heppner |
| 2013/0154212 A1 | 6/2013 | Vandergon et al. |
| 2013/0214500 A1 | 8/2013 | Love |
| 2016/0083031 A1 | 3/2016 | Vandergon et al. |
| 2018/0170467 A1 | 6/2018 | Fleischhacker |

FOREIGN PATENT DOCUMENTS

| | | |
|---|---|---|
| GB | 2359312 A | 8/2001 |
| JP | S47-044612 A | 12/1972 |
| JP | H5-98851 A | 4/1993 |
| JP | H09-500183 A | 1/1997 |
| JP | H11-123979 A | 5/1999 |
| JP | 2012-101767 A | 5/2012 |
| KR | 20-0385932 Y1 | 6/2005 |
| KR | 10-2012-0001903 A | 1/2012 |
| RU | 2021922 C1 | 10/1994 |
| WO | 1995003457 A1 | 2/1995 |

OTHER PUBLICATIONS

"Build MI's Pop-Up Camper Van", Mechanix Illustrated, Mar. 1984, pp. 108-109.

Riley et al., "The Phoenix: A High-Mileage Camper Van You Can Build", Dune Buggies & Hot VWs, Dec. 1980, pp. 60-63.

Office Action in corresponding Japanese Patent Application No. 2021-204404 dated Jan. 10, 2023.

\* cited by examiner

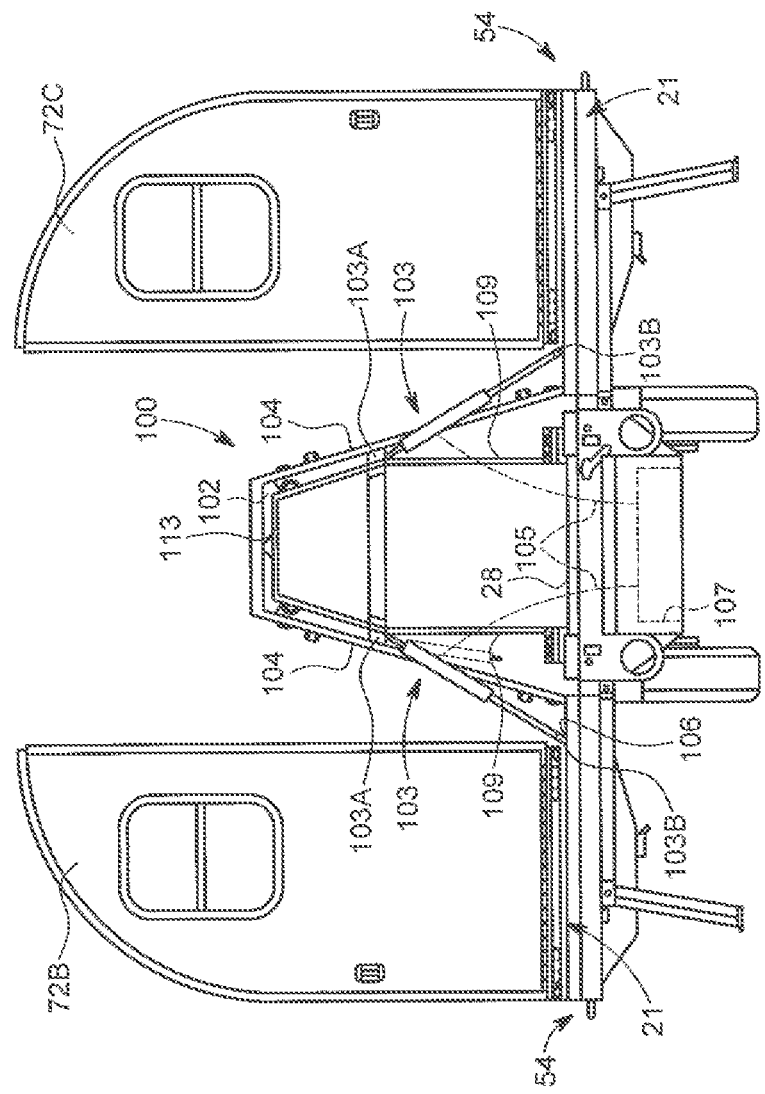

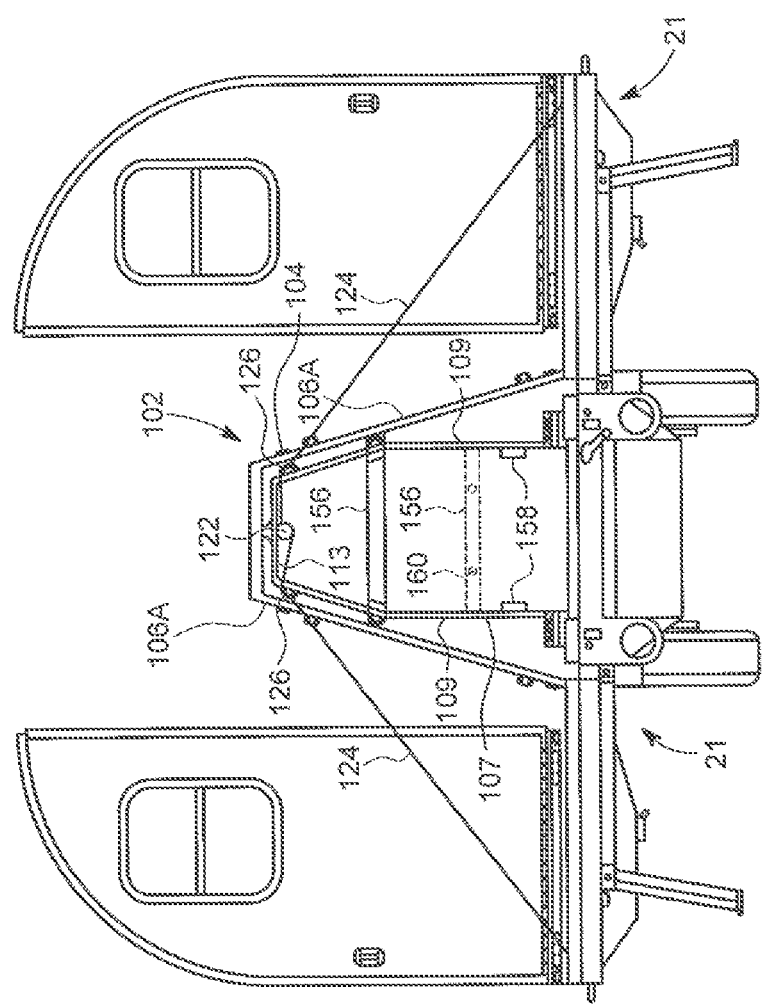

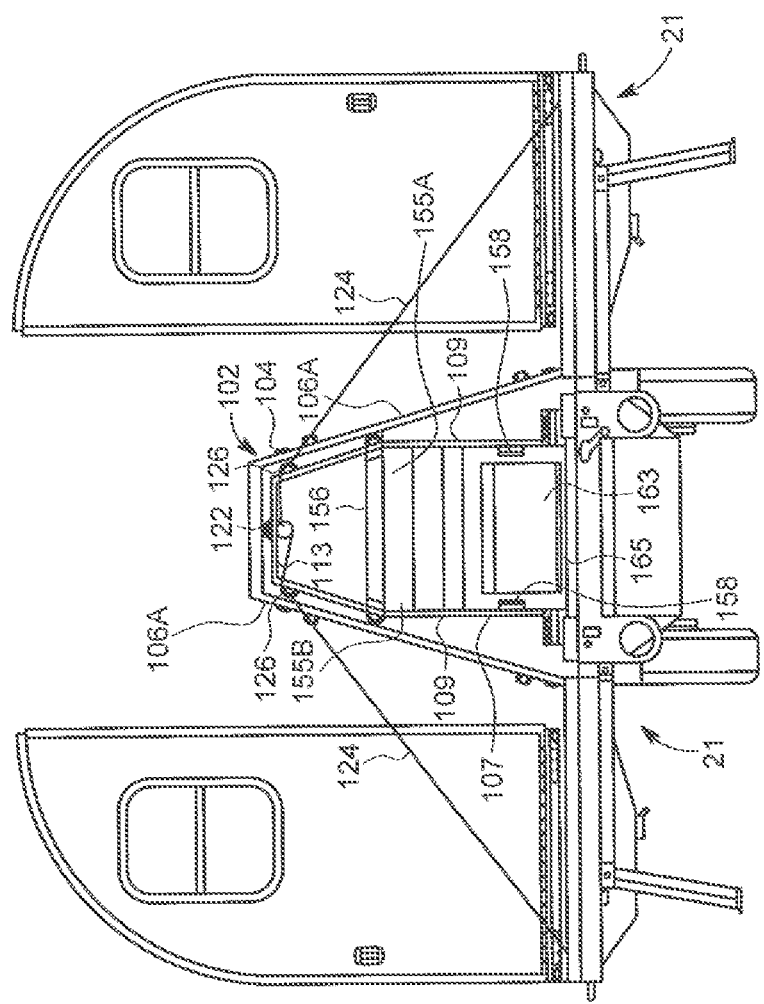

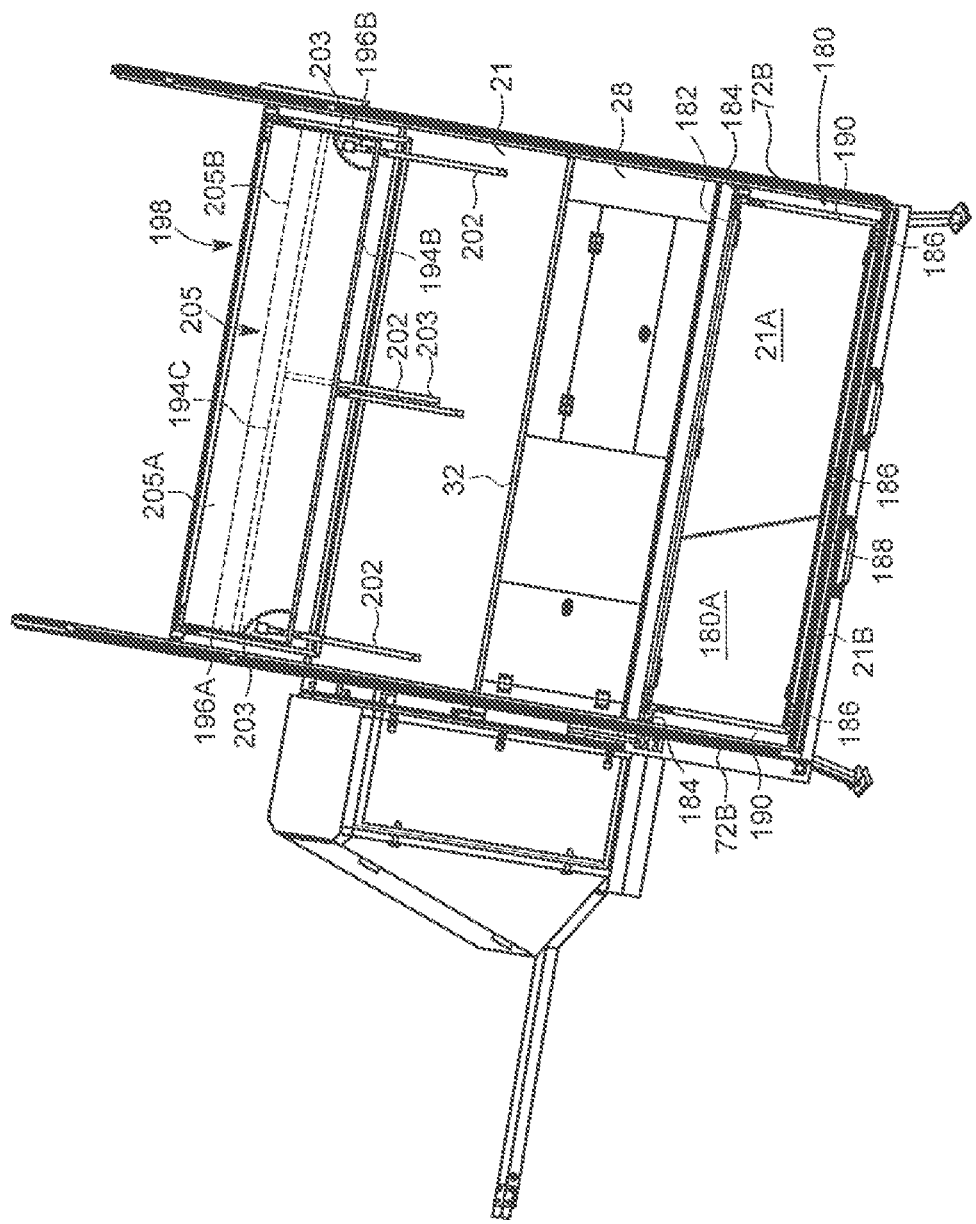

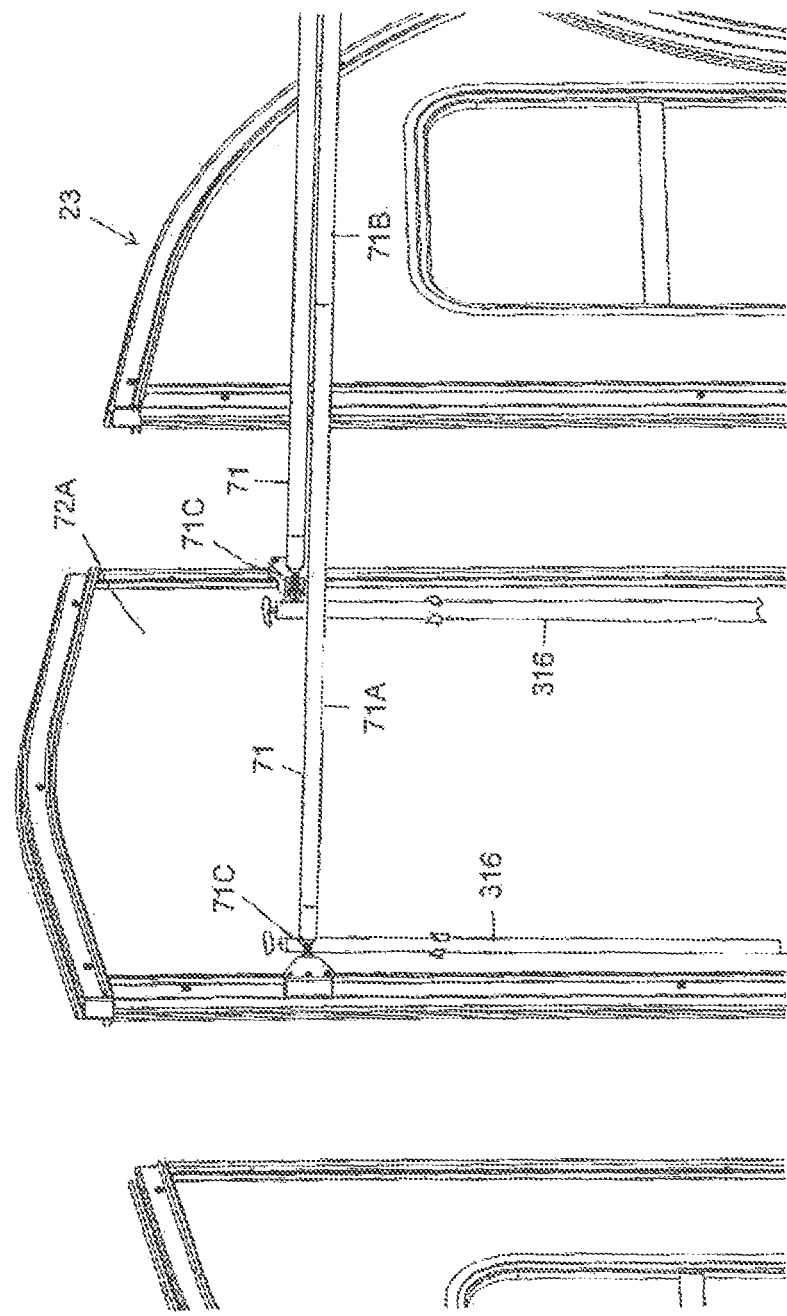

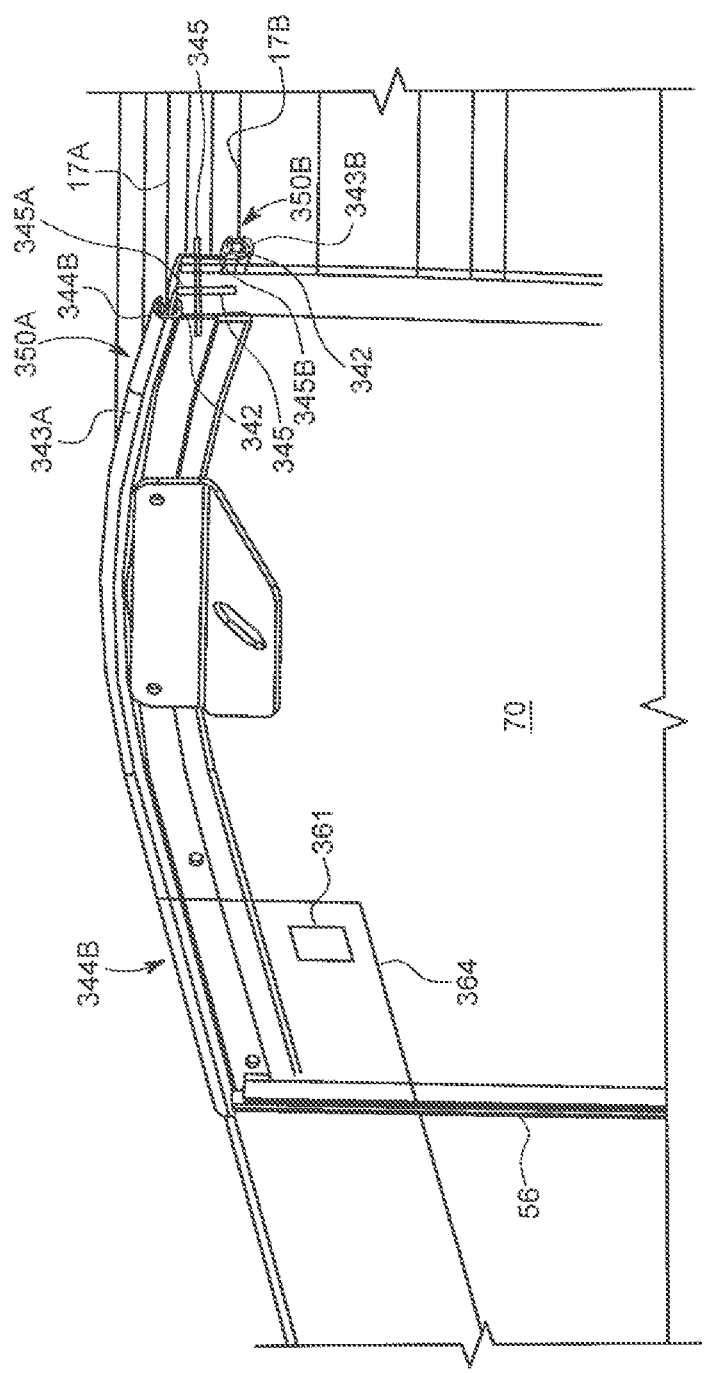

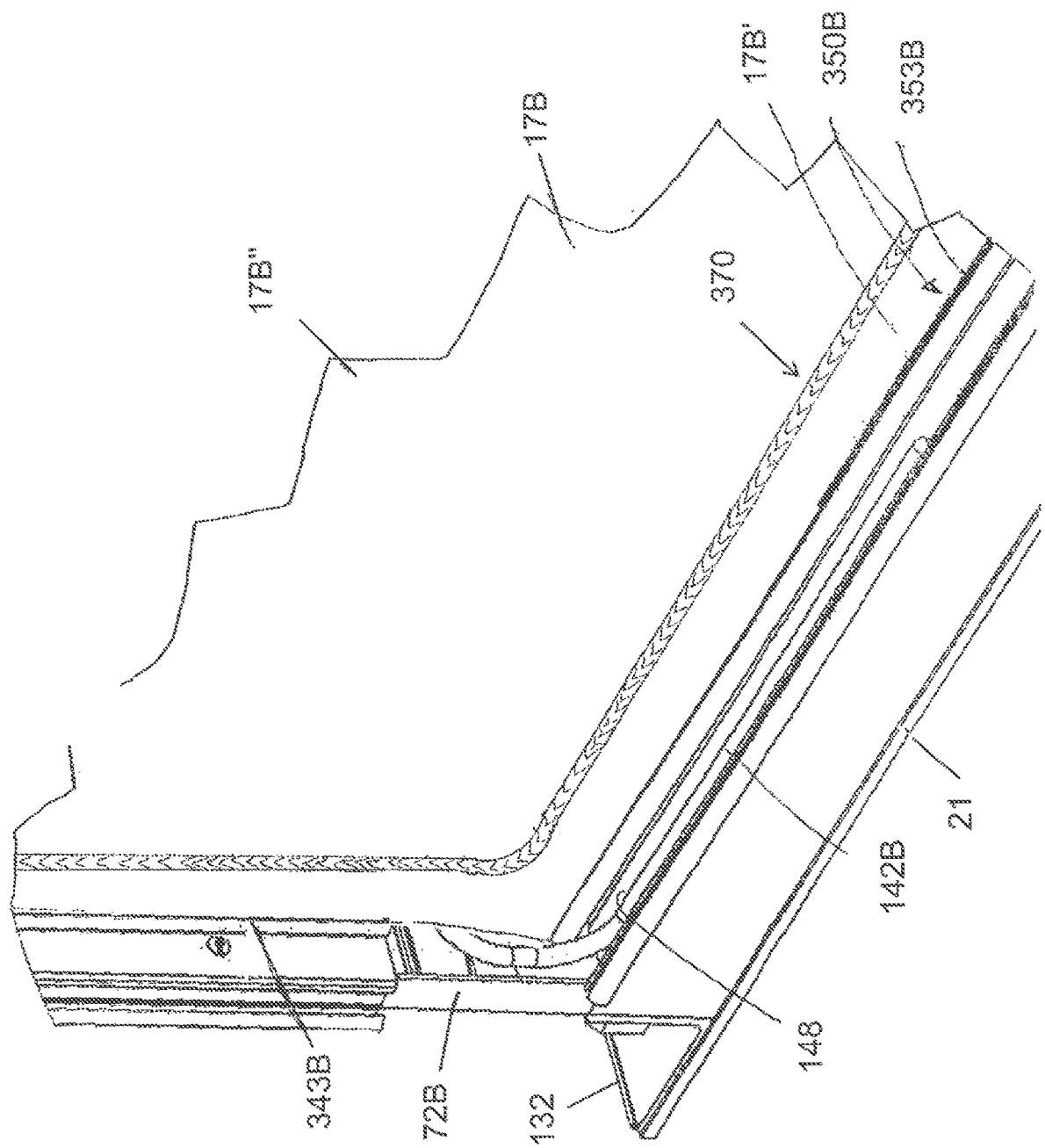

FOLD-OUT TRANSPORTABLE PARTIAL OR COMPLETE ENCLOSURE

CROSS-REFERENCE TO RELATED APPLICATION

The present application is a continuation of patent application Ser. No. 16/136,581, filed Sep. 20, 2018 which claims priority of International patent application Serial No. PCT/US2017/023251, filed Mar. 20, 2017, and published in English as WO 2017/165314, which claims the benefit of U.S. provisional patent application Ser. No. 62/429,075, filed Dec. 2, 2016, U.S. provisional patent application Ser. No. 62/373,124, filed Aug. 10, 2016, and U.S. provisional patent application Ser. No. 62/310,727 filed Mar. 20, 2016.

BACKGROUND

The discussion below is merely provided for general background information and is not intended to be used as an aid in determining the scope of the claimed subject matter.

Various forms of portable enclosures used during travel for providing a living space have been around for ages. Covered wagons can be considered one form, but more recent times have rendered the "pop-up" or "fold-out" vehicle pulled trailer in which the trailer has a couple positions, a compacted travel position and an expanded use position. In addition to trailers, various forms of campers have been mounted to the bed or box of a pickup.

Early on, fuel consumption for the vehicle towing or carrying the camper was of relatively low concern. As fuel consumption rose and the expense of fuel reached new levels, society became more interested in energy efficiency. This trend expanded into an awareness of the need to protect the environment from wasteful uses of fuel. Trailers or large pickup mounted campers that are in a shape to provide a large living space while moving are at odds with fuel efficiency. In addition, large trailers or pickup mounted campers are difficult to store and transport.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

Aspects of the invention will be described with respect to a fold-out transportable partial or complete enclosure that in one embodiment is particularly advantageously used as a camper such as but not limited to be mounted to a trailer. However, it should be understood that a trailer mounted fold-out camper is but one embodiment where aspects of the invention can be incorporated on other folding or expanding trailers, or on other forms of trailers that are not necessarily used for camping or even on equipment that is generally pulled by another vehicle or device. Likewise aspects of the invention can be used as a fold-out partial or complete enclosure mounted to a vehicle such as a pickup, truck or boat or merely carried by such vehicles or trailers and when deployed is deployed away from the transport vehicle or trailer.

One general aspect includes a transportable fold-out at least partial enclosure, including: a stationary platform having a major surface defining a stationary plane, a plurality of side edges, a front edge and a back edge; a primary platform having a major surface defining a primary plane, an inside edge, an outside edge, a front edge, a back edge, the inside edge being joined to the stationary platform, the primary platform having a folded position in which the primary plane and stationary plane are oblique or orthogonal, and the primary platform having an extended position where the primary platform is unfolded from the stationary platform; an end wall assembly having at least two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to form a wall to both the stationary plane and the primary plane, and the end wall assembly having a folded position; and at least one actuating mechanism joined to at least one of the segments and the stationary platform or the primary platform to which said at least one of the segments is joined, said at least one actuating mechanism configured to provide a force to urge said at least one of the segments to the extended position.

A second general aspect includes a transportable fold-out at least partial enclosure, including: a frame. The transportable fold-out at least partial enclosure also includes a stationary platform joined to the frame and having a major surface defining a stationary plane, a plurality of side edges, a front edge and a back edge. The transportable fold-out at least partial enclosure also includes a primary platform having a major surface defining a primary plane, an inside edge, an outside edge, a front edge, a back edge, the inside edge being joined to the stationary platform, the primary platform having a folded position in which the primary plane and stationary plane are oblique or orthogonal, and the primary platform having an extended position where the primary platform is unfolded from the stationary platform. The transportable fold-out at least partial enclosure also includes an end wall assembly having at least two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to form a wall to both the stationary plane and the primary plane, and the end wall assembly having a folded position. The transportable fold-out at least partial enclosure also includes at least one actuating mechanism joined to at least one of the segments and the stationary platform or the primary platform to which said at least one of the segments is joined, said at least one actuating mechanism configured to provide a force to urge said at least one of the segments to the extended position.

Implementations of the first and second general aspects may include one or more of the following features. The transportable fold-out at least partial enclosure where side edges of the segments are joined together with a hinge. The transportable fold-out at least partial enclosure where said spring is configured to act upon only a first segment of the segments and the hinge joining the segments along the side edges thereof is configured to lift and lower a second segment of the segments. The transportable fold-out at least partial enclosure where said actuating mechanism is further configured to provide a force resisting lowering of said one of the segments to the folded position. The transportable fold-out at least partial enclosure where said actuating mechanism includes a spring. The transportable fold-out at least partial enclosure where the spring includes a torsion spring. The transportable fold-out at least partial enclosure where the spring includes a tension or compression spring. The transportable fold-out at least partial enclosure where said at least one of the segments is joined the bottom edge thereof to the front edge of to one of the stationary platform and the primary platform with a hinge, said torsion spring having a first element joined to a center spring section at a first portion and a second element joined to a second portion of the center spring section opposite the first portion, the center spring section disposed adjacent the hinge. The transportable fold-out at least partial enclosure where the center spring section is elongated with the center spring section being oriented parallel to the hinge. The transportable fold-out at least partial enclosure where the first element is elongated and extends away from the center section parallel to a side edge of said at least one of the segments, and where the second element is elongated and extends away from the center section parallel to a side edge of said at least one of the stationary platform and the primary platform. The transportable fold-out at least partial enclosure where side edges of the segments are joined together with a hinge. The transportable fold-out at least partial enclosure where said at least one actuating mechanism is configured to act upon only a first segment of the segments and the hinge joining the segments along the side edges thereof is configured to lift and lower a second segment of the segments. The transportable fold-out at least partial enclosure where each of said actuating mechanisms is further configured to provide a force resisting lowering each associated end wall assembly to the folded position. The transportable fold-out at least partial enclosure where each segment bottom edge is joined to the associated front edge or back edge of the stationary platform and the primary platform with a hinge, each actuating mechanism having a first element joined to a center section at a first portion and a second element joined to a second portion of the center section opposite the first portion, where a first actuating mechanism has a center section disposed adjacent one of the hinges along the front edges and where a second actuating mechanism has a center section disposed adjacent one of the hinges along the back edges. The fold-old at least partial enclosure and further including a third actuating mechanism and a fourth actuation mechanism, each of the third and fourth actuating mechanisms having a first element joined to a center section at a first portion and a second element joined to a second portion of the center section opposite the first portion, where the third actuating mechanism has a center section disposed adjacent one of the hinges along the front edges and where the fourth actuating mechanism has a center section disposed adjacent one of the hinges along the back edges. The transportable fold-out at least partial enclosure where each first element is elongated and extends away from the associated center section parallel to a side edge of one of the segments of the associated first and second end wall assemblies, and where each second element is elongated and extends away from the center section parallel to a side edge of one of the segments of the associated one of the stationary platform and the primary platform. The transportable fold-out at least partial enclosure where the first and third actuating mechanisms are operatively joined to outermost segments of the first end wall assembly and to the primary platforms, and where the first and third actuating mechanisms are operatively joined to outermost segments of the second end wall assembly and to the primary platforms. The transportable fold-out at least partial enclosure where each actuating mechanism includes a spring. The transportable fold-out at least partial enclosure where each spring includes a torsion spring. The transportable fold-out at least partial enclosure where each center spring section is elongated with the center spring section being oriented parallel to the associated hinge joining the associated segment to the associated primary platform.

A third general aspect includes a transportable fold-out at least partial enclosure, including: an at least partial enclosure frame having a hitch. The transportable fold-out at least partial enclosure also includes a stationary platform joined to the at least partial enclosure frame and having a major surface defining a stationary plane, a plurality of side edges, a front edge and a back edge. The transportable fold-out at least partial enclosure also includes a pair of primary platforms, each primary platform having a major surface defining a primary plane, an inside edge, an outside edge, a front edge, a back edge, the inside edge being joined to one of side edges of the stationary platform such that the primary platforms are joined to opposite side edges of the stationary platform, each primary platform having a folded position in which the primary plane and stationary plane are oblique or orthogonal, and each primary platform having an extended position where the primary platform is unfolded from the stationary platform. The transportable fold-out at least partial enclosure also includes a pair of end wall assemblies where a first end wall assembly is joined to front edges of the primary and stationary platforms and a second end wall assembly is joined to back edges of the primary and stationary platforms, each end wall assembly having three segments, each segment having a major surface defining a segment plane, side edges, a top edge and a bottom edge, the side edges of each pair of adjacent segments being joined to each other, the bottom edges of each segment being joined to one of front or back edges of the stationary platform and the primary platforms, each end wall assembly having an extended position in which the segment planes are at an angle to both the stationary plane and the primary plane, and each end wall assembly having a folded position. The transportable fold-out at least partial enclosure also includes a plurality of actuating mechanisms where a first actuating mechanism is joined to at least one of the segments of the first end wall assembly and the stationary platform or the primary platform to which said at least one of the segments of the first end wall assembly is joined, and where a second actuating mechanism is joined to at least one of the segments of the second end wall assembly and the stationary platform or the primary platform to which said at least one of the segments of the second end wall assembly is joined, each of said actuating mechanisms configured to provide a force to urge each associated end wall assembly to the extended position.

Implementations of the third general aspect may include one or more of the following features. The transportable fold-out at least partial enclosure where each of said actuating mechanisms is further configured to provide a force resisting lowering each associated end wall assembly to the folded position. The transportable fold-out at least partial enclosure where each segment bottom edge is joined to the associated front edge or back edge of the stationary platform and the primary platform with a hinge, each actuating mechanism having a first element joined to a center section at a first portion and a second element joined to a second portion of the center section opposite the first portion, where a first actuating mechanism has a center section disposed adjacent one of the hinges along the front edges and where a second actuating mechanism has a center section disposed adjacent one of the hinges along the back edges. The fold-old at least partial enclosure and further including a third actuating mechanism and a fourth actuation mechanism, each of the third and fourth actuating mechanisms having a first element joined to a center section at a first portion and a second element joined to a second portion of the center section opposite the first portion, where the third actuating mechanism has a center section disposed adjacent one of the hinges along the front edges and where the fourth actuating mechanism has a center section disposed adjacent one of the hinges along the back edges. The transportable fold-out at least partial enclosure where each first element is elongated and extends away from the associated center section parallel to a side edge of one of the segments of the associated first and second end wall assemblies, and where each second element is elongated and extends away from the center section parallel to a side edge of one of the segments of the associated one of the stationary platform and the primary platform. The transportable fold-out at least partial enclosure where the first and third actuating mechanisms are operatively joined to outermost segments of the first end wall assembly and to the primary platforms, and where the first and third actuating mechanisms are operatively joined to outermost segments of the second end wall assembly and to the primary platforms. The transportable fold-out at least partial enclosure where each actuating mechanism includes a spring. The transportable fold-out at least partial enclosure where each spring includes a torsion spring. The transportable fold-out at least partial enclosure where each center spring section is elongated with the center spring section being oriented parallel to the associated hinge joining the associated segment to the associated primary platform.

A fourth general aspect includes a transportable fold-out at least partial enclosure, including: a stationary platform having a major surface defining a stationary plane, a plurality of side edges, a front edge and a back edge; a primary platform having a major surface defining a primary plane, an inside edge, an outside edge, a front edge, a back edge, the inside edge being joined to the stationary platform, the primary platform having a folded position in which the primary plane and stationary plane are oblique or orthogonal, and the primary platform having an extended position where the primary platform is unfolded from the stationary platform; a vertical support secured to the stationary platform to have a portion above a level of the stationary platform; at least one lift mechanism configured to lift the primary platform from the extended position at least toward the folded position.

Implementations of the fourth general aspect may include one or more of the following features. The transportable fold-out at least partial enclosure where the lift mechanism has a first end operably coupled to the portion and a second end operably coupled to the primary platform at a position lateral of the portion so as to form a line of action extending from the first end to the second end that is oblique to the vertical support. The transportable fold-out at least partial enclosure and further including an end wall assembly having two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position; The transportable fold-out at least partial enclosure where the lift mechanism includes a flexible member extending from the portion to the second end. The transportable fold-out at least partial enclosure and a pulley coupled to the portion, the flexible member traveling over the pulley when the flexible member lifts the primary platform. The transportable fold-out at least partial enclosure and an actuator configured to extend and retract the flexible member. The transportable fold-out at least partial enclosure where the actuator includes a hoist. The transportable fold-out at least partial enclosure where the lift mechanism includes telescoping actuator. The transportable fold-out at least partial enclosure where the telescoping actuator includes a pre-charged gas actuator. The transportable fold-out at least partial enclosure where the telescoping actuator includes a piston movable in a cylinder joined to one of the portion or the primary platform, the lift mechanism further including a source of pressurized fluid coupled to the cylinder to selectively pressurize a chamber formed by the piston in the cylinder in order to displace the piston in the cylinder. The transportable fold-out at least partial enclosure where the telescoping actuator includes a threaded rod and a member threadably engaging the threaded rod, the member joined to one of the portion or the primary platform. The transportable fold-out at least partial enclosure where the telescoping actuator is pivotally joined to the portion and pivotally joined to the primary platform. The transportable fold-out at least partial enclosure where the lift mechanism includes a spring. The transportable fold-out at least partial enclosure where the spring includes a tension or compression spring. The transportable fold-out at least partial enclosure where the primary platform is of a length to obscure viewing of the lift mechanism in the folded position. The transportable fold-out at least partial enclosure where the lift mechanism is located in an elongated, vertically oriented cavity when the primary platform is in the folded position, a portion of the primary platform along the front edge of the primary platform forming a cover over the elongated, vertically oriented cavity to obscure the lift mechanism in the folded position. The transportable fold-out at least partial enclosure and further including: a second primary platform having a major surface defining a primary plane, an inside edge, an outside edge, a front edge, a back edge, the inside edge being joined to the stationary platform on a side edge opposite the primary platform, the second primary platform having a folded position in which the primary plane and stationary plane are oblique or orthogonal, and the second primary platform having an extended position where the primary platform is unfolded from the stationary platform; and a second lift mechanism configured to lift the second primary platform from the extended position at least toward the folded position. The transportable fold-out at least partial enclosure where the second lift mechanism has a first end operably coupled to the portion and a second end operably coupled to the second primary platform at a position lateral of the portion so as to form a second line of action extending from the first end to the second end that is oblique to the vertical support and lateral of the joined side edges of the stationary platform and the second primary platform.

A fifth general aspect includes a transportable fold-out at least partial enclosure, including: a stationary platform having a major surface defining a stationary plane, a plurality of side edges, a front edge and a back edge; a pair of primary platforms, each primary platform having a major surface defining a primary plane, an inside edge, an outside edge, a front edge, a back edge, the inside edge being joined to one of side edges of the stationary platform such that the primary platforms are joined to opposite side edges of the stationary platform, each primary platform having a folded position in which the primary plane and stationary plane are oblique or orthogonal, and each primary platform having an extended position where the primary platform is unfolded from the stationary platform; a pair of end wall assemblies where a first end wall assembly is joined to front edges of the primary and stationary platforms and a second end wall assembly is joined to back edges of the primary and stationary platforms, each end wall assembly having three segments, each segment having a major surface defining a segment plane, side edges, a top edge and a bottom edge, the side edges of each pair of adjacent segments being joined to each other, the bottom edges of each segment being joined to one of front or back edges of the stationary platform and the primary platforms, each end wall assembly having an extended position in which the segment planes are at an angle to both the stationary plane and the primary plane, and each end wall assembly having a folded position; at least one strut configured to extend between and engaging surfaces of the end wall assemblies that face each other when each is in the extended position, the at least one strut having a storage position where the strut is at least partially removably held against one end wall assembly when said one end wall assembly is moving between the storage position and the extended position.

Implementations of the fifth general aspect may include one or more of the following features. The transportable fold-out at least partial enclosure where the at least one strut is pivotally joined at a first end to said one end wall assembly. The transportable fold-out at least partial enclosure and further including at least one a holding device secured to said one end wall assembly to hold at least one portion of the at least one strut on said one end wall assembly. The transportable fold-out at least partial enclosure where the holding device is configured to hold a second end of the at least one strut. The transportable fold-out at least partial enclosure and a second strut configured to extend between and engaging surfaces of the end wall assemblies that face each other when each is in the extended position, the second having a storage position where the second strut is at least partially removably held against said one end wall assembly when said one end wall assembly is moving between the storage position and the extended position. The transportable fold-out at least partial enclosure where the second strut is removably held in parallel with the at least one strut on said one wall assembly. The transportable fold-out at least partial enclosure and further including at least one a holding device secured to said one end wall assembly to hold at least one portion of the at least one strut on said one end wall assembly. The transportable fold-out at least partial enclosure where the holding device is configured to hold a second end of the at least one strut. The transportable fold-out at least partial enclosure where the at least one strut is pivotally joined at a first end to said one end wall assembly. The transportable fold-out at least partial enclosure and a second strut configured to extend between and engaging surfaces of the end wall assemblies that face each other when each is in the extended position, the second having a storage position where the second strut is at least partially removably held against said one end wall assembly when said one end wall assembly is moving between the storage position and the extended position. The transportable fold-out at least partial enclosure where the second strut is removably held in parallel with the at least one strut on said one wall assembly. The transportable fold-out at least partial enclosure where each strut is adjustable in length. The transportable fold-out at least partial enclosure and further including a second primary platform having a major surface defining a primary plane, an inside edge, an outside edge, a front edge, a back edge, the inside edge of the second primary platform being joined to a side edge opposite the primary platform, the second primary platform having a folded position in which the primary plane and stationary plane are oblique or orthogonal, where the opening is defined by edges of the primary platform, the second primary platform and/or the stationary platform. The transportable fold-out at least partial enclosure and further including an end wall assembly having at least two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position. The transportable fold-out at least partial enclosure where the at least one leg is of length that the panel functions as a table. The transportable fold-out at least partial enclosure where the at least one leg is removably attached to the panel. The transportable fold-out at least partial enclosure where the mount is secured to one of the segments. The transportable fold-out at least partial enclosure where the mount is secured to one of the frame, stationary platform or primary platforms. The transportable fold-out at least partial enclosure and further including a second mount secured to one of the frame, stationary platform, primary platforms or segments that the mount is not secured to such that the panel can be selectively secured to two different positions on the at least partial enclosure. The transportable fold-out at least partial enclosure where the leg is adjustable in length to function as the support for the portion in the two different positons on the at least partial enclosure. The transportable fold-out at least partial enclosure where the at least one leg is pivotally secured to the panel and movable from a first position where the leg is extended to support the portion of the panel when portion is secured to the mount and a second position configured to remain attached to the panel when the panel covers at least a majority of the opening formed by the stationary and primary platforms. The transportable fold-out at least partial enclosure where one of the mount or the portion includes an element inhibiting removal of the portion from the mount. The transportable fold-out at least partial enclosure where the element moves to a position to inhibit removal of the portion from the mount due to gravity. The transportable fold-out at least partial enclosure where the element includes a pivot pin to allow pivotal movement to the position to inhibit removal of the portion from the mount due to gravity. The transportable fold-out at least partial enclosure where the panel has a lower edge, an upper edge shorter than the lower edge, a pair of side edges, each side edge extending from a corner of the lower edge to a corner of the upper edge at an angle substantially coinciding with an angle of a corresponding primary platform with the stationary platform in each folded position thereof. The transportable fold-out at least partial enclosure where the end wall assembly includes three segments, each segment having a major surface defining a segment plane, side edges, a top edge and a bottom edge, the side edges of the segments being joined to each other, the bottom edges of each segment being joined to one of the stationary platform and the primary platform, where the segment planes are at an angle to both the stationary plane and the primary plane in the extended position of the end wall assembly, and parallel to one of the primary planes or the stationary plane in the folded position, the mount being secured to a middle segment of the three segments. The transportable fold-out at least partial enclosure where the panel includes an upwardly facing panel on the at least partial enclosure when the primary platform is in the folded position. The transportable fold-out at least partial enclosure where the panel includes a rearwardly facing panel on the at least partial enclosure when the primary platform is in the folded position. The transportable fold-out at least partial enclosure where the panel includes two or more portions when used in the folded position of the primary platform, the portions being separately used as spaced apart tables. The transportable fold-out at least partial enclosure where the mount is secured to a portion of the at least partial enclosure in a movable manner such that the panel can be moved while being secured to the mount to at least two different positions to function as a table. The transportable fold-out at least partial enclosure where the mount allows the panel to be tilted upwardly such that an end remote from the mount is securable in an elevated position.

A sixth general aspect includes a transportable fold-out at least partial enclosure, including: a platform; a pair of end wall assemblies where a first end wall assembly is joined to front edges of platform and a second end wall assembly is joined to back edges of the platform, each end wall assembly having an extended position in which major surfaces of the end wall assemblies are at an angle to both the platform, and each end wall assembly having a folded position; at least one strut configured to extend between and engaging surfaces of the end wall assemblies that face each other when each is in the extended position, the at least one strut having a storage position where the strut is at least partially removably is held against one end wall assembly when said one end wall assembly is moving between the storage position and the extended position.

Implementations of the sixth general aspect may include one or more of the following features. The transportable fold-out at least partial enclosure where the at least one strut is pivotally joined at a first end to said one end wall assembly. The transportable fold-out at least partial enclosure and a second strut configured to extend between and engaging surfaces of the end wall assemblies that face each other when each is in the extended position, the second having a storage position where the second strut is at least partially removably held against said one end wall assembly when said one end wall assembly is moving between the storage position and the extended position. The transportable fold-out at least partial enclosure where the second strut is removably held in parallel with the at least one strut on said one wall assembly. The transportable fold-out at least partial enclosure where each strut is adjustable in length. The transportable fold-out at least partial enclosure and further including a second primary platform having a major surface defining a primary plane, an inside edge, an outside edge, a front edge, a back edge, the inside edge of the second primary platform being joined to a side edge opposite the primary platform, the second primary platform having a folded position in which the primary plane and stationary plane are oblique or orthogonal, where the opening is defined by edges of the primary platform, the second primary platform and/or the stationary platform. The transportable fold-out at least partial enclosure and further including an end wall assembly having at least two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position. The transportable fold-out at least partial enclosure where the at least one leg is of length that the panel functions as a table. The transportable fold-out at least partial enclosure where the at least one leg is removably attached to the panel. The transportable fold-out at least partial enclosure where the mount is secured to one of the segments. The transportable fold-out at least partial enclosure where the mount is secured to one of the frame, stationary platform or primary platforms. The transportable fold-out at least partial enclosure and further including a second mount secured to one of the frame, stationary platform, primary platforms or segments that the mount is not secured to such that the panel can be selectively secured to two different positions on the at least partial enclosure. The transportable fold-out at least partial enclosure where the leg is adjustable in length to function as the support for the portion in the two different positons on the at least partial enclosure. The transportable fold-out at least partial enclosure where the at least one leg is pivotally secured to the panel and movable from a first position where the leg is extended to support the portion of the panel when portion is secured to the mount and a second position configured to remain attached to the panel when the panel covers at least a majority of the opening formed by the stationary and primary platforms. The transportable fold-out at least partial enclosure where one of the mount or the portion includes an element inhibiting removal of the portion from the mount. The transportable fold-out at least partial enclosure where the element moves to a position to inhibit removal of the portion from the mount due to gravity. The transportable fold-out at least partial enclosure where the element includes a pivot pin to allow pivotal movement to the position to inhibit removal of the portion from the mount due to gravity. The transportable fold-out at least partial enclosure where the panel has a lower edge, an upper edge shorter than the lower edge, a pair of side edges, each side edge extending from a corner of the lower edge to a corner of the upper edge at an angle substantially coinciding with an angle of a corresponding primary platform with the stationary platform in each folded position thereof. The transportable fold-out at least partial enclosure where the end wall assembly includes three segments, each segment having a major surface defining a segment plane, side edges, a top edge and a bottom edge, the side edges of the segments being joined to each other, the bottom edges of each segment being joined to one of the stationary platform and the primary platform, where the segment planes are at an angle to both the stationary plane and the primary plane in the extended position of the end wall assembly, and parallel to one of the primary planes or the stationary plane in the folded position, the mount being secured to a middle segment of the three segments. The transportable fold-out at least partial enclosure where the panel includes an upwardly facing panel on the at least partial enclosure when the primary platform is in the folded position. The transportable fold-out at least partial enclosure where the panel includes a rearwardly facing panel on the at least partial enclosure when the primary platform is in the folded position. The transportable fold-out at least partial enclosure where the panel includes two or more portions when used in the folded position of the primary platform, the portions being separately used as spaced apart tables. The transportable fold-out at least partial enclosure where the mount is secured to a portion of the at least partial enclosure in a movable manner such that the panel can be moved while being secured to the mount to at least two different positions to function as a table. The transportable fold-out at least partial enclosure where the mount allows the panel to be tilted upwardly such that an end remote from the mount is securable in an elevated position.

A seventh general aspect includes a transportable fold-out at least partial enclosure, including: a frame. The transportable fold-out at least partial enclosure also includes a stationary platform joined to the frame and having a major surface defining a stationary plane, a plurality of side edges, a front edge and a back edge. The transportable fold-out at least partial enclosure also includes a primary platform having a major surface defining a primary plane, an inside edge, an outside edge, a front edge, a back edge, the inside edge being joined to one of side edges of the stationary platform, the primary platform having a folded position in which the primary plane and stationary plane are oblique or orthogonal, and the primary platform having an extended position where the primary platform is unfolded from the stationary platform. The transportable fold-out at least partial enclosure also includes a wall joined to at least one of the primary platform or the stationary platform. The transportable fold-out at least partial enclosure also includes a mounting element. The transportable fold-out at least partial enclosure also includes a panel removably attached to a portion of at least the stationary platform or the primary platform in the folded position so as to cover at least a majority of an opening formed at least in part by the stationary and/or the primary platform, when the primary platform is in the folded position, the panel including a portion removably attachable to the mounting element. The transportable fold-out at least partial enclosure also includes at least one leg of length to support a portion of the rear cover remote from the portion.

Implementations of the seventh general aspect may include one or more of the following features. The transportable fold-out at least partial enclosure and further including a second primary platform having a major surface defining a primary plane, an inside edge, an outside edge, a front edge, a back edge, the inside edge of the second primary platform being joined to a side edge opposite the primary platform, the second primary platform having a folded position in which the primary plane and stationary plane are oblique or orthogonal, where the opening is defined by edges of the primary platform, the second primary platform and/or the stationary platform. The transportable fold-out at least partial enclosure and further including an end wall assembly having at least two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position. The transportable fold-out at least partial enclosure where the at least one leg is of length that the panel functions as a table. The transportable fold-out at least partial enclosure where the at least one leg is removably attached to the panel. The transportable fold-out at least partial enclosure where the mount is secured to one of the segments. The transportable fold-out at least partial enclosure where the mount is secured to one of the frame, stationary platform or primary platforms. The transportable fold-out at least partial enclosure and further including a second mount secured to one of the frame, stationary platform, primary platforms or segments that the mount is not secured to such that the panel can be selectively secured to two different positions on the at least partial enclosure. The transportable fold-out at least partial enclosure where the leg is adjustable in length to function as the support for the portion in the two different positons on the at least partial enclosure. The transportable fold-out at least partial enclosure where the at least one leg is pivotally secured to the panel and movable from a first position where the leg is extended to support the portion of the panel when portion is secured to the mount and a second position configured to remain attached to the panel when the panel covers at least a majority of the opening formed by the stationary and primary platforms. The transportable fold-out at least partial enclosure where one of the mount or the portion includes an element inhibiting removal of the portion from the mount. The transportable fold-out at least partial enclosure where the element moves to a position to inhibit removal of the portion from the mount due to gravity. The transportable fold-out at least partial enclosure where the element includes a pivot pin to allow pivotal movement to the position to inhibit removal of the portion from the mount due to gravity. The transportable fold-out at least partial enclosure where the panel has a lower edge, an upper edge shorter than the lower edge, a pair of side edges, each side edge extending from a corner of the lower edge to a corner of the upper edge at an angle substantially coinciding with an angle of a corresponding primary platform with the stationary platform in each folded position thereof. The transportable fold-out at least partial enclosure where the end wall assembly includes three segments, each segment having a major surface defining a segment plane, side edges, a top edge and a bottom edge, the side edges of the segments being joined to each other, the bottom edges of each segment being joined to one of the stationary platform and the primary platform, where the segment planes are at an angle to both the stationary plane and the primary plane in the extended position of the end wall assembly, and parallel to one of the primary planes or the stationary plane in the folded position, the mount being secured to a middle segment of the three segments. The transportable fold-out at least partial enclosure where the panel includes an upwardly facing panel on the at least partial enclosure when the primary platform is in the folded position. The transportable fold-out at least partial enclosure where the panel includes a rearwardly facing panel on the at least partial enclosure when the primary platform is in the folded position. The transportable fold-out at least partial enclosure where the panel includes two or more portions when used in the folded position of the primary platform, the portions being separately used as spaced apart tables. The transportable fold-out at least partial enclosure where the mount is secured to a portion of the at least partial enclosure in a movable manner such that the panel can be moved while being secured to the mount to at least two different positions to function as a table. The transportable fold-out at least partial enclosure where the mount allows the panel to be tilted upwardly such that an end remote from the mount is securable in an elevated position.

An eighth general aspect includes a transportable fold-out at least partial enclosure, including: a frame. The transportable fold-out at least partial enclosure also includes a platform supported by the frame. The transportable fold-out at least partial enclosure also includes a pair of end walls pivotally secured to the frame or platform at opposite ends of the platform. The transportable fold-out at least partial enclosure also includes at least one collapsible support frame having at least one movable elongated support secured to the frame to selectively move from a first position where the elongated support is disengaged from the walls to a second position where the elongated support is elevated above its location in the first position so as to engage each of the walls and hold the walls in an upright position.

Implementations of the eighth general aspect may include one or more of the following features. The transportable fold-out at least partial enclosure where the at least one collapsible support frame engages portions of the walls each proximate side edges thereof. The transportable fold-out at least partial enclosure and further including a second collapsible support frame having at least one movable elongated support secured to the frame to selectively move from a first position where the elongated support is disengaged from the walls to a second position where the elongated support is elevated above its location in the first position so as to engage each of the walls and hold the walls in an upright position. The transportable fold-out at least partial enclosure where at least one of the collapsible support frames includes a plurality of supports secured to each other to form an upper support frame that is elevated above the platform when the elongated support is in the second position. The transportable fold-out at least partial enclosure where the collapsible support frame includes secondary vertical supports pivotally joined to the upper support frame at locations spaced apart from each other. The transportable fold-out at least partial enclosure and further including a rigid panel supported by the upper frame in an elevated position above the platform when the collapsible support frame is in the second position. The transportable fold-out at least partial enclosure and further including a flexible elongated member of size configured to form a sleeping surface that is supported by the upper frame in an elevated position above the platform when the collapsible support frame is in the second position. The transportable fold-out at least partial enclosure and further including a table removably attached to a portion of the support frame in the second position. The transportable fold-out at least partial enclosure where the table is slidably attached to the portion of the support frame. The transportable fold-out at least partial enclosure where the table includes a removable panel when the end walls are in a collapsed position and the support frame is in the first position. The transportable fold-out at least partial enclosure where the table is pivotally mounted to the support frame. The transportable fold-out at least partial enclosure where a mount for the table allows the table to be tilted upwardly such that an end remote from the mount is securable in an elevated position. The transportable fold-out at least partial enclosure where each collapsible support frame is pivotally joined to the primary platform. The transportable fold-out at least partial enclosure is pivotally joined to the primary platform proximate the outside edge. The transportable fold-out at least partial enclosure where at least one of the collapsible support frame includes a plurality of supports secured to each other to form an upper frame that is elevated above the major surface when the elongated support is in the second position and where ends of the support frame engages each of the end wall assemblies. The transportable fold-out at least partial enclosure where the collapsible support frame includes secondary vertical supports pivotally joined to the upper frame at locations spaced apart from each other. The transportable fold-out at least partial enclosure and further including a rigid panel supported by the upper frame in an elevated position above the major surface when the collapsible support frame is in the second position. The transportable fold-out at least partial enclosure and further including a flexible elongated member of size configured to form a sleeping surface that is supported by the upper frame in an elevated position above the major surface when the collapsible support frame is in the second position. The transportable fold-out at least partial enclosure where the upper frame and the side support are disposed between the primary platform and a portion of an associated end wall assembly when the end wall assembly is in the folded position. The transportable fold-out at least partial enclosure where the table is pivotally mounted to the elongated support. The transportable fold-out at least partial enclosure where a mount for the table allows the table to be tilted upwardly such that an end remote from the mount is securable in an elevated position. The transportable fold-out at least partial enclosure where the elongated support and the secondary vertical supports are of height such that the upper frame forms a bench. The transportable fold-out at least partial enclosure where the elongated support and the secondary vertical supports are of height such that the upper frame forms a table or sleeping support.

A ninth general aspect includes a transportable fold-out at least partial enclosure, including: a stationary platform having a major surface defining a stationary plane, a plurality of side edges, a front edge and a back edge; a pair of primary platforms, each primary platform having a major surface defining a primary plane, an inside edge, an outside edge, a front edge, a back edge, the inside edge being joined to the stationary platform, each primary platform having a folded position in which each primary plane and stationary plane are oblique or orthogonal, and each primary platform having an extended position where the primary platform is unfolded from the stationary platform; a pair of end wall assemblies where a first end wall assembly is joined to front edges of the primary and stationary platforms and a second end wall assembly is joined to back edges of the primary and stationary platforms, each end wall assembly having three segments, each segment having a major surface defining a segment plane, side edges, a top edge and a bottom edge, the side edges of each pair of adjacent segments being joined to each other, the bottom edges of each segment being joined to one of front or back edges of the stationary platform and the primary platforms, each end wall assembly having an extended position in which the segment planes are at an angle to both the stationary plane and the primary plane, and each end wall assembly having a folded position; a pair of collapsible support frames, each support frame having at least one movable elongated support secured to one of the primary platforms to selectively move from a first position where the elongated support is parallel with and proximate a major surface of one of the primary platforms and a second position where the elongated support is elevated above the side edge opposite the stationary platform where ends of the support frame engage each of the end wall assemblies when the end wall assemblies are in the extended positions.

Implementations of the ninth general aspect may include one or more of the following features. The transportable fold-out at least partial enclosure where each collapsible support frame is pivotally joined to the primary platform. The transportable fold-out at least partial enclosure is pivotally joined to the primary platform proximate the outside edge. The transportable fold-out at least partial enclosure where at least one of the collapsible support frame includes a plurality of supports secured to each other to form an upper frame that is elevated above the major surface when the elongated support is in the second position and where ends of the support frame engages each of the end wall assemblies. The transportable fold-out at least partial enclosure where the collapsible support frame includes secondary vertical supports pivotally joined to the upper frame at locations spaced apart from each other. The transportable fold-out at least partial enclosure and further including a rigid panel supported by the upper frame in an elevated position above the major surface when the collapsible support frame is in the second position. The transportable fold-out at least partial enclosure and further including a flexible elongated member of size configured to form a sleeping surface that is supported by the upper frame in an elevated position above the major surface when the collapsible support frame is in the second position. The transportable fold-out at least partial enclosure where the upper frame and the side support are disposed between the primary platform and a portion of an associated end wall assembly when the end wall assembly is in the folded position. The transportable fold-out at least partial enclosure where the table is pivotally mounted to the elongated support. The transportable fold-out at least partial enclosure where a mount for the table allows the table to be tilted upwardly such that an end remote from the mount is securable at an elevated position. The transportable fold-out at least partial enclosure where the elongated support and the secondary vertical supports are of height such that the upper frame forms a bench. The transportable fold-out at least partial enclosure where the elongated support and the secondary vertical supports are of height such that the upper frame forms a table or sleeping support.

A tenth general aspect includes a transportable fold-out at least partial enclosure, including: a stationary platform having a major surface defining a stationary plane, a plurality of side edges, a front edge and a back edge; a primary platform having a major surface defining a primary plane, an inside edge, an outside edge, a front edge, a back edge, the inside edge being joined to the stationary platform, the primary platform having a folded position in which the primary plane and stationary plane are oblique or orthogonal, and the primary platform having an extended position where the primary platform is unfolded from the stationary platform; an end wall assembly having two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position; a collapsible support frame having at least one movable elongated support secured to the primary platform to selectively move from a first position where the elongated support is parallel with a major surface of the primary platform and a second position where the elongated support is at an angle to the major surface, the support frame having at least one support member joined to the elongated support that is elevated above the major surface when the elongated support is in the second position.

Implementations of the tenth general aspect may include one or more of the following features. The transportable fold-out at least partial enclosure where the elongated support is pivotally joined to the primary platform. The transportable fold-out at least partial enclosure where the elongated support is pivotally joined to the primary platform proximate the outside edge. The transportable fold-out at least partial enclosure where the at least one support includes a plurality of supports secured to each other to form an upper frame that is elevated above the major surface when the elongated support is in the second position. The transportable fold-out at least partial enclosure where the at least one elongated support includes at least two elongated supports spaced apart from each other and secured to ends of a side support, the side support pivotally joined to the primary platform, the upper frame being pivotally joined to ends of the elongated supports. The transportable fold-out at least partial enclosure where the collapsible support frame includes secondary vertical supports pivotally joined to the upper frame at locations spaced apart from the elongated supports. The transportable fold-out at least partial enclosure and further including a rigid panel supported by the upper frame in an elevated position above the major surface when the elongated support is in the second position. The transportable fold-out at least partial enclosure and further including a flexible elongated member of size configured to form a sleeping surface that is supported by the upper frame in an elevated position above the major surface when the elongated support is in the second position. The transportable fold-out at least partial enclosure where the upper frame and the side support are disposed between the primary platform and the end wall assembly when the end wall assembly is in the folded position. The transportable fold-out at least partial enclosure where the elongated support and the secondary vertical supports are of height such that the upper frame forms a table or sleeping surface. The transportable fold-out at least partial enclosure where the upper frame is selectively configurable in a first operable width and a second operable width, the second operable width being wider than the first operable width. The transportable fold-out at least partial enclosure where the second operable width is of a width such that the upper frame is over at least partially both the primary platform and the stationary platform. The transportable fold-out at least partial enclosure where the upper frame includes selectively extendable lateral supports. The transportable fold-out at least partial enclosure and a second portion selectively connectable to the upper frame to obtain the second operable width. The transportable fold-out at least partial enclosure and further including a panel selectively configurable to a first width and a second width of size for the upper frame when configured in the first operable width and the second operable width, respectively. The transportable fold-out at least partial enclosure where the structure is a partial storage enclosure mounted to the frame adjacent the stationary platform. The transportable fold-out at least partial enclosure where the structure is a partial storage enclosure mounted to the frame adjacent the primary platform. The transportable fold-out at least partial enclosure where the partial storage enclosure includes opposed side edges, where each side edge is aligned with one of the front edges of the primary platforms in the folded position. The transportable fold-out at least partial enclosure and a support frame located in the partial storage enclosure the support frame supporting one or more components that are operated when the end wall assembly is in the extended position. The transportable fold-out at least partial enclosure where the support frame is configured to support one component of a set of different components, each component of the set of components configured to be supported by the support frame in a same position. The transportable fold-out at least partial enclosure where the support frame includes a first mount and each of the components of the set of different components includes a second mount complimentary with the first mount. The transportable fold-out at least partial enclosure where one component of the different set of components is a heater. The transportable fold-out at least partial enclosure where one component of the different set of components is a sink. The transportable fold-out at least partial enclosure where one component of the different set of components is a cooktop. The transportable fold-out at least partial enclosure where one component of the different set of components is a storage drawer. The transportable fold-out at least partial enclosure where one component of the different set of components is electrical outlets. The transportable fold-out at least partial enclosure where one component of the different set of components is a valve controlling water flow. The transportable fold-out at least partial enclosure where one component includes a toilet movable from within the partial storage enclosure through the opening to be used and returned to the partial storage enclosure through the opening for storage. The transportable fold-out at least partial enclosure where the partial storage enclosure includes at least one door through which the toilet can be removed when the end wall assembly is in the folded position An eleventh general aspect includes a transportable fold-out at least partial enclosure, including: a frame. The transportable fold-out at least partial enclosure also includes a stationary platform supported by the frame and having a major surface defining a stationary plane, a plurality of side edges, a front edge and a back edge. The transportable fold-out at least partial enclosure also includes a primary platform having a major surface defining a primary plane, an inside edge, an outside edge, a front edge, a back edge, the inside edge joined to the stationary platform, each primary platform having a folded position in which the associated primary plane and stationary plane are oblique or orthogonal, and the primary platform having an extended position where the primary platform is unfolded from the stationary platform. The transportable fold-out at least partial enclosure also includes an end wall assembly having two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position, where the segment joined to the either the stationary platform of the primary platform includes an opening. The transportable fold-out at least partial enclosure also includes a structure mounted to the frame and adjacent the primary and/or stationary platform when the wall assembly is unfolded, the structure having a surface and/or opening accessible through the opening in the segment when the wall assembly is unfolded.

Implementations of the eleventh general aspect may include one or more of the following features. The transportable fold-out at least partial enclosure where the structure is a partial storage enclosure mounted to the frame adjacent the stationary platform. The transportable fold-out at least partial enclosure where the structure is a partial storage enclosure mounted to the frame adjacent the primary platform. The transportable fold-out at least partial enclosure where the partial storage enclosure includes opposed side edges, where each side edge is aligned with one of the front edges of the primary platforms in the folded position. The transportable fold-out at least partial enclosure and a support frame located in the partial storage enclosure the support frame supporting one or more components that are operated when the end wall assembly is in the extended position. The transportable fold-out at least partial enclosure where the support frame is configured to support one component of a set of different components, each component of the set of components configured to be supported by the support frame in a same position. The transportable fold-out at least partial enclosure where the support frame includes a first mount and each of the components of the set of different components includes a second mount complimentary with the first mount. The transportable fold-out at least partial enclosure where one component of the different set of components is a heater. The transportable fold-out at least partial enclosure where one component of the different set of components is a sink. The transportable fold-out at least partial enclosure where one component of the different set of components is a cooktop. The transportable fold-out at least partial enclosure where one component of the different set of components is a storage drawer. The transportable fold-out at least partial enclosure where one component of the different set of components is electrical outlets. The transportable fold-out at least partial enclosure where one component of the different set of components is a valve controlling water flow. The transportable fold-out at least partial enclosure where one component includes a toilet movable from within the partial storage enclosure through the opening to be used and returned to the partial storage enclosure through the opening for storage. The transportable fold-out at least partial enclosure where the partial storage enclosure includes at least one door through which the toilet can be removed when the end wall assembly is in the folded position.

A twelfth general aspect includes a transportable fold-out at least partial enclosure, including: a frame. The transportable fold-out at least partial enclosure also includes a stationary platform joined to the frame and having a major surface defining a stationary plane, a plurality of side edges, a front edge and a back edge. The transportable fold-out at least partial enclosure also includes two primary platforms, each primary platform having a major surface defining a primary plane, an inside edge, an outside edge, a front edge, a back edge, the inside edge each primary platform being joined to the stationary platform, each primary platform having a folded position in which the associated primary plane and stationary plane are oblique or orthogonal, and each primary platform having an extended position where the primary platform is unfolded from the stationary platform. The transportable fold-out at least partial enclosure also includes an end wall assembly having three segments, each segment having a major surface defining a segment plane, side edges, a top edge and a bottom edge, the side edges of the segments being joined to each other, the bottom edges of each segment being joined to one of the stationary platform and the primary platforms, the end wall assembly having an extended position in which the segment planes are at an angle to both the stationary plane and the primary plane, and the end wall assembly having a folded position, where the segment joined to the either the stationary platform of the primary platform includes an opening. The transportable fold-out at least partial enclosure also includes a partial storage enclosure mounted to frame having walls forming an aperture aligned with the opening in the segment.

Implementations of the twelfth general aspect may include one or more of the following features. The transportable fold-out at least partial enclosure where the partial storage enclosure includes opposed side edges, where each side edge is aligned with one of the front edges of the primary platforms in the folded position. The transportable fold-out at least partial enclosure and a support frame located in the partial storage enclosure the support frame supporting one or more components that are operated when the end wall assembly is in the extended position. The transportable fold-out at least partial enclosure where the support frame is configured to support one component of a set of different components, each component of the set of components configured to be supported by the support frame in a same position. The transportable fold-out at least partial enclosure where the support frame includes a first mount and each of the components of the set of different components includes a second mount complimentary with the first mount. The transportable fold-out at least partial enclosure where one component of the different set of components is a heater. The transportable fold-out at least partial enclosure where one component of the different set of components is a sink. The transportable fold-out at least partial enclosure where one component of the different set of components is a cooktop. The transportable fold-out at least partial enclosure where one component of the different set of components is a storage drawer. The transportable fold-out at least partial enclosure where one component of the different set of components is electrical outlets. The transportable fold-out at least partial enclosure where one component of the different set of components is a valve controlling water flow. The transportable fold-out at least partial enclosure where one component includes a toilet movable from within the partial storage enclosure through the opening to be used and returned to the partial storage enclosure through the opening for storage. The transportable fold-out at least partial enclosure where the partial storage enclosure includes at least one door through which the toilet can be removed when the end wall assembly is in the folded position.

A thirteenth general aspect includes a transportable fold-out at least partial enclosure, including: a frame. The transportable fold-out at least partial enclosure also includes a platform joined to the frame. The transportable fold-out at least partial enclosure also includes an end wall having joined to the platform to move to and from a storage position and an extended position, the end wall including an opening. The transportable fold-out at least partial enclosure also includes a partial storage enclosure mounted to the frame proximate the platform, the partial storage enclosure having walls forming an aperture aligned with the opening in the end wall when the end wall is in the extended position, the partial storage enclosure including at least one door allowing access into the partial storage enclosure apart from the aperture. The transportable fold-out at least partial enclosure also includes a component movable from within the partial storage enclosure through the opening to be used and returned to the partial storage enclosure through the opening for storage, where the at least one door of size to allow removal of the component through the door when the end wall is in the folded position.

Implementations of the thirteenth general aspect may include one or more of the following features. The transportable fold-out at least partial enclosure where the component includes a toilet. The transportable fold-out at least partial enclosure where the component is supported by a guide device for guided movement through the aperture. The transportable fold-out at least partial enclosure where the guide device includes spaced apart guide rails. The transportable fold-out at least partial enclosure where the guide device includes a movable tray. The transportable fold-out at least partial enclosure and further including holding devices to removably couple the component from the guide device and remove the component from the partial storage enclosure through the door. The transportable fold-out at least partial enclosure and further including an end wall assembly having two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position. The transportable fold-out at least partial enclosure and a set of four leveling legs removably secured to the frame, each leveling leg adjustable in length to level a portion of the at least partial enclosure when the primary platforms are in the extended position. The transportable fold-out at least partial enclosure where the side support structure is configured to be removably mounted to portions of the at least partial enclosure frame that are used to mount the leveling legs on one side of the at least partial transportable enclosure. The transportable fold-out at least partial enclosure where the side support structure includes support members configured to support a bicycle. The transportable fold-out at least partial enclosure where the side support structure includes support members configured to support a paddle board. The transportable fold-out at least partial enclosure where the side support structure includes support members configured to support a plurality of containers. The transportable fold-out at least partial enclosure where the frame includes a plurality of receivers on each side of the enclosure, each configured receiver configured to receive a lateral support adjustably extendable out of the receiver to provide support for the side support structure. The transportable fold-out at least partial enclosure where the support structure includes members extending over a top of the at least partial enclosure when the primary platforms are in the folded position. The transportable fold-out at least partial enclosure where the members include longitudinally extending members being parallel to inside edge, and members extending transverse to the inside edge. The transportable fold-out at least partial enclosure and further including lifting cables connected at a first end to each lateral support and at a second end to a lift ring. The transportable fold-out at least partial enclosure where the frame includes an elongated support with a hitch; where a cable is connected at a first end to the elongated support or the hitch and at a second end to the lift ring. The transportable fold-out at least partial enclosure where the frame includes an elongated support with a hitch; where a cable is connected at a first end to the elongated support or the hitch and at a second end to the lift ring. The transportable fold-out at least partial enclosure where the end of the at least one ground support includes a ski. The transportable fold-out at least partial enclosure where the frame includes a plurality of receivers, each configured receiver configured to receive a lateral support adjustably extendable out of the receiver to provide support for the at least one primary platform, each lateral support connected to a ground support includes a ski or a wheel. The transportable fold-out at least partial enclosure and further including a second primary platform having a major surface defining a primary plane, a second inside edge, an outside edge, a front edge, a back edge, the second inside edge being joined to the stationary platform on a side opposite the at least one the primary platform, the second platform having a folded position in which the associated primary plane and stationary plane are oblique or orthogonal, and an extended position where the second primary platform is unfolded from the stationary platform, where the frame includes a plurality of receivers on each side of the frame, each receiver configured to receive a lateral support adjustably extendable out of the receiver to provide support for the at least one primary platform or the second primary platform, each lateral support connected to a ground support includes a ski or a wheel. The transportable fold-out at least partial enclosure where a single ski is provided on each side of the frame. The transportable fold-out at least partial enclosure where the end of the at least one ground support includes a wheel A fourteenth general aspect includes a transportable fold-out at least partial enclosure, including: a frame; a stationary platform supported by the frame and having a major surface defining a stationary plane, a plurality of side edges, a front edge and a back edge; two primary platforms, each primary platform having a major surface defining a primary plane, an inside edge, an outside edge, a front edge, a back edge, the inside edge each primary platform being joined to the stationary platform, each primary platform having a folded position in which the associated primary plane and stationary plane are oblique or orthogonal, and each primary platform having an extended position where the primary platform is unfolded from the stationary platform; and a side support structure removably secured to the frame when the primary platforms are in the folded position, the side support structure configured to support an article in an elevated position when the primary platforms are folded.

Implementations of the fourteenth general aspect may include one or more of the following features. The transportable fold-out at least partial enclosure and further including an end wall assembly having two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position. The transportable fold-out at least partial enclosure and a set of four leveling legs removably secured to the frame, each leveling leg adjustable in length to level a portion of the at least partial enclosure when the primary platforms are in the extended position. The transportable fold-out at least partial enclosure where the side support structure is configured to be removably mounted to portions of the at least partial enclosure frame that are used to mount the leveling legs on one side of the at least partial transportable enclosure. The transportable fold-out at least partial enclosure where the side support structure includes support members configured to support a bicycle. The transportable fold-out at least partial enclosure where the side support structure includes support members configured to support a paddle board. The transportable fold-out at least partial enclosure where the side support structure includes support members configured to support a plurality of containers. The transportable fold-out at least partial enclosure where the frame includes a plurality of receivers on each side of the enclosure, each configured receiver configured to receive a lateral support adjustably extendable out of the receiver to provide support for the side support structure. The transportable fold-out at least partial enclosure where the support structure includes members extending over a top of the at least partial enclosure when the primary platforms are in the folded position. The transportable fold-out at least partial enclosure where the members include longitudinally extending members being parallel to inside edge, and members extending transverse to the inside edge. The transportable fold-out at least partial enclosure and further including lifting cables connected at a first end to each lateral support and at a second end to a lift ring. The transportable fold-out at least partial enclosure where the frame includes an elongated support with a hitch; where a cable is connected at a first end to the elongated support or the hitch and at a second end to the lift ring. The transportable fold-out at least partial enclosure where the frame includes an elongated support with a hitch; where a cable is connected at a first end to the elongated support or the hitch and at a second end to the lift ring. The transportable fold-out at least partial enclosure where the end of the at least one ground support includes a ski. The transportable fold-out at least partial enclosure where the frame includes a plurality of receivers, each configured receiver configured to receive a lateral support adjustably extendable out of the receiver to provide support for the at least one primary platform, each lateral support connected to a ground support includes a ski or a wheel. The transportable fold-out at least partial enclosure and further including a second primary platform having a major surface defining a primary plane, a second inside edge, an outside edge, a front edge, a back edge, the second inside edge being joined to the stationary platform on a side opposite the at least one the primary platform, the second platform having a folded position in which the associated primary plane and stationary plane are oblique or orthogonal, and an extended position where the second primary platform is unfolded from the stationary platform, where the frame includes a plurality of receivers on each side of the frame, each receiver configured to receive a lateral support adjustably extendable out of the receiver to provide support for the at least one primary platform or the second primary platform, each lateral support connected to a ground support includes a ski or a wheel. The transportable fold-out at least partial enclosure where a single ski is provided on each side of the frame. The transportable fold-out at least partial enclosure where the end of the at least one ground support includes a wheel.

A fifteenth general aspect includes a transportable fold-out at least partial enclosure, including: a frame; a stationary platform supported by the frame and having a major surface defining a stationary plane, a plurality of side edges, a front edge and a back edge; two primary platforms, each primary platform having a major surface defining a primary plane, an inside edge, an outside edge, a front edge, a back edge, the inside edge each primary platform being joined to the stationary platform, each primary platform having a folded position in which the associated primary plane and stationary plane are oblique or orthogonal, and each primary platform having an extended position where the primary platform is unfolded from the stationary platform; where the frame includes a plurality of receivers on each side of the enclosure, each configured receiver configured to receive a lateral support adjustably extendable out of the receiver to provide support for the side support structure. The transportable fold-out at least partial enclosure also includes lifting cables connected at a first end to each lateral support and at a second end to a lift ring.

Implementations of the fifteenth general aspect may include one or more of the following features. The transportable fold-out at least partial enclosure where the frame includes an elongated support with a hitch; where a cable is connected at a first end to the elongated support or the hitch and at a second end to the lift ring. The transportable fold-out at least partial enclosure where the end of the at least one ground support includes a ski. The transportable fold-out at least partial enclosure where the frame includes a plurality of receivers, each configured receiver configured to receive a lateral support adjustably extendable out of the receiver to provide support for the at least one primary platform, each lateral support connected to a ground support includes a ski or a wheel. The transportable fold-out at least partial enclosure and further including a second primary platform having a major surface defining a primary plane, a second inside edge, an outside edge, a front edge, a back edge, the second inside edge being joined to the stationary platform on a side opposite the at least one the primary platform, the second platform having a folded position in which the associated primary plane and stationary plane are oblique or orthogonal, and an extended position where the second primary platform is unfolded from the stationary platform, where the frame includes a plurality of receivers on each side of the frame, each receiver configured to receive a lateral support adjustably extendable out of the receiver to provide support for the at least one primary platform or the second primary platform, each lateral support connected to a ground support includes a ski or a wheel. The transportable fold-out at least partial enclosure where a single ski is provided on each side of the frame. The transportable fold-out at least partial enclosure where the end of the at least one ground support includes a wheel.

A sixteenth general aspect includes a transportable fold-out at least partial enclosure, including: a frame; a stationary platform supported by the frame and having a major surface defining a stationary plane, a plurality of side edges, a front edge and a back edge; at least one primary platform having a major surface defining a primary plane, an inside edge, an outside edge, a front edge, a back edge, the inside edge being joined to the stationary platform such that the primary platform has a folded position in which the associated primary plane and stationary plane are oblique or orthogonal, and an extended position where the primary platform is unfolded from the stationary platform; at least one ground support having a ground engaging end configured to allow movement of the at least partial enclosure with the primary platform unfolded.

Implementations of the sixteenth general aspect may include one or more of the following features. The transportable fold-out at least partial enclosure where the end of the at least one ground support includes a ski. The transportable fold-out at least partial enclosure where the frame includes a plurality of receivers, each configured receiver configured to receive a lateral support adjustably extendable out of the receiver to provide support for the at least one primary platform, each lateral support connected to a ground support includes a ski or a wheel. The transportable fold-out at least partial enclosure and further including a second primary platform having a major surface defining a primary plane, a second inside edge, an outside edge, a front edge, a back edge, the second inside edge being joined to the stationary platform on a side opposite the at least one the primary platform, the second platform having a folded position in which the associated primary plane and stationary plane are oblique or orthogonal, and an extended position where the second primary platform is unfolded from the stationary platform, where the frame includes a plurality of receivers on each side of the frame, each receiver configured to receive a lateral support adjustably extendable out of the receiver to provide support for the at least one primary platform or the second primary platform, each lateral support connected to a ground support includes a ski or a wheel. The transportable fold-out at least partial enclosure where a single ski is provided on each side of the frame. The transportable fold-out at least partial enclosure where the end of the at least one ground support includes a wheel.

A seventeenth general aspect includes a transportable fold-out enclosure, including: a frame. The transportable fold-out enclosure also includes a floor secured to the frame; and two wall assemblies where the wall assemblies are disposed opposite each other and pivotally joined to the floor with a hinge, each wall assembly being movable from a first position where the wall assembly is lying on the floor to a second position where the wall assembly is away from the floor. The transportable fold-out enclosure also includes a canopy joined to and extending between the wall assemblies to form the enclosure, the canopy including at least one fabric material, the fabric material connected to and extending between the wall assemblies, where the fabric material includes a first portion that is selectively disconnectable from a second portion that secured to at least one of the wall assemblies.

Implementations of the seventeenth general aspect may include one or more of the following features. The transportable fold-out enclosure and further including a fastener to selectively connect the first portion to the second portion. The transportable fold-out enclosure where one of the first portion and the second portion includes a third portion to cover the fastener when fastener connects the first portion to the second portion. The transportable fold-out enclosure where the fastener includes at least one of a zipper, snaps, clips, ties, or a hook and loop fastener. The transportable fold-out enclosure and further including a second fabric material connected to and extending between the wall assemblies. The transportable fold-out enclosure where the second fabric material is exterior to the fabric material. The transportable fold-out enclosure where the floor includes foldable platforms where the fabric material is connected to the foldable platforms. The transportable fold-out enclosure where the fabric material connected to the foldable platforms includes second fabric material a third portion that is selectively disconnectable from a fourth portion that secured to at least one of platforms. The transportable fold-out enclosure and further including a fastener to selectively connect the third portion to the fourth portion. The transportable fold-out enclosure where the fastener includes at least one of a zipper, snaps, clips, ties, or a hook and loop fastener. The transportable fold-out enclosure where one of the third portion and the fourth portion includes a fifth portion to cover the fastener when fastener connects the third portion to the fourth portion. The transportable fold-out enclosure where the one or more separators extend along a length of the canopy forming a roof for the transportable enclosure. The transportable fold-out enclosure where the one or more separators are space apart from each other along the length of the canopy forming the roof of the transportable enclosure. The transportable fold-out enclosure where the one or more separators includes at least one of an elongated structure of foam, loose material and/or an inflatable bladder. The transportable fold-out enclosure where the one or more separators is permanently fixed to at least one of the fabrics. The transportable fold-out enclosure where the one or more separators are removably connectable to at least one of the fabrics. The transportable fold-out enclosure where the one or more separators is joined to the at least one fabrics with at least one of a zipper, snaps, clips, ties, or a hook and loop fastener. The transportable fold-out enclosure where the separator includes a support sleeve and an inner filler. The transportable fold-out enclosure where the second canopy is joined to an edge of one of the wall assemblies to be lifted to an upright position with movement of the wall assembly. The transportable fold-out enclosure where the second canopy is joined to the first canopy. The transportable fold-out enclosure where the second canopy includes a first portion that is selectively connectable to a second portion that secured to at least one of the wall assemblies or to the first canopy. The transportable fold-out enclosure and further including a fastener to selectively connect the first portion to the second portion. The transportable fold-out enclosure where the fastener includes at least one of a zipper, snaps, clips, ties, or a hook and loop fastener. The transportable fold-out enclosure where the support frame contacts the ground to support the second canopy. The transportable fold-out enclosure where the support frame does not contact the ground to support the second canopy. The transportable fold-out enclosure where lower portions of the support frame are connected to the end wall assembly. The transportable fold-out enclosure where the support frame includes a plurality of hoops. The transportable fold-out enclosure where the support frame includes spaced apart hoops. The transportable fold-out enclosure where members forming the support frame are inserted in sleeves of the second canopy. The transportable fold-out enclosure and further including fabric walls extending from the second canopy. The transportable fold-out enclosure where one or more of the members is adjustable in length to tension the second canopy after the support frame is holding the second canopy. The transportable fold-out enclosure and further including one or more panels connected to the frame, floor or the first canopy to extend down to ground around at least some of the sides of the floor to inhibit air flow at least in part under the floor.

An eighteenth general aspect includes a transportable fold-out enclosure, including: frame; a floor secured to the frame; two wall assemblies where the wall assemblies are disposed opposite each other and pivotally joined to the floor with a hinge, each wall assembly being movable from a first position where the wall assembly is lying on the floor to a second position where the wall assembly is away from the floor; a canopy joined to and extending between the wall assemblies to form an enclosure, the canopy including an outer fabric material and an inner fabric material spaced apart from the outer fabric material, each of the outer fabric materials connected to and extending between the wall assemblies; one or more separators disposed between the inner fabric material and the outer fabric material.

Implementations of the eighteenth general aspect may include one or more of the following features. The transportable fold-out enclosure where the one or more separators extend along a length of the canopy forming a roof for the transportable enclosure. The transportable fold-out enclosure where the one or more separators are space apart from each other along the length of the canopy forming the roof of the transportable enclosure. The transportable fold-out enclosure where the one or more separators includes at least one of an elongated structure of foam, loose material and/or an inflatable bladder. The transportable fold-out enclosure where the one or more separators is permanently fixed to at least one of the fabrics. The transportable fold-out enclosure where the one or more separators are removably connectable to at least one of the fabrics. The transportable fold-out enclosure where the one or more separators is joined to the at least one fabrics with at least one of a zipper, snaps, clips, ties, or a hook and loop fastener. The transportable fold-out enclosure where the separator includes a support sleeve and an inner filler. The transportable fold-out enclosure where the second canopy is joined to an edge of one of the wall assemblies to be lifted to an upright position with movement of the wall assembly. The transportable fold-out enclosure where the second canopy is joined to the first canopy. The transportable fold-out enclosure where the second canopy includes a first portion that is selectively connectable to a second portion that secured to at least one of the wall assemblies or to the first canopy. The transportable fold-out enclosure and further including a fastener to selectively connect the first portion to the second portion. The transportable fold-out enclosure where the fastener includes at least one of a zipper, snaps, clips, ties, or a hook and loop fastener. The transportable fold-out enclosure where the support frame contacts the ground to support the second canopy. The transportable fold-out enclosure where the support frame does not contact the ground to support the second canopy. The transportable fold-out enclosure where lower portions of the support frame are connected to the end wall assembly. The transportable fold-out enclosure where the support frame includes a plurality of hoops. The transportable fold-out enclosure where the support frame includes spaced apart hoops. The transportable fold-out enclosure where members forming the support frame are inserted in sleeves of the second canopy. The transportable fold-out enclosure and further including fabric walls extending from the second canopy. The transportable fold-out enclosure where one or more of the members is adjustable in length to tension the second canopy after the support frame is holding the second canopy. The transportable fold-out enclosure and further including one or more panels connected to the frame, floor or the first canopy to extend down to ground around at least some of the sides of the floor to inhibit air flow at least in part under the floor.

A nineteenth general aspect includes a transportable fold-out enclosure, including: a frame; a floor secured to the frame; two wall assemblies where the wall assemblies are disposed opposite each other and pivotally joined to the floor with a hinge, each wall assembly being movable from a first position where the wall assembly is lying on the floor to a second position where the wall assembly is away from the floor; a first canopy joined to extending between the wall assemblies to form the enclosure, the first canopy including at least an outer fabric material; a second canopy joined to one of the wall assemblies or to the first canopy to extend therefrom; and a support frame to support the second canopy remote from the wall assembly or the first canopy to form a at least a roof structure.

Implementations of the nineteenth general aspect may include one or more of the following features. The transportable fold-out enclosure where the second canopy is joined to an edge of one of the wall assemblies to be lifted to an upright position with movement of the wall assembly. The transportable fold-out enclosure where the second canopy is joined to the first canopy. The transportable fold-out enclosure where the second canopy includes a first portion that is selectively connectable to a second portion that secured to at least one of the wall assemblies or to the first canopy. The transportable fold-out enclosure and further including a fastener to selectively connect the first portion to the second portion. The transportable fold-out enclosure where the fastener includes at least one of a zipper, snaps, clips, ties, or a hook and loop fastener. The transportable fold-out enclosure where the support frame contacts the ground to support the second canopy. The transportable fold-out enclosure where the support frame does not contact the ground to support the second canopy. The transportable fold-out enclosure where lower portions of the support frame are connected to the end wall assembly. The transportable fold-out enclosure where the support frame includes a plurality of hoops. The transportable fold-out enclosure where the support frame includes spaced apart hoops. The transportable fold-out enclosure where members forming the support frame are inserted in sleeves of the second canopy. The transportable fold-out enclosure and further including fabric walls extending from the second canopy. The transportable fold-out enclosure where one or more of the members is adjustable in length to tension the second canopy after the support frame is holding the second canopy. The transportable fold-out enclosure and further including one or more panels connected to the frame, floor or the first canopy to extend down to ground around at least some of the sides of the floor to inhibit air flow at least in part under the floor.

A twentieth general aspect includes a transportable fold-out enclosure, including: a frame; a floor secured to the frame; two wall assemblies where the wall assemblies are disposed opposite each other and pivotally joined to the floor with a hinge, each wall assembly being movable from a first position where the wall assembly is lying on the floor to a second position where the wall assembly is away from the floor; a canopy joined to and extending between the wall assemblies to form an enclosure, the canopy including an outer fabric material the outer fabric materials connected to and extending between the wall assemblies; and one or more fabric panels extending from the floor to ground.

Implementations of the twentieth general aspect may include one or more of the following features. The transportable fold-out enclosure where the one or more fabric panels is selectively connectable to the floor. The transportable fold-out enclosure and further including a fastener to selectively connect the one or more fabric panels to the floor. The transportable fold-out enclosure where the one or more fabric panels includes a first portion that is selectively connectable to a second portion that secured to the canopy. The transportable fold-out enclosure where the one or more fabric panels are folded with the canopy when the wall assemblies are in the first position. The transportable fold-out at least partial enclosure where each of the pair of side walls are pivotally joined to the floor. The transportable fold-out at least partial enclosure where each of the pair of side walls are pivotally joined to the end walls. The transportable fold-out at least partial enclosure and a second portion movably joined to each side wall. The transportable fold-out at least partial enclosure where the second portion slides relative to each corresponding side wall. The transportable fold-out at least partial enclosure where the second portion pivots relative to each corresponding side wall.

A twenty-first general aspect includes a transportable fold-out at least partial enclosure, including: a frame; a floor secured to the frame; two wall assemblies where the wall assemblies are disposed opposite each other and pivotally joined to the floor with a hinge, each wall assembly being movable from a first position where the wall assembly is lying on the floor to a second position where the wall assembly is away from the floor; a pair of pivoting opposed side walls extending between the wall assemblies; and a canopy joined to and extending between the wall assemblies to form an enclosure, the canopy including at least an outer fabric material connected to and extending between the wall assemblies and the floor, the canopy enclosing the pair of side walls within the enclosure.

Implementations of the twenty-first general aspect may include one or more of the following features. The transportable fold-out at least partial enclosure where each of the pair of side walls are pivotally joined to the floor. The transportable fold-out at least partial enclosure where each of the pair of side walls are pivotally joined to the end walls. The transportable fold-out at least partial enclosure and a second portion movably joined to each side wall. The transportable fold-out at least partial enclosure where the second portion slides relative to each corresponding side wall. The transportable fold-out at least partial enclosure where the second portion pivots relative to each corresponding side wall.

A twenty-second general aspect includes a transportable fold-out at least partial enclosure, including: a frame; a floor secured to the frame; two wall assemblies where the wall assemblies are disposed opposite each other and pivotally joined to the floor with a hinge, each wall assembly being movable from a first position where the wall assembly is lying on the floor to a second position where the wall assembly is away from the floor; a pair of pivoting opposed side walls extending between the wall assemblies, where each opposed side wall engages a notch in each of the wall assemblies.

A twenty-third general aspect includes a transportable fold-out at least partial enclosure, including: a frame; a floor secured to the frame; two wall assemblies where the wall assemblies are disposed opposite each other and pivotally joined to the floor with a hinge, each wall assembly being movable from a first position where the wall assembly is lying on the floor to a second position where the wall assembly is away from the floor; a pair of pivoting opposed side walls extending between the wall assemblies, each side wall being hinged to one of the wall assemblies.

A twenty-fourth general aspect includes a transportable fold-out at least partial enclosure, including: a frame; a stationary platform supported by the frame and having a major surface defining a stationary plane, a plurality of side edges, a front edge and a back edge; two primary platforms, each primary platform having a major surface defining a primary plane, an inside edge, an outside edge, a front edge, a back edge, the inside edge each primary platform being joined to the stationary platform, each primary platform having a folded position in which the associated primary plane and stationary plane are oblique or orthogonal, and each primary platform having an extended position where the primary platform is unfolded from the stationary platform; and a pair of pivoting opposed side walls extending between the wall assemblies, each side wall being hinged to one of the primary platforms where the side walls are hinged so as to lie to the exterior of the primary platforms when the primary platforms are in the folded position.

Implementations of the twenty-fourth general aspect may include one or more of the following features. The transportable fold-out at least partial enclosure and a second portion movably joined to each side wall. The transportable fold-out at least partial enclosure where the second portion slides relative to each corresponding side wall. The transportable fold-out at least partial enclosure where the second portion pivots relative to each corresponding side wall. The transportable fold-out at least partial enclosure where a canopy extends between the endwalls. The transportable fold-out at least partial enclosure where the canopy is connected to the primary platforms. The transportable fold-out at least partial enclosure where the canopy is connected to a top portion of each side wall. The transportable fold-out at least partial enclosure where each the sidewalls are joined to the endwalls where the canopy is located on an inside of the enclosure. The transportable fold-out at least partial enclosure where the lower protection assembly includes a panel secured to at least some of the plurality of spaced apart support members. The transportable fold-out at least partial enclosure where at least some of the plurality of spaced apart support members extend longitudinally below a lower panel of the lower body portion. The transportable fold-out at least partial enclosure where at least some of the plurality of spaced apart support members extends along each side of the lower body portion. The transportable fold-out at least partial enclosure where at least some of the plurality of spaced apart support members extends along a first side of the lower body portion, under a lower body panel of the lower body portion and upwardly along a second side of the lower body portion. The transportable fold-out at least partial enclosure where the lower protection assembly includes a plurality of spaced apart support members. The transportable fold-out at least partial enclosure where the cover member is movably joined to the one primary platform using a hinge. The transportable fold-out at least partial enclosure and further including spaced apart fasteners on a side of the cover member opposite and edge joined to the one primary platform.

A twenty-fifth general aspect includes a transportable fold-out at least partial enclosure, including: a frame having wheels; a stationary platform supported by the frame and having a major surface defining a stationary plane, a plurality of side edges, a front edge and a back edge; a lower body portion forming storage below the stationary platform; and a lower protection assembly configured to protect the lower body from damage.

Implementations of the twenty-fifth general aspect may include one or more of the following features. The transportable fold-out at least partial enclosure where the lower protection assembly includes a panel secured to at least some of the plurality of spaced apart support members. The transportable fold-out at least partial enclosure where at least some of the plurality of spaced apart support members extend longitudinally below a lower panel of the lower body portion. The transportable fold-out at least partial enclosure where at least some of the plurality of spaced apart support members extends along each side of the lower body portion. The transportable fold-out at least partial enclosure where at least some of the plurality of spaced apart support members extends along a first side of the lower body portion, under a lower body panel of the lower body portion and upwardly along a second side o the lower body portion. The transportable fold-out at least partial enclosure where the lower protection assembly includes a plurality of spaced apart support members. The transportable fold-out at least partial enclosure where the cover member is movably joined to the one primary platform using a hinge. The transportable fold-out at least partial enclosure and further including spaced apart fasteners on a side of the cover member opposite and edge joined to the one primary platform.

A twenty-sixth general aspect includes a transportable fold-out at least partial enclosure, including: a at least partial enclosure frame having a hitch. The transportable fold-out at least partial enclosure also includes a stationary platform joined to the at least partial enclosure frame and having a major surface defining a stationary plane, a plurality of side edges, a front edge and a back edge. The transportable fold-out at least partial enclosure also includes a pair of primary platforms, each primary platform having a major surface defining a primary plane, an inside edge, an outside edge, a front edge, a back edge, the inside edge being joined to one of side edges of the stationary platform such that the primary platforms are joined to opposite side edges of the stationary platform, each primary platform having a folded position in which the primary plane and stationary plane are oblique or orthogonal, and each primary platform having an extended position where the primary platform is unfolded from the stationary platform. The transportable fold-out at least partial enclosure also includes a pair of end wall assemblies where a first end wall assembly is joined to front edges of the primary and stationary platforms and a second end wall assembly is joined to back edges of the primary and stationary platforms, each end wall assembly having three segments, each segment having a major surface defining a segment plane, side edges, a top edge and a bottom edge, the side edges of each pair of adjacent segments being joined to each other, the bottom edges of each segment being joined to one of front or back edges of the stationary platform and the primary platforms, each end wall assembly having an extended position in which the segment planes are at an angle to both the stationary plane and the primary plane, and each end wall assembly having a folded position. The transportable fold-out at least partial enclosure also includes a cover member movably joined to one side edge of the one of the primary platforms to move to and from a cover position where the cover covers at least space between the primary platforms when the primary platforms are in the folded positions.

Implementations of the twenty-sixth general aspect may include one or more of the following features. The transportable fold-out at least partial enclosure where the cover member is movably joined to the one primary platform using a hinge. The transportable fold-out at least partial enclosure and further including spaced apart fasteners on a side of the cover member opposite and edge joined to the one primary platform.

A twenty-seventh general aspect includes a transportable fold-out at least partial enclosure, including: an at least partial enclosure frame. The transportable fold-out at least partial enclosure also includes a stationary platform joined to the at least partial enclosure frame and having a major surface defining a stationary plane, a plurality of side edges, a front edge and a back edge. The transportable fold-out at least partial enclosure also includes a pair of primary platforms, each primary platform having a major surface defining a primary plane, an inside edge, an outside edge, a front edge, a back edge, the inside edge being joined to one of side edges of the stationary platform such that the primary platforms are joined to opposite side edges of the stationary platform, each primary platform having a folded position in which the primary plane and stationary plane are oblique or orthogonal, and each primary platform having an extended position where the primary platform is unfolded from the stationary platform, where at least one primary platform includes an aperture extending through said at least primary platform. The transportable fold-out at least partial enclosure also includes a pair of end wall assemblies where a first end wall assembly is joined to front edges of the primary and stationary platforms and a second end wall assembly is joined to back edges of the primary and stationary platforms, each end wall assembly having three segments, each segment having a major surface defining a segment plane, side edges, a top edge and a bottom edge, the side edges of each pair of adjacent segments being joined to each other, the bottom edges of each segment being joined to one of front or back edges of the stationary platform and the primary platforms, each end wall assembly having an extended position in which the segment planes are at an angle to both the stationary plane and the primary plane, and each end wall assembly having a folded position.

Implementations of the twenty-seventh may include one or more of the following features. The transportable fold-out at least partial enclosure where each aperture incudes a removable cover. The transportable fold-out at least partial enclosure where at least one of the primary platforms includes a storage bin on a side opposite the major surface of the primary platform. The transportable fold-out at least partial enclosure where the storage bin includes a door on the storage bin allowing access into the storage plan from the outside the enclosure. The transportable fold-out at least partial enclosure and further including cylinders insertable through the apertures of length to come at least proximate to ground surface such as ice. The transportable fold-out at least partial enclosure where each aperture incudes a removable cover. The transportable fold-out at least partial enclosure and further including cylinders insertable through the apertures of length to come at least proximate to a ground surface such as an ice surface.

A twenty-eighth general aspect includes a transportable fold-out at least partial enclosure, including: a frame. The transportable fold-out at least partial enclosure also includes a stationary platform joined to the at least partial enclosure frame and having a major surface defining a stationary plane, a plurality of side edges, a front edge and a back edge; a lower body portion located below the stationary platform, where the lower body portion includes at least on aperture in a storage location below the stationary platform. The transportable fold-out at least partial enclosure also includes a pair of primary platforms, each primary platform having a major surface defining a primary plane, an inside edge, an outside edge, a front edge, a back edge, the inside edge being joined to one of side edges of the stationary platform such that the primary platforms are joined to opposite side edges of the stationary platform, each primary platform having a folded position in which the primary plane and stationary plane are oblique or orthogonal, and each primary platform having an extended position where the primary platform is unfolded from the stationary platform, where at least one primary platform includes an aperture extending through said at least primary platform. The transportable fold-out at least partial enclosure also includes a pair of end wall assemblies where a first end wall assembly is joined to front edges of the primary and stationary platforms and a second end wall assembly is joined to back edges of the primary and stationary platforms, each end wall assembly having three segments, each segment having a major surface defining a segment plane, side edges, a top edge and a bottom edge, the side edges of each pair of adjacent segments being joined to each other, the bottom edges of each segment being joined to one of front or back edges of the stationary platform and the primary platforms, each end wall assembly having an extended position in which the segment planes are at an angle to both the stationary plane and the primary plane, and each end wall assembly having a folded position.

Implementations of the twenty-eighth general aspect may include one or more of the following features. The transportable fold-out at least partial enclosure where each aperture incudes a removable cover. The transportable fold-out at least partial enclosure and further including cylinders insertable through the apertures of length to come at least proximate to a ground surface such as an ice surface.

It should be noted any of the general aspects may be combined with any other general aspect as well as any of the features thereof.

BRIEF DESCRIPTION OF THE DRAWINGS

FIG. 5 is a rear-elevational view of the enclosure with parts removed.
FIG. 7 is a rear-elevational view of the enclosure with parts removed.
FIG. 7A is a rear elevational view of the enclosure with parts removed.
FIG. 12 is a perspective view of the enclosure with parts removed.
FIG. 20B is a perspective view of a portion of a wall assembly.
FIG. 21 is a detailed view of a portion of a roof of the enclosure.
FIG. 23 is a detailed view of a portion of a wall.

DETAILED DESCRIPTION OF ILLUSTRATIVE EMBODIMENTS

Aspects of the invention will be described with respect to fold-out transportable partial or complete enclosure that in one embodiment is particularly advantageously used as a camper such as but not limited to be mounted to a trailer. However, it should be understood that a trailer mounted fold-out camper is but one embodiment where aspects of the invention can be incorporated on other folding or expanding trailers, or on other forms of trailers that are not necessarily used for camping or even on equipment that is generally pulled by another vehicle or device. Likewise aspects of the invention can be used as a fold-out partial or complete enclosure mounted to a vehicle such as a pickup, truck or boat or merely carried by such vehicles or trailers and when deployed is deployed away from the transport vehicle or trailer. Below a "camper" is referenced; however, as indicated above this is to be understood generally as an enclosure when the canopy or other roof structure is present, but since the canopy or roof structure is removable, aspects of the invention also pertain to a partial enclosure.

General Description

Figure 4:
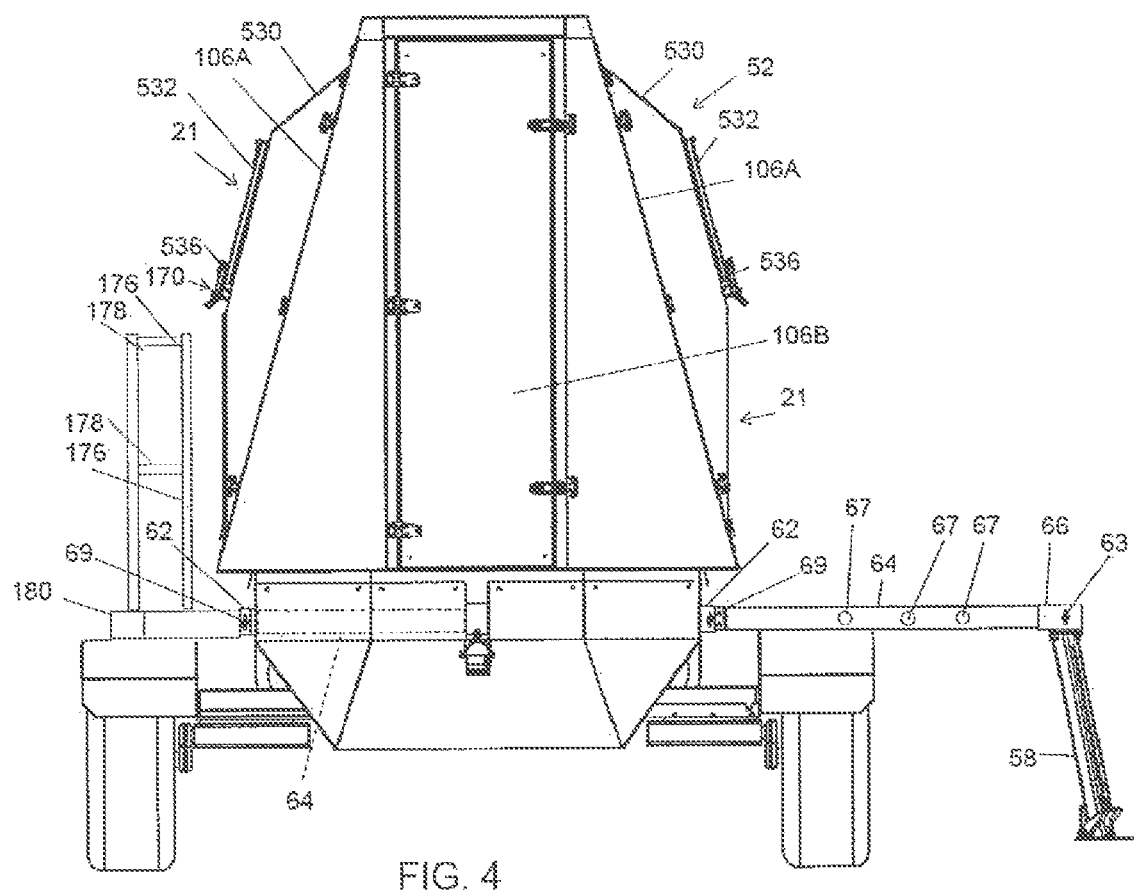
FIG. 4 is a front-elevational view of the enclosure.

The camper 10 as shown in the Figures and described herein has some features also present in the camper described in U.S. Pat. Nos. 7,967,369 and 9,205,881 the contents of which are hereby incorporated by reference in their entirety. In the exemplary embodiment illustrated, the camper 10 includes a trailer frame 15, at least one primary folding platform 21, at least one wall assembly 23 and if desired when mounted or carried by a trailer a wheel assembly 25, which can also be extendible (FIG. 4) and retractable (FIG. 1) in width if desired. These components cooperatively form a fold-out camper 10 that has a small profile when in a folded position 13 as illustrated in FIGS. 2 and 4 that can be used on both narrow and wide paths. Additionally, the camper 10 has a large covered living/storage area when in an opened position 14 (FIG. 1) where a flexible covering 17 is joined to and extends between the wall assemblies 23 and the primary platforms 21.

Figure 1:
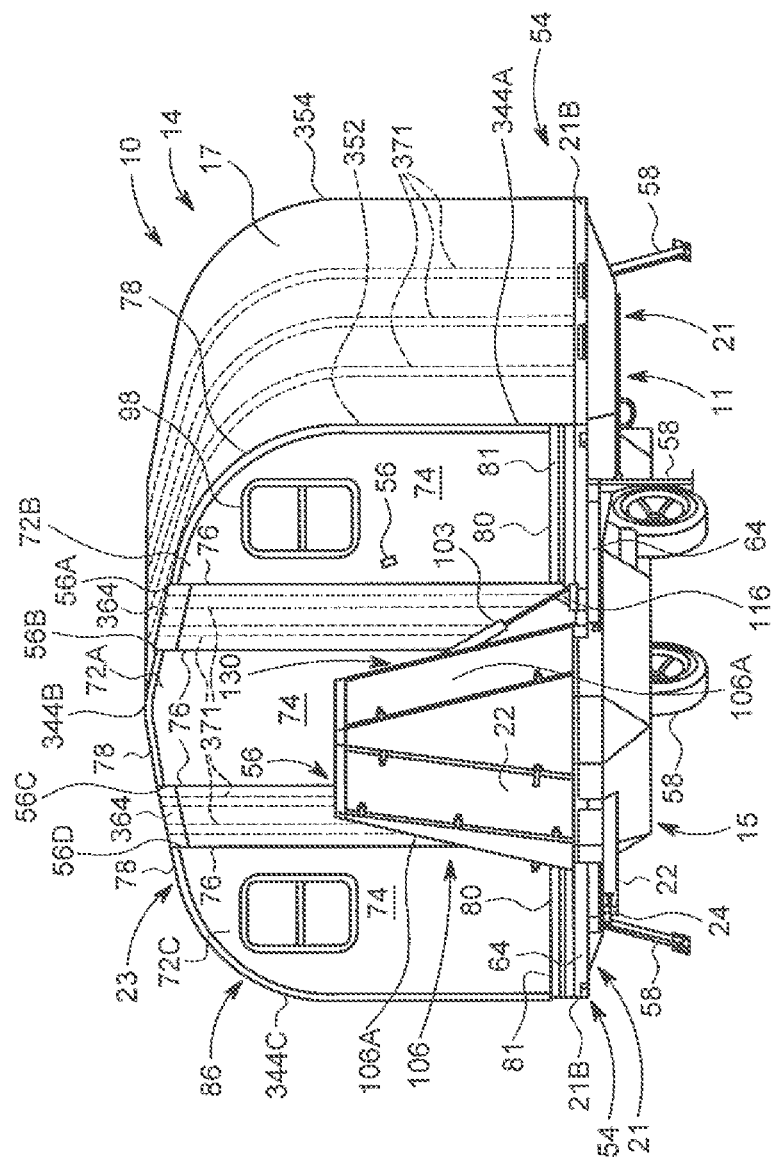
FIG. 1 is a perspective view an enclosure.
Figure 2:
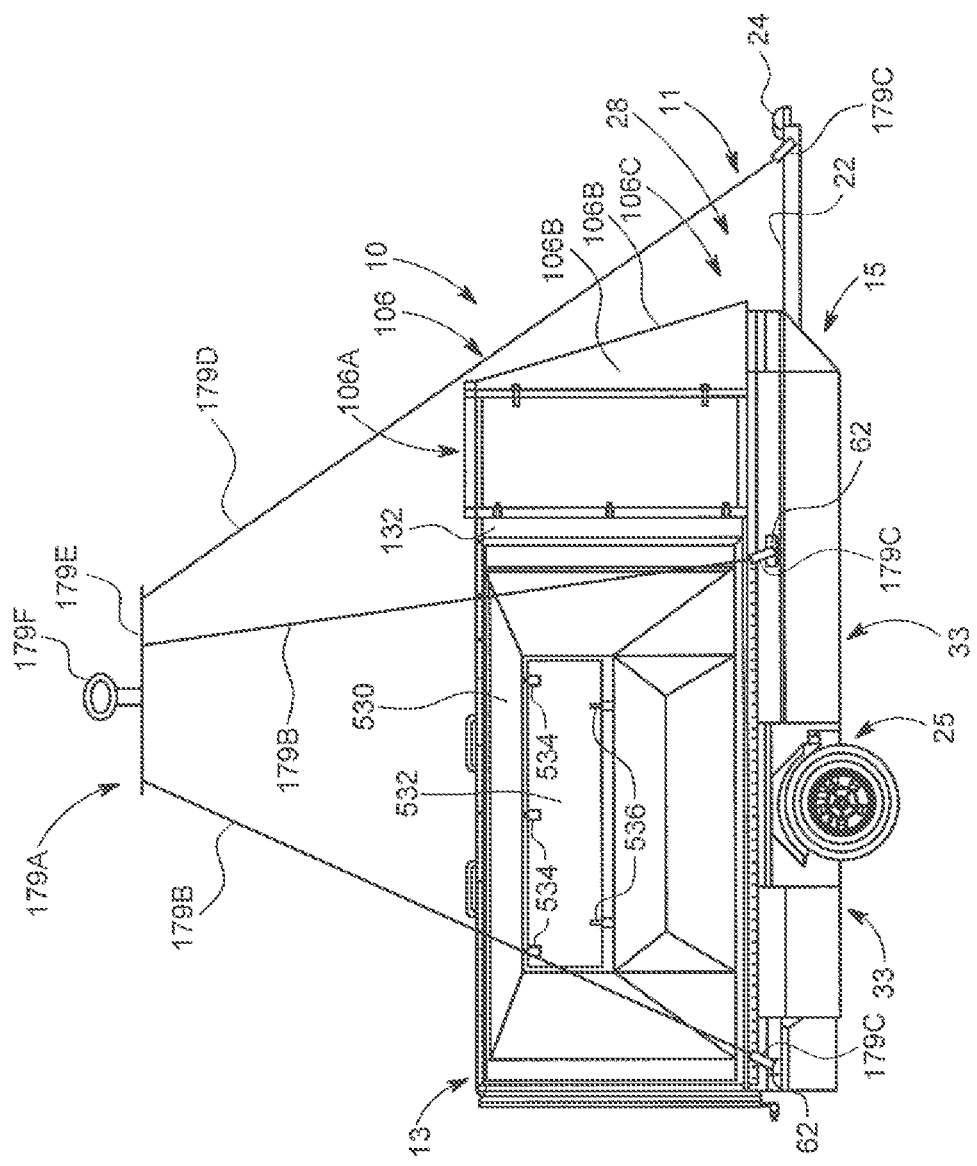
FIG. 2 is a side-elevational view of the enclosure.
Figure 3:
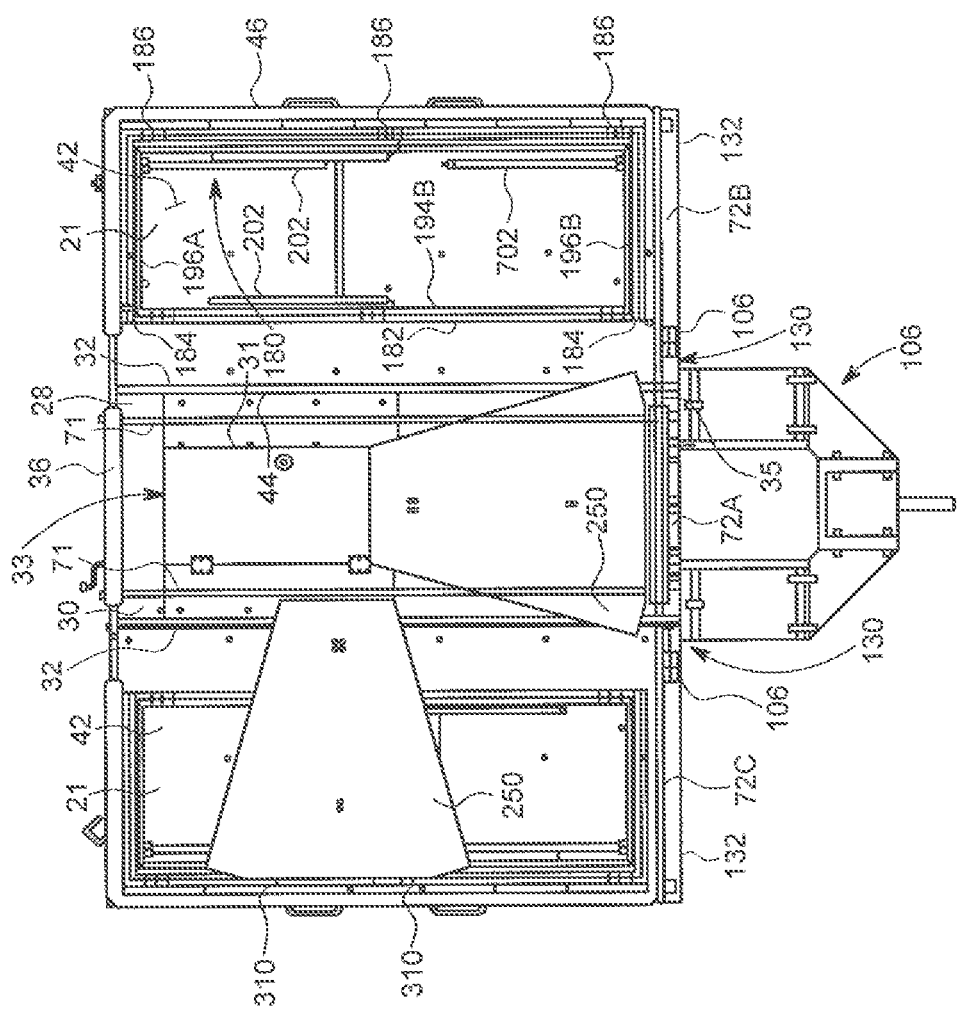
FIG. 3 is a top-plane view of the enclosure with parts removed.

As illustrated in FIGS. 1 and 2, the trailer frame 15 can have a tongue 22 joined to a hitch 24. The hitch 24 can, in turn, be joined to a vehicle, such as a car or an all-terrain vehicle, or any other motor-powered object that is configured to receive the hitch 24 and pull the camper 10. These components are of standard size, strength and materials as are found throughout the field of trailers. The tongue 22 is joined to a frame 15 having stationary platform 28, which can be of any material of suitable size and strength. The stationary platform 28 forms a center portion of the floor between the primary platforms 21 when the camper 10 is in the expanded, open position 14. As such, the stationary platform 28 may be insulated or have a floor covering, such as carpet. The stationary platform 28/frame 15 can also include one or several storage compartments 33 (FIG. 2) that are accessible through at least one access door 31 (See. FIG. 3 where the flexible covering 17 has been removed). If desired, access door(s) can be provided along the side(s) of the frame 15 so as to allow access when the camper 10 is in the folded position 13.

Referring to FIG. 3, the stationary platform 28 has a major surface 30 defining a stationary plane 31, a plurality of side edges 32, a front edge 35 and a back edge 36. The stationary platform 28 is joined to and supported by frame 15. The camper 10 includes at least one primary folding platform 21. The primary folding platform 21 has a major surface 42, an inside edge 44 and an outside edge 46. In one embodiment as illustrated, there are two primary platforms 21. The inside edge 44 of the primary platform 21 is desirably joined to one side edge 32 of the stationary platform 28 via a hinge that is configured in a preferred embodiment to have the major surfaces 42 generally parallel to each other and the stationary platform 28, if not co-planar.

Referring to FIGS. 1 and 4, ground supports 58 are provided to support each of the primary platforms 21 in the extended, open position 14. Ground supports 58 are configured to engage a ground surface, e.g., dirt, sand, tar, gravel, etc. The ground supports 58 are part of a stabilizing support system, which include receivers 62 mounted to frame 15 that receive ends of lateral support members 64. The primary platforms 21 rest upon the pair of lateral supports 64 provided on each side of the camper 10 in the unfolded position 14.

Ground supports 58 are removably attached to ends of the lateral supports 64 remote from receivers 62 where, for example, ground supports 58 each include ends 66 similar in size to receivers 62 such that ends of the lateral supports 64 can extend therein. Suitable pins, bolts or the like indicated at 63 can extend through apertures in the ends 66 and lateral supports 64 to secure each of the ground supports 58 in place. Likewise, pins, bolts or the like 69 can extend through apertures in the receivers 62 and lateral supports 64 to secure each of the lateral supports 64 to the trailer frame 15. In a further embodiment discussed below, the lateral supports 64 can be adjustable with respect to extension from the frame 15. This is illustrated in FIG. 4 where the left side lateral support 64 extends only partway from the frame 15 whereas the remainder of the lateral support 64 extends into a middle portion of the frame 15 below stationary frame 28. The right side lateral support 64 illustrates an aperture 67 to receive fastener 69 present at receiver 62. If desired, more than one aperture 67 can be provided to allow extension of the lateral support 64 to be adjustable.

The primary platform 21 has a folded position 52 (FIG. 4) in which the plane of the platform 21 and stationary plane or surface 31 can be oriented so as to be oblique or orthogonal, e.g., non-parallel or perpendicular with respect to stationary platform 28. One skilled in the art can see how the angle of the platform 21 to the stationary platform 28 directly impacts any "top heavy" issues and trunk size issues. In the folded position 52, the primary folding platform 21 is used as an outer-most enclosure, enclosing some of the remaining components of the trailer, such as, for example, the wall assemblies 23. The primary platform 21 has an extended position 54 (e.g. FIG. 1) in which the platforms 21 and stationary platform 28 are parallel, and in one embodiment, co-planar. That is, the primary platform 21 forms a portion of the floor and as such may be insulated or have floor coverings including carpet as desired. In one embodiment, two primary platforms 21 are provided, one folding on each side of the stationary platform 28.

Referring back to FIG. 1, the camper 10 also includes at least one wall assembly 23 which may have at least one segment generally indicated by reference number 72 and perhaps windows 98. In one embodiment there are two wall assemblies 23 and three wall segments 72A, 72B and 72C per wall assembly 23. The wall assemblies 23 form rigid sides to the fold-out camper 10 when in the extended position 14. Each wall segment 72 has a major surface 74 defining a segment plane having side edges 76, a top edge 78 and a bottom edge. Side edges 76 of adjacent wall segments 72 are preferably joined via a hinge 56. Bottom edges 80 of each wall segment 72 are preferably joined to one of the stationary platform 28 and the primary platform 21 via a hinge 81, which may be a stepped up hinge as needed. Each wall assembly 23 desirably has an extended position 86 in which the assembly is at an angle to both the stationary platform 28 and the primary platforms 21 to form a wall with respect to the stationary platform 28 and the primary platforms 21, which can be perpendicular, but need not be, and a folded position in which the segments 72 are laid upon each other such as but not necessarily parallel to one of the primary platforms 21 and the stationary platform 28. One or more of the wall assemblies 23 may have a door 82 in a wall segment for ingress and egress.

Referring again to FIGS. 1 and 3, when the wall assemblies 23 are in the extended position 86, the canopy 17 extends therebetween so as to provide a roof and/or walls, being secured to the wall segments 72. The canopy 17 may further be secured to outside edges of each primary platform 21. While the canopy 17 may be attached when the wall assemblies 23 are in the folded position 84, such is not necessary. Struts 71 (FIG. 8) or other support structure extending between the wall assemblies 23 may be used to add structural support to keep the wall assemblies 23 upright and the canopy 17 in the extended position. In one embodiment, the canopy 17 is of a tent awning or marine grade fabric known in the art, such as, but not limited to, nylon and/or canvas. The fabric can be made of a variety of suitable materials. For example, some fabric characteristics can include puncture-resistant, mildew-resistant and mold-resistant properties. The fabric can also include properties so as to have ultra-violet protection.

Lift Mechanism for Primary Platform(s)

Referring to FIG. 5, one aspect of the invention herein disclosed includes a lift mechanism 100 to provide a lifting force to lift or aid in the lifting of the primary platforms 21 between each respective folded position 52 and each extended position 54. A first embodiment of the lift mechanism 100 is illustrated in FIG. 5 where portions of the camper 10 have been removed such as the back wall assembly 23 and the wall segment 72A of the front wall assembly 23. In addition to providing a lifting force for lifting the primary platform 21, the lift mechanism 100 can also provide a force against gravity such that the primary platforms 21 can move from the folded position 52 to the extended position 54 slowly.

Generally, the lift mechanism 100 includes a vertical support 102 and lift devices 103. The vertical support 102 is coupled to the frame 15 with an elevated portion 104 above a level of the stationary platform 28. In the embodiment illustrated, the vertical support 102 forms part of or is connected to a storage compartment 106 (e.g. FIG. 2) on one end of the camper 10, although inclusion of the vertical support 102 with the storage compartment 106 is not necessary. In addition, it should be noted that in the exemplary embodiment the vertical support 102 is located on a forward end of the camper 10 herein defined as being the end closest to the hitch 24. This location although convenient is not necessary.

The lift devices 103 are operably coupled to each the primary platforms 21 and the vertical support 102. Generally, each lift device 103 is configured to provide a lift force on the primary platform 21 when it is in its extended position 54 to at least aid in its movement toward its folded position 52, although in an advantageous embodiment the lift device 103 moves the primary platform 21 between the extended and folded positions with only minimal aid from a user of the camper. Each lift device 103 has a first end 103A operably coupled to the portion 104 of the vertical support 102 and a second end 103B operably coupled to the primary platform 21 at a position lateral of the portion 104 so as to form a line of action extending that is oblique to the vertical support 102 and primary platform 21 since the second end 103B is lateral of the hinged side edges of the stationary platform 28 and the primary platform 21.

Figure 6:
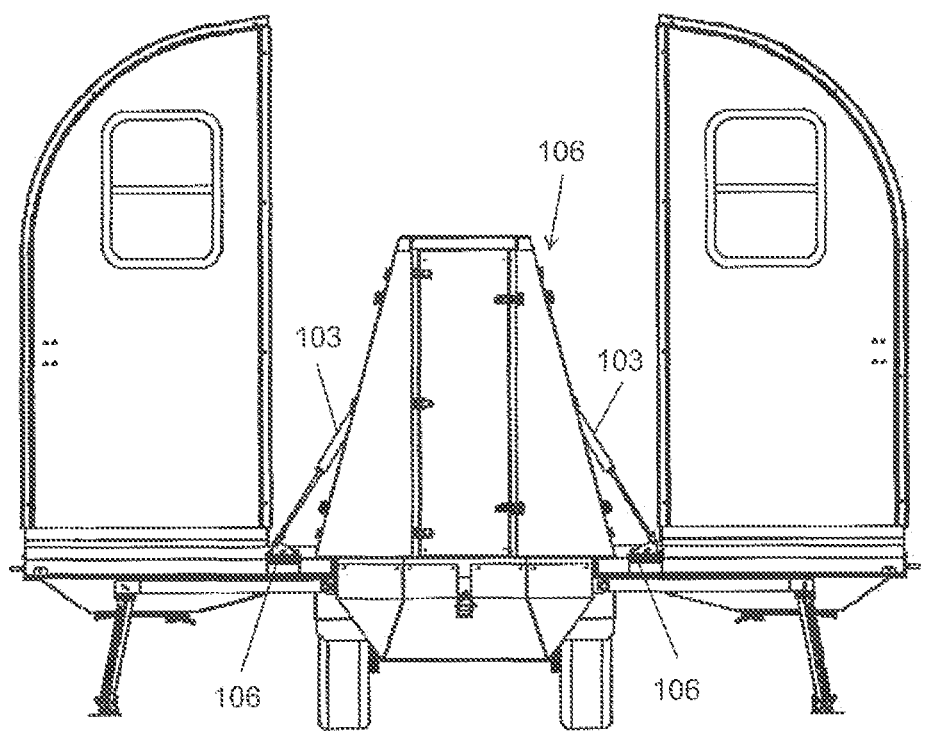
FIG. 6 is a front elevational view of the enclosure with parts removed.

The lift mechanism 100 can take many forms. In the embodiment illustrated in FIG. 5, a separate lift device 103 is provided for each primary platform 21 and comprises a telescoping actuating device. For instance, the lift device 103 can comprise a powered linear actuator (hydraulic, pneumatic or electric). If embodied as a hydraulic or pneumatic actuator, such as a double or single acting actuator lines 105 are provided between each of the lift devices 103 and a source of pressurized fluid such as a pump 107 schematically illustrated in FIG. 5. If the lift device 103 is electrically operated, lines 105 represent power cables. Lift device 103 can also comprise a ball screw having a threaded rod extendable and retractable by relative rotation of the threaded rod with respect to a nut. In yet another embodiment, the lift device 103 can comprise a linear actuator having a spring (mechanical and/or gas charged) configured to provide a force retracting the telescoping parts together. When embodied as a linear actuator, each end 103A, 103B can be pivotally joined to the vertical support 102 and to the primary platform 21 as illustrated at bracket 106 (see also FIG. 6) such that as the linear actuator 103 retracts, the linear actuator 103 will pivot relative to the vertical support 102 and the bracket 106 so that when the primary platform 21 is in its folded position 52, the linear actuator 103 is generally at an angle parallel to the primary platform 21 in the folded position 52 as illustrated with dashed lines in FIG. 5; however, this should not be considered limiting.

FIG. 7 illustrates a lifting mechanism 120 comprising a rotating drum or hoist 122 to which flexible members (e.g. cables, belts, straps etc.) 124 are connected with ends of the flexible members 124 secured to edges of the primary platforms 21. As with the lift mechanism 100 described above, lift mechanism 120 also has a line of action extending that is oblique to the vertical support 102 and primary platform 21 since the second end 103B is lateral of the hinged side edges of the stationary platform 28 and the primary platform 21. In this embodiment, a single drum 122 and associated electric drive motor is provided where pulleys 126 guide each flexible member 124. It should be noted that separate drives and drums can be provided for each platform 21 if desired. Likewise, other embodiments may not have any pulleys to guide the flexible members, or may have more than one pulley for each flexible member 124.

One advantageous feature of the lift mechanism 100 or 120 described above is its location on the camper 10. Referring to FIGS. 1 and 3, the lift devices 103 or flexible members 124 and pulleys 126 operate in recesses 130 generally between an outer surface of wall segment 72A and opposed surfaces of the vertical support 102, which as indicated above, can be storage compartment 106. It should be noted the side walls of the recesses 130 can be from panels of the vertical support 102 rather than a side of wall segment 72A, but even if such side walls are present, the recesses 130 can still be regarded as being between support 102 and wall segment 72A.

FIG. 7 is a rear view of the camper 10 with parts removed. Side panels 109 of storage compartment 106 can be provided that extend transversely to the outer surface of the wall segment 72A and are aligned with an opening 111 in the wall segment 72A so to create a passageway between an interior of the camper 10 when in the extended position 14 and at least an areas of the storage compartment 106, which could include an opening extending into the storage compartment 106 and/or to a surface of the storage compartment 106 now facing into the enclosed space of the camper 10. The side panels 109 can further define the recesses 130 in which the lift devices 103 can reside. In an advantageous embodiment, each of the primary platforms 21 include extending flanges 132 of sufficient length that operate as covers for the recesses 130 when each primary platform is in its folded position (see e.g. FIGS. 2 and 3). In this manner, components of the lift mechanism 100 or 120 are concealed in the folded position of the primary platforms 21, which also protects components of the lift mechanisms 100 and 120 during transportation of the camper 10. It should be noted that having an opening in a wall segment that aligns with a panel or opening in a structure such as storage compartment 106 when the wall assembly is raised is not limited to only the middle wall segments 72A, but rather in addition or in the alternative openings can be provided in the other wall segments 72B and/or 72C.

Wall Assembly Lift Mechanism

Another aspect of the invention is a lift or actuating mechanism 140 configured to provide a force to urge at least one of the wall segments 72A, 72B or 72C from its folded position where the wall segment is down against or proximate to primary platform 21 or stationary platform 28 (or on the other wall assembly 23) in a folded position to the extended position where the wall segment is in an upright position. In a preferred embodiment, the actuating mechanism 140 is further configured to provide a force resisting falling of the wall segment to the folded position. Since the wall segments 72A, 72B and 72C are joined together with hinges 56 typically comprising one or more sheets of flexible material, force applied to one or more of the wall segments 72A, 72B or 72C will aid in raising or lowering the wall assembly 73 as a unit.

Figure 9:
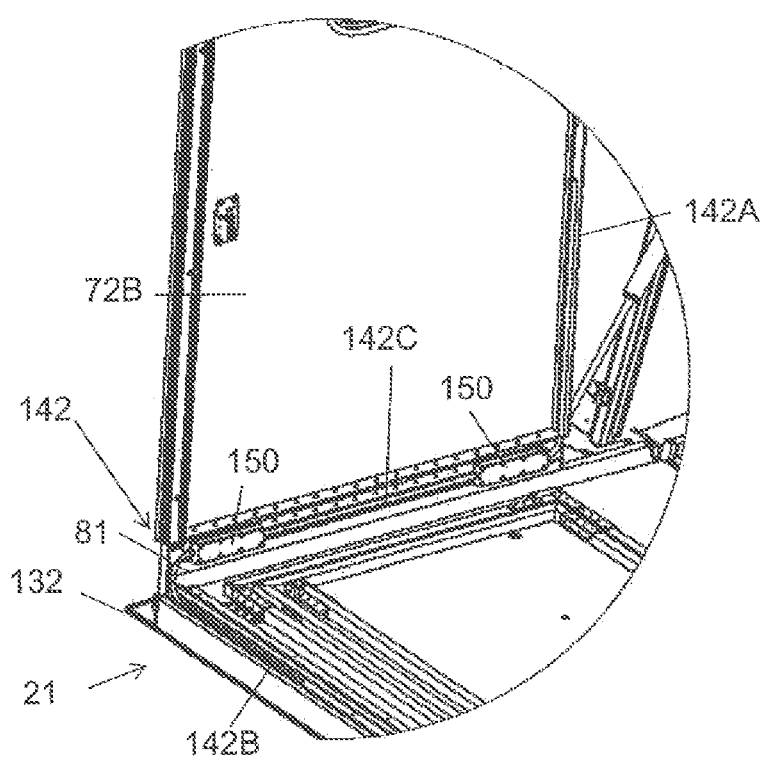
FIG. 9 is a detailed view of a wall assembly.
Figure 10:
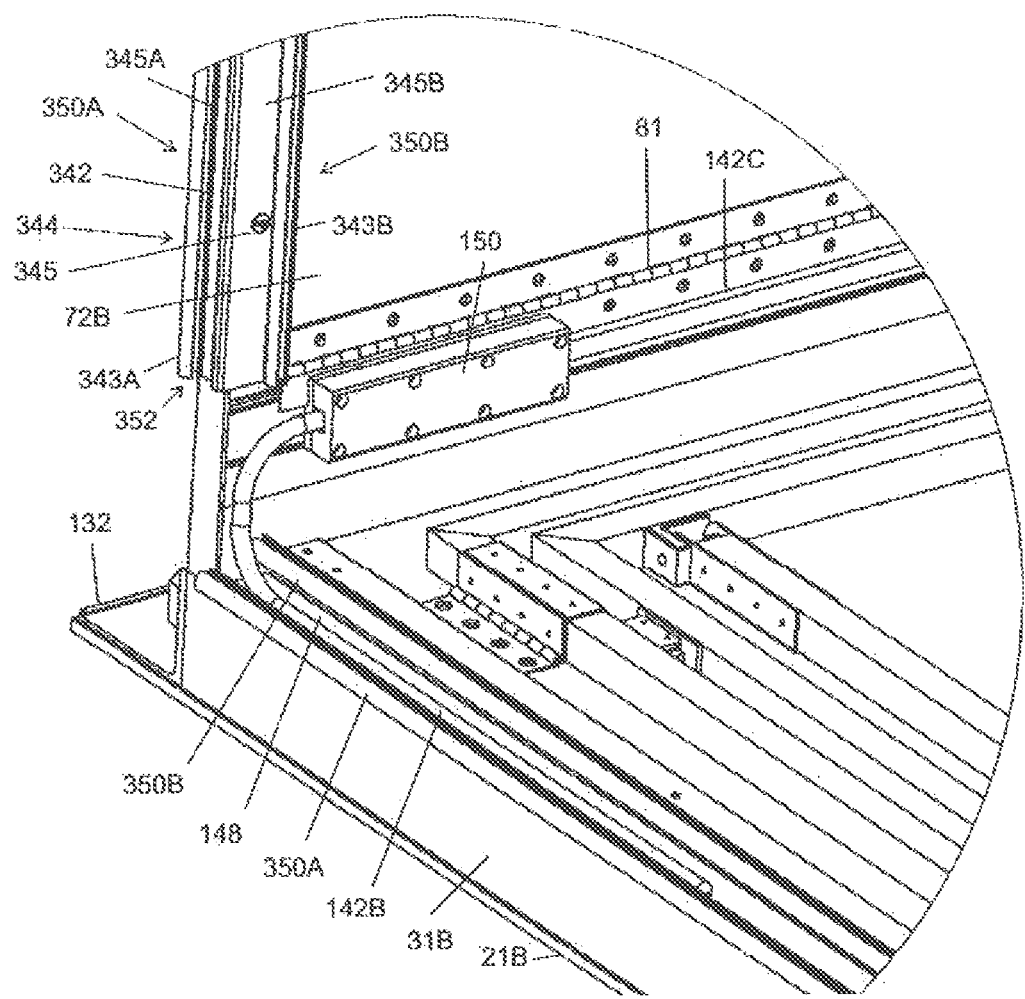
FIG. 10 is a detailed view of a wall assembly.

Referring to FIGS. 9 and 10, the lift mechanism can comprise a spring such as a torsion spring 142 operably coupled to a wall segment such as wall segment 72B by way of example and the primary platform 21 to which wall segment 72 is pivotally coupled to by hinge 81. Generally, spring 142 has a first end 142A coupled to wall segment 72B and a second end 142B coupled to primary platform 21. A torsion element of the spring 142 comprises a center section 142C. In the embodiment illustrated, the torsion spring 142 is commonly known as a torque arm or torque bar where each of ends 142A, 142B and center section 142C are elongated. This configuration is particular advantageous allowing each of ends 142A and 142B to be disposed in grooves or channels 146 and 148 provided in wall segment 72B and primary platform 21, respectively, while center section 142C is disposed adjacent or proximate to hinge 81. In the embodiment illustrated, the ends 142A and 142B are disposed on side edges of the wall segment 72B and primary platform 21. For a torque arm or torque bar the center section 142C is also elongated allowing the center section 142C to be disposed parallel to edges of the wall segment 72C and primary platform 21. Clamp blocks 150 on either side of the center section 142C hold the torque bar 142 in place.

Although a torsion spring could be provided for each of wall segments 72A, 72B and 72C, it has been found torsion springs 142 operably coupled between wall segments 72B and 72C and each of their corresponding primary platforms 21 provides sufficient force such that the complete wall assembly 23 with wall segment 72A joined to each of wall segments 72B and 72C via hinges 56 can be lifted with minimal effort even if a door 82 is present. In an alternative embodiment, one or more torsion springs can be operably coupled to center wall segment 72A, where the connection of wall segments 72B and 72C via hinges 56 can cause wall segments 72A and 72B to be lifted and lowered due to the force applied to wall segment 72A. It should be noted other forms of torsion springs can be used.

Inside Access to Front Storage Compartment

Figure 8:
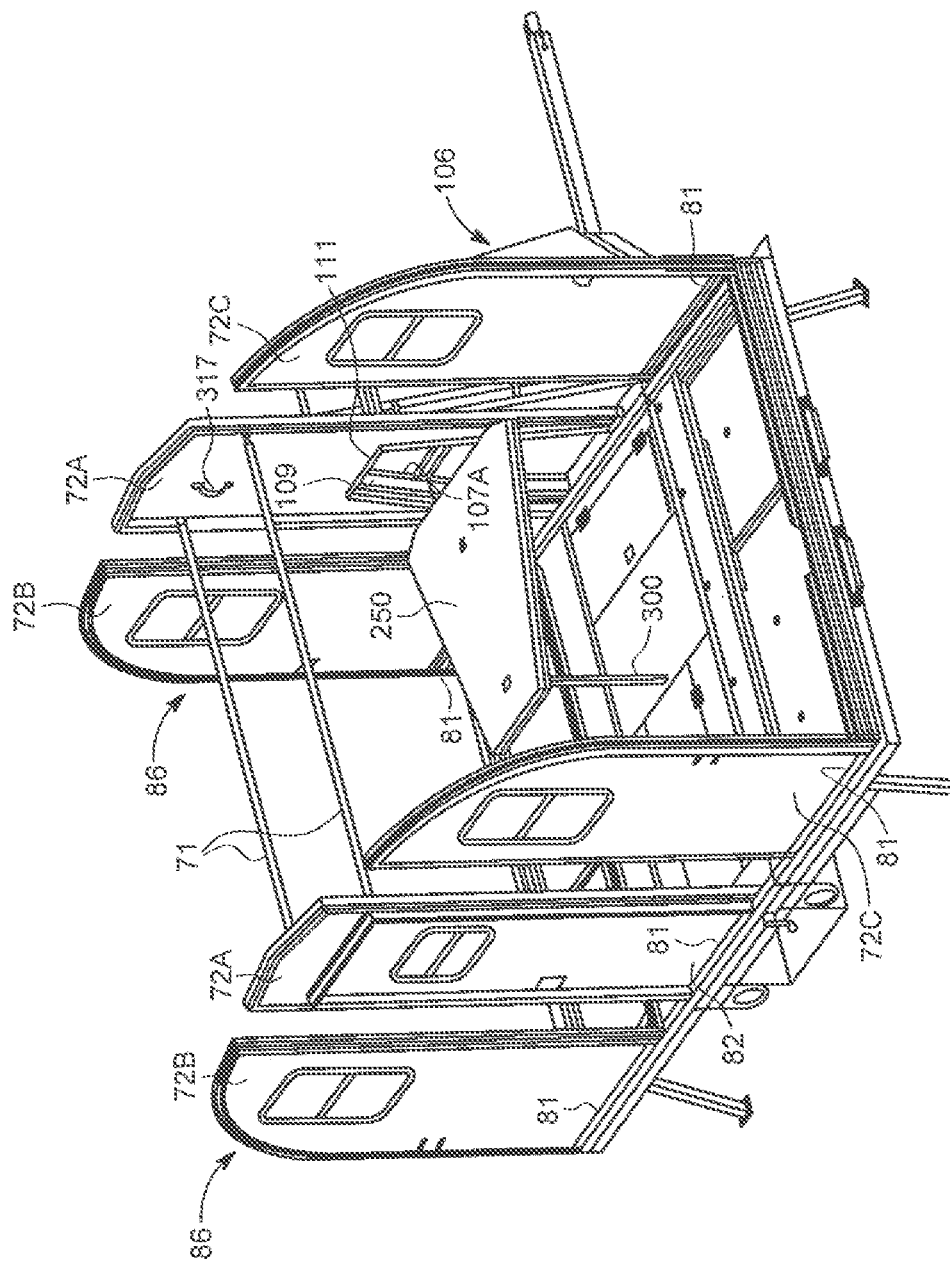
FIG. 8 is a perspective view of the enclosure with parts removed.

As indicated above and illustrated further in FIG. 8 the opening 111 in wall segment 72A of the front wall assembly 23 aligns with an aperture or opening 107A of the storage compartment 106 defined by edges of side panels 109 and an upper panel 113 joined to upper ends of side panels 109 when the wall segment 72A is in an extended or upright position. As such the storage compartment 106 can be considered a partial enclosure mounted to trailer frame 15 between the hitch 24 and the front edge of the stationary panel 28. As illustrated in the various figures the enclosure 106 includes side 106A, wherein each side 106A is configured so as to align with one of the front edges (or flanges 132) of the primary platforms 21 in the folded position (e.g. FIG. 2). In one embodiment, one or more removable or hinged door panels 106B can be provided on sides 106A or a front portion 106C as desired to provide access within storage compartment 106. However, in view of openings 107 and 111 also being aligned, access to within the storage compartment 106 is also possible from inside the camper 10 when wall assemblies 23 are in the upright positions.

Although in one embodiment, a simple door panel can be provided to close opening 107 from within the camper 10. The opening 107 provides a large enough opening to enable one or more devices desired, for example, for camping to be stored in the storage compartment 106 and accessed from within the camper 10. Such exemplary devices or components include a heater, a pull out sink, pull out cooktop, one or more storage drawers, entertainment systems including TVs, computers or the like, or a panel(s) having electrical outlets or water control valves. In a preferred embodiment as illustrated in FIG. 7, the storage compartment 106 includes inner support structural elements comprised of horizontal brace(s) represented by brace 156 extending across opening 107 although other braces may be provided extending inwardly for example transversely to brace 156. The inner support structural elements can include one or more mounting brackets represented by brackets 158, and/or mounting apertures represented by apertures 160 in brace 156, but can be provided on other support structural elements within storage compartment 106. The afore-mentioned devices may include a heater, a pull out sink, pull out cooktop, one or more storage drawers, entertainment systems including TVs, computers or the like, or a panel(s) having electrical outlets or water valves are preferably configured to have front panels that are the same as at least some other devices in height and width. The overall height and width of the devices extending within the storage compartment would preferably also not exceed the selected height and width of the front panel. This is exemplified in FIG. 7A with such devices represented by components 155A and 155B being of the same width and height. This simplifies arrangement of devices within the storage compartment 106. For instance, a storage drawer or drawer assembly could have the same dimensions as the pullout cooktop, sink or heater. In this manner, one configuration could have a heater located in a lowermost position in the storage compartment 106 with the heater outlet panel extending across a lower portion of the opening 107, while a storage drawer is located directly above the heater outlet panel and across the opening 107 and pullout cooktop is located above the storage drawer. However, if the heater and heater outlet panel are of the same height and width as the storage drawer, in another configuration a second storage drawer can be put in place of the heater and heater outlet panel. Furthermore, a user could selectively exchange one of the drawers with the heater and heater outlet panel when the user desires the heater instead of the storage drawer. In one embodiment, two or more devices would be interchangeable because each of the devices have similar slides such as those found on storage drawers.

Figure 7B:
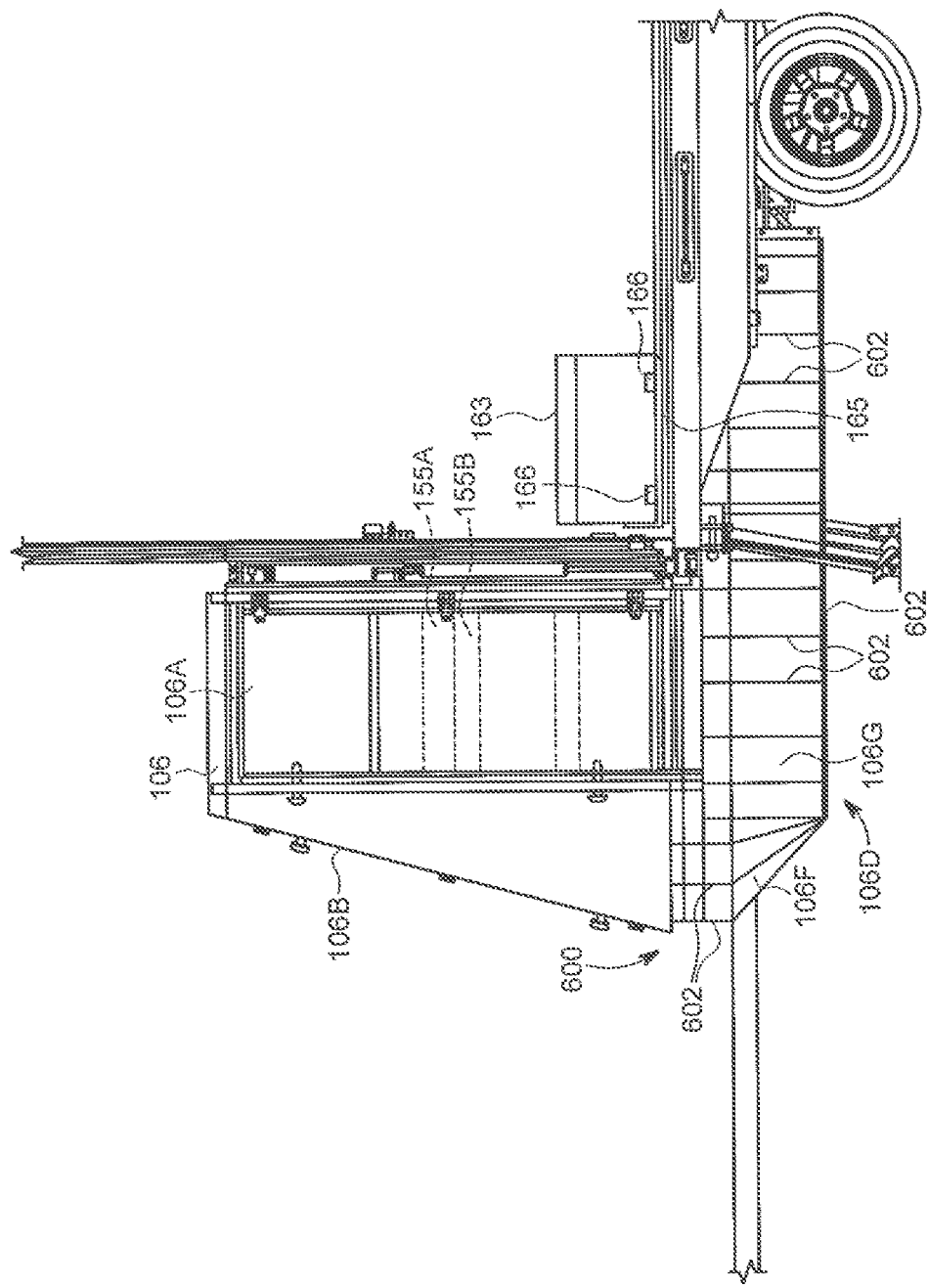
FIG. 7B is a partial side elevational view of the enclosure.

Referring to FIGS. 7A and 7B, in a particular advantageous embodiment, storage compartment 106 houses a portable toilet 163 such as is commonly available and used during camping or on boats. Typically, the portable toilet 163 is small, lightweight and can be carried by hand. The toilet 163 is accessible from inside the camper with the end wall assemblies 23 erect through the opening 107. Thus, the user need not leave the inside of the trailer to use the toilet 163. When use is desired, the user simply pulls and/or lifts the toilet 163 out of the storage compartment 106 through the opening 107, returning it back to the storage compartment 106 when use is completed. In one embodiment, the toilet 163 can be mounted to a movable support such as the spaced apart brackets 158 (possibly extendible) (FIG. 7A) mounted on sides of the toilet 163, preferably in a manner that allows the toilet 163 to be removed when desired. In the embodiment illustrated, the movable support comprises a platform or tray 165 that is secured to inside the compartment 106 and can extend in and out of storage compartment 106 through access opening 107. This arrangement allows the toilet 163 to be pulled out of the storage compartment 106 and slid back into the compartment 106 with little handling. In a further embodiment, one or more holding devices 166 are provided to removably hold the toilet 163 to the tray 165, thereby securing the orientation of the toilet 163 during transportation of the camper 10, but also allowing the user to decouple the toilet 163 from the tray 165 for servicing. In a particular convenient configuration, the toilet 163 can also be accessed from one of the doors 106B forming the storage compartment 106, such as one or both of side doors and/or front door 106B. In this manner, the toilet 163 can be accessed and removed from the storage compartment 106 for use or servicing when the camper is folded up and in a transport configuration.

Side Support Structure

Referring back to FIGS. 4 and 11, another aspect of the present invention includes a side support structure 170 that is removably secured to the frame 15 when the primary platform 21 on the side that the side support structure 170 is mounted on is in its folded position. The side support structure 170 is configured to support an article in an elevated position when the camper 10 is transported or in storage.

In an advantageous embodiment, the side support structure 170 uses the lateral supports 64 and/or receivers 62 to be supported on the camper 10. Generally, the side support structure 170 includes bars, hooks, racks, etc. in configurations suitable for holding the desired article in the elevated position. In many embodiments, one or more horizontal support bars 174, 178 and vertical support bars 176 are present in the support structure 170. In a preferred embodiment, at least one horizontal support bar 174 is of length to extend along the camper 10 so as to structurally connect the lateral supports 64 from the receivers 62 together on each end of the camper 10. However, it should be noted although the camper 10 illustrated includes two lateral supports 64 to support each platform 21 this should not be considered limiting in that if desired more than two lateral supports 64 and/or associated receivers 62 can be disposed along the length of the camper 10 such that one or more pairs of lateral supports 64 can be connected together with horizontal support bars and/or the lateral supports 64 may extend out of from the camper at different lengths. This allows the support structure 170 to be configured as necessary to hold one or more articles on each side of the camper.

Figure 11:
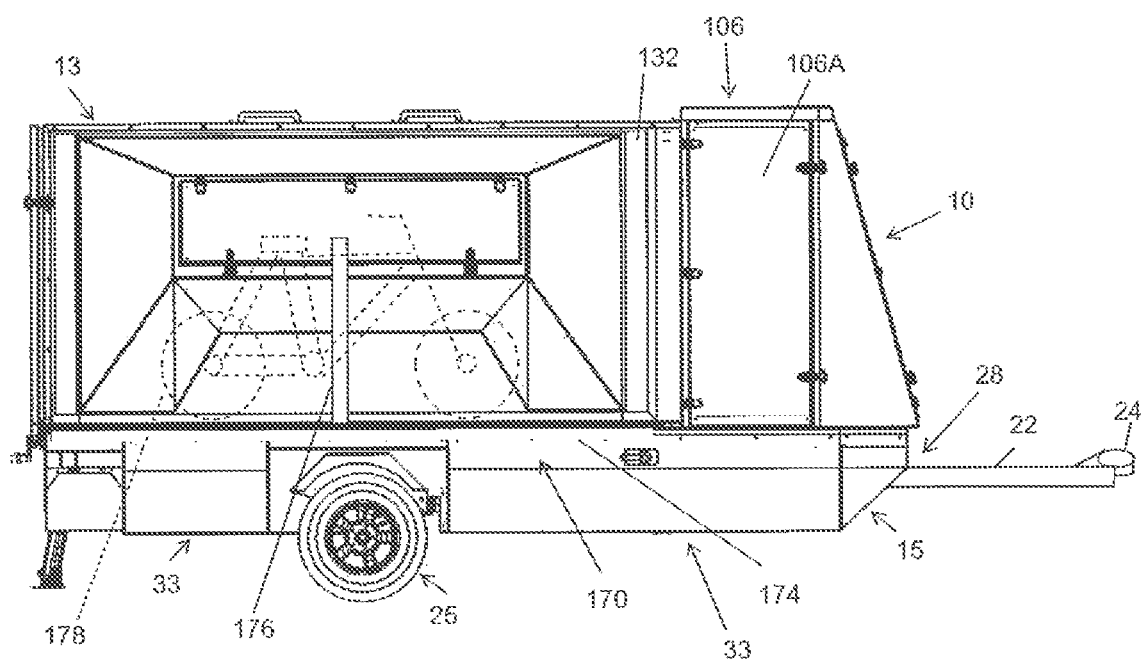
FIG. 11 is a side-elevational view of the enclosure.

In FIG. 11 a single horizontal support bar 174 and a single vertical support bar 176 are used to provide support for a bicycle (or motorcycle) 178 indicated in dashed lines, although this specific embodiment should not be considered limiting. Support bar 174 can include a receiver 80 similar to ends 66 of the ground supports 58 to receive an end of the lateral support 64. In an alternative embodiment, the side support structure 170 can include bars of size so as to be inserted in lateral supports 64 rather than around an outer surface. In addition or in the alternative, the support structure 170 can include horizontal shelve(s) for coolers or other containers. Likewise, brackets, clamps or the like can be provided for paddle board(s), skis, kayaks, canoes, etc.

Figure 4A:
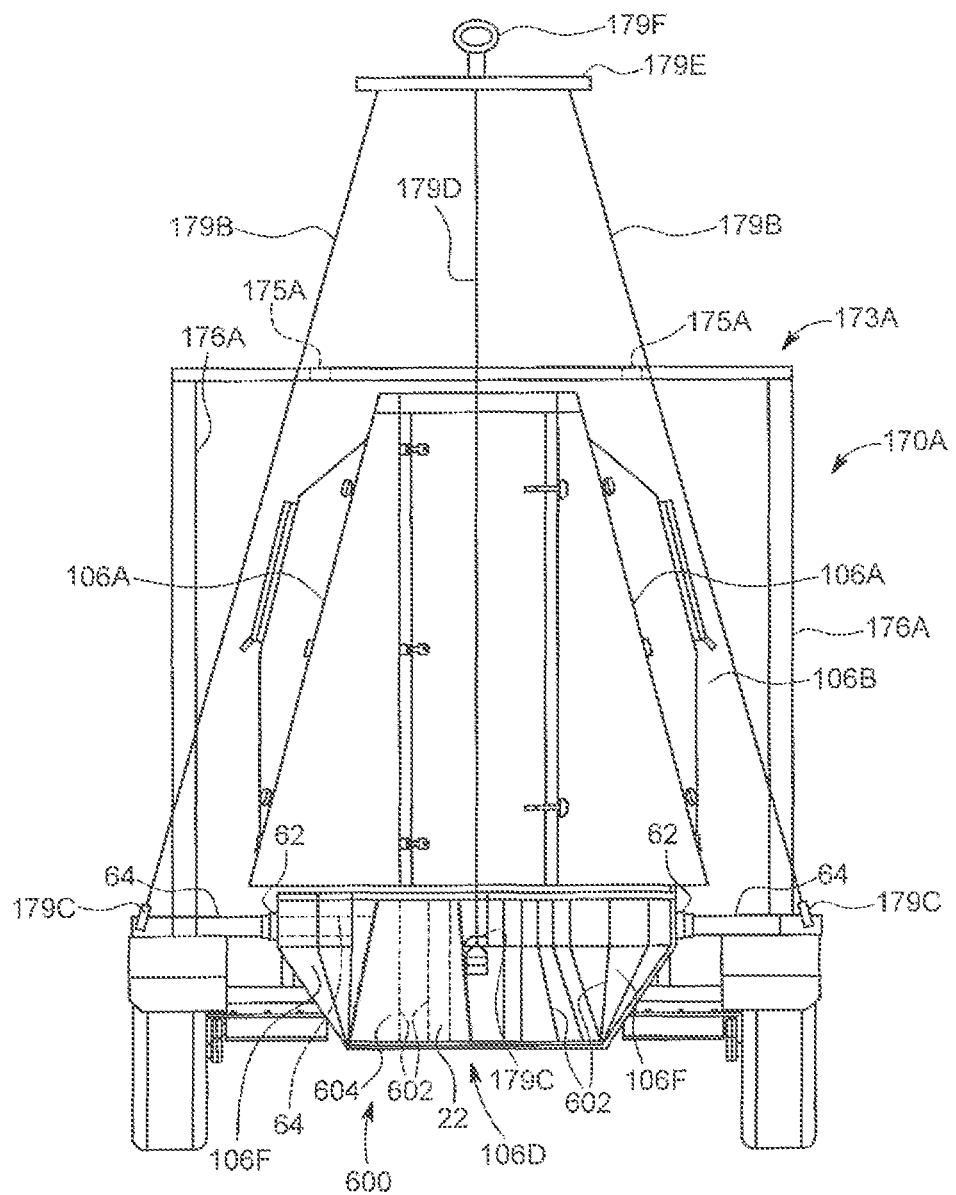
FIG. 4A is a front elevational view of another enclosure.
Figure 11A:
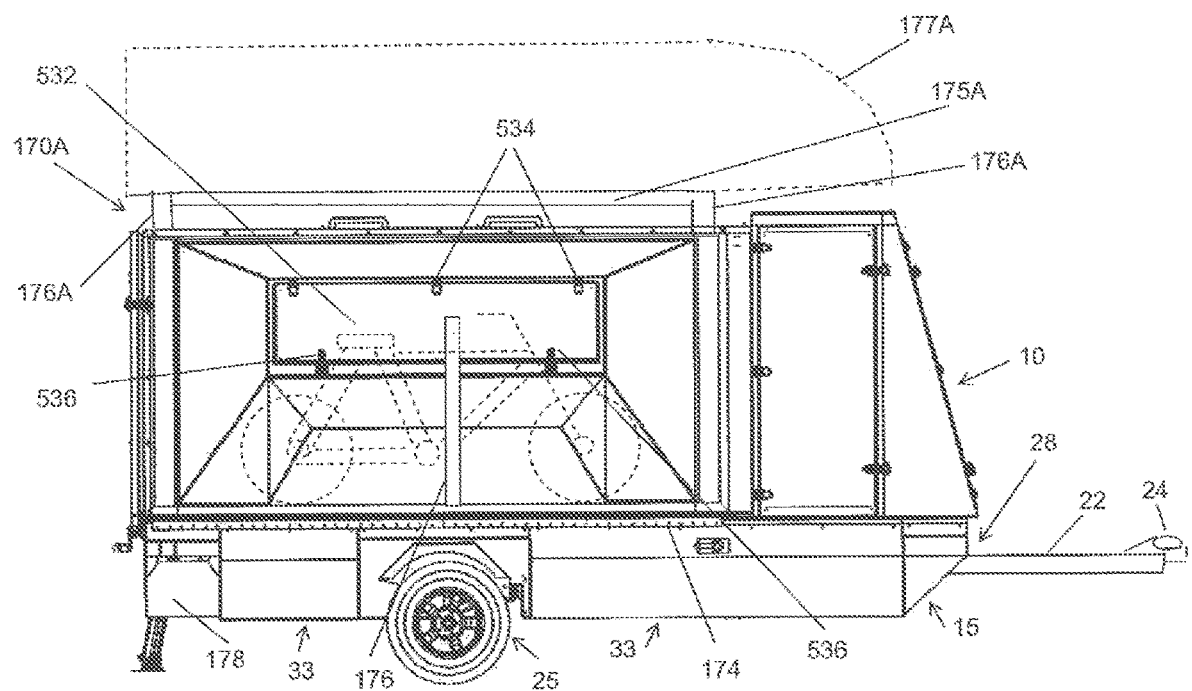
FIG. 11A is another side-elevational view of the enclosure.

Another embodiment of an accessory support structure is illustrated in FIGS. 4A and 11A at 170A. In general, the support structure 170A is configured to extend over the camper in the folded, travel configuration. The support structure 170A includes lateral supports 64 extending from each of the receivers 62. Vertical support bars 176A extend upwardly from ends of each lateral support 64 to a height above the camper in the folded configuration. Upper support bars 173A extends laterally between each pair of vertical support bars 176A at the rear of the camper and at a front portion of the camper. Typically, at least one or more longitudinal support bars 175A are connected to and extend between the upper support bars 173A above the height of the camper in the folded position. The upper support bars 173A and the longitudinal support bars 175A support one or more items above the camper such as a boat 177A, which in this embodiment has been flipped over with its hull directed upwardly. The upper support bars 173A and/or longitudinal support bars 175A can be used with plates, hooks, cages, baskets to name just a few to support other objects over the camper in the folded position. In a further embodiment, the lateral supports 64 adjustably telescope to fixed positions so as to allow a distance between the vertical support bars 176A to be adjustable. Likewise, the upper support bars 173A can be adjustable such as have telescoping parts so that the width of the upper support bars 173A can be adjusted to match the width between the vertical support bars 176A.

Helicopter Lift Assembly

Referring to FIGS. 2 and 4A, the receivers 62 and extendible lateral supports 64 provide convenient and secure attachment points for lifting the camper 10 using a helicopter (not shown). Generally, a lift assembly 179A preferably includes at least four lift cables 179B each secured to lateral support 64 using a ring or shackle 179C secured to an end of each lateral support 64, where each lateral support 64 has been extended to a position and secured to each corresponding receiver 62 that makes a convenient angle of inclination for the associated lift cable 179B. In a further preferred embodiment an additional lift cable 179D is secured to a front portion of the camper 10 such as to tongue 22 again using a ring or shackle 179C. The lift assembly 179 can include an intermediate lift member 179E to which the lift cables 179B, 179D are connected or be directly connected to a lift ring 179F. In the embodiment illustrated, the lift ring 179F is secured to intermediate lift member 179E. It should be understood that support structure 170 may not be present depending on any interference the support structure 170A may cause with the lift cables 179B, 179D. However, it is possible to adjust the length of the lateral supports 64 and/or adjust the position of the components forming the support structure 170A or the other support structures described herein so as to allow the support structures to be used with the lift assembly 179A.

Collapsible Side Support Frame

Figure 12A:
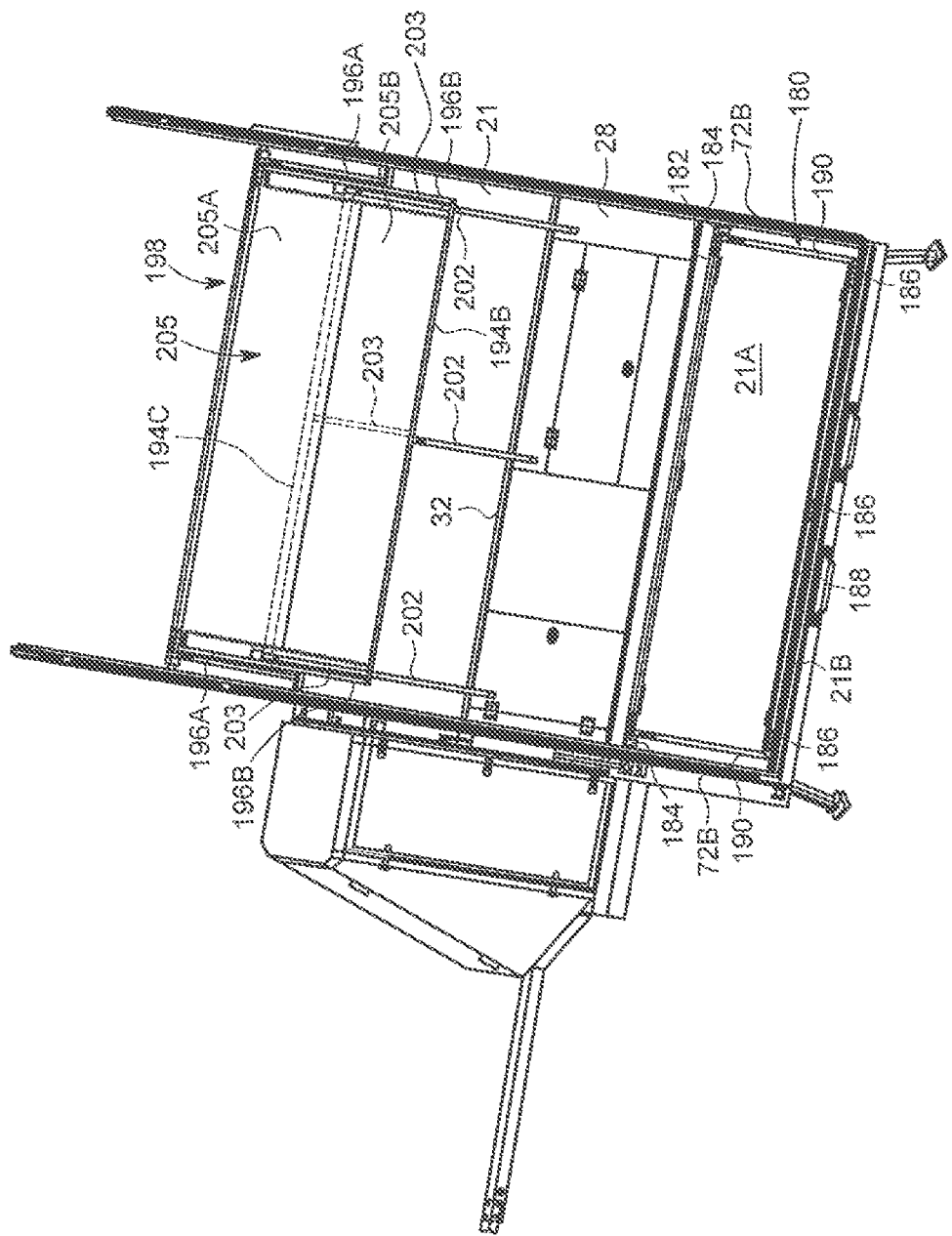
FIG. 12A is perspective view of the enclosure with parts removed.
Figure 12B:
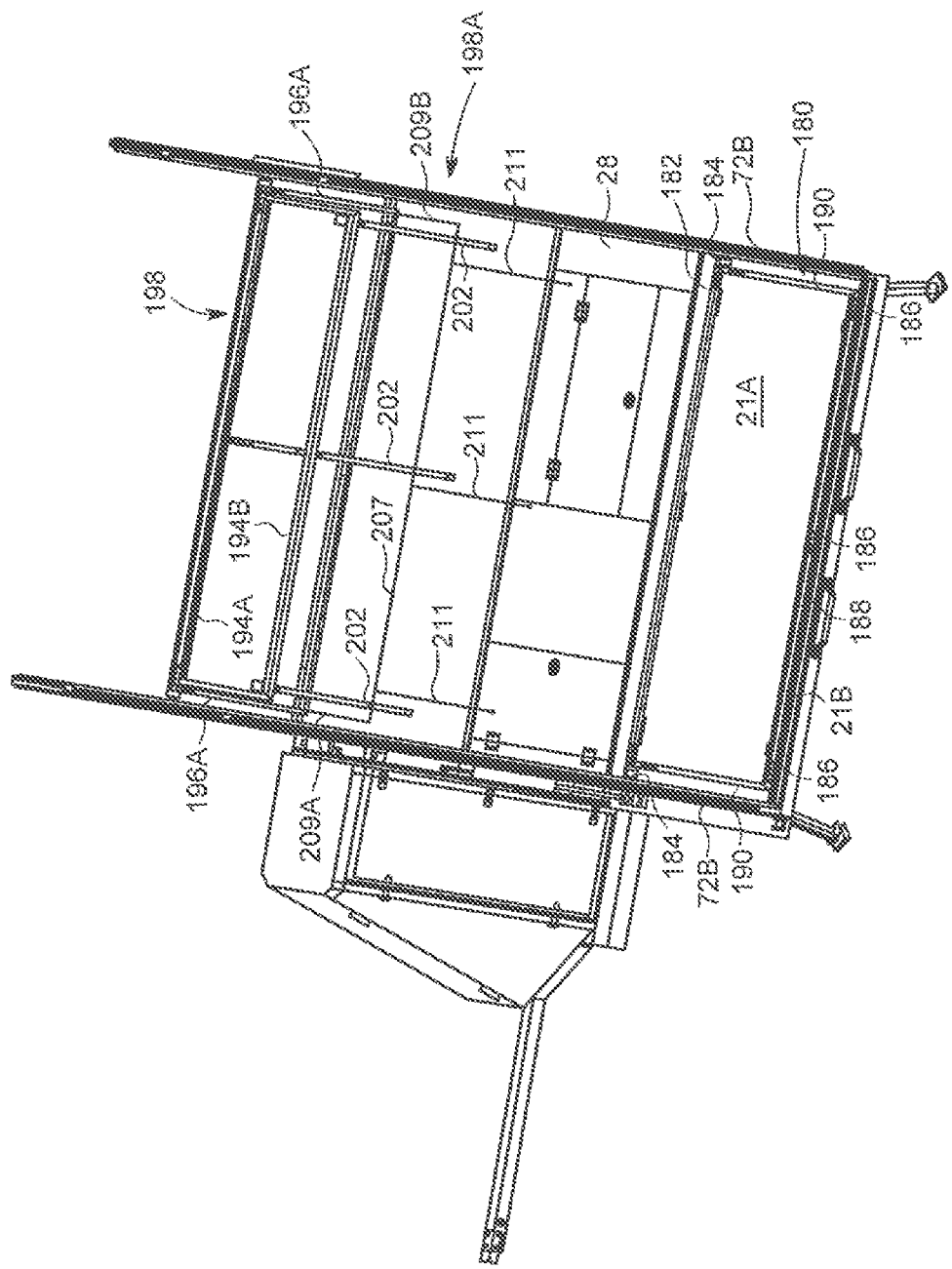
FIG. 12B is a perspective view of the enclosure with part removed.
Figure 13:
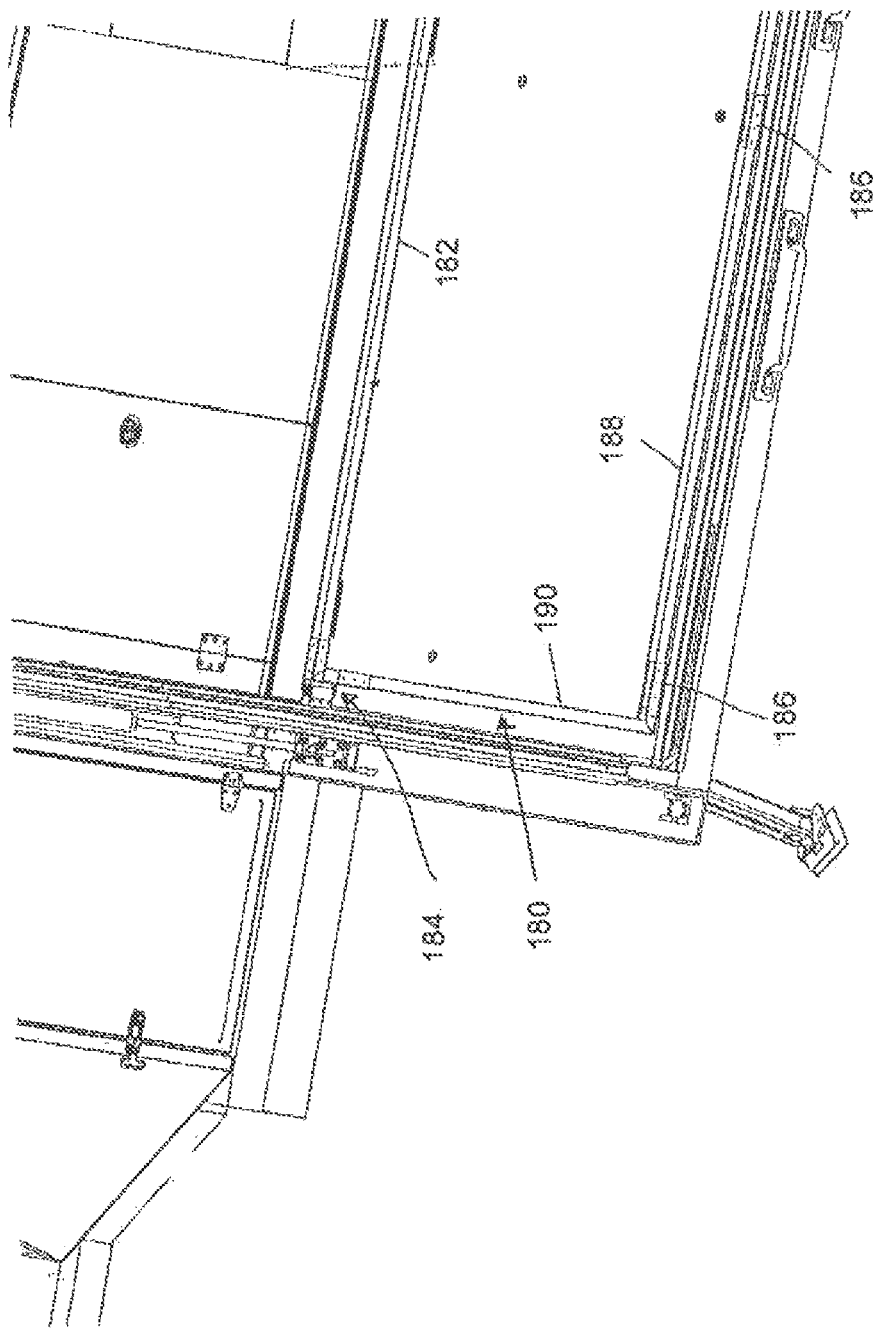
FIG. 13 is a perspective view of the enclosure with parts removed.

Another aspect of the invention is a collapsible side support frame 180, for example illustrated in FIGS. 12 and 13. The side support frame 180 includes at least one movable elongated horizontal support 182 secured to the primary platform 21 to selectively move from a first position wherein the elongated horizontal support 182 is parallel with and proximate a major surface 21A of the primary platform 21 and a second position wherein the elongated horizontal support 182 is elevated above the major surface 21A generally parallel to a side or outer edge 21B of the primary platform 21 opposite the stationary platform 28. Ends 184 of the support frame 180 engage each of the wall assemblies 23 (in the illustrated example wall segments 72B when the wall assemblies 23 are in the extended positions). In a preferred embodiment, the support frame 180 is pivotally joined to the primary platform 21B, preferably proximate to the outside edge 21B of platform 21 with hinges 186. In a further preferred embodiment, each of hinges 186 are mounted to an elongated support 188, while transverse supports 190 join support 180 to support 188 such that the support frame 180 can be lifted as a single rectangular structure.

Figure 14:
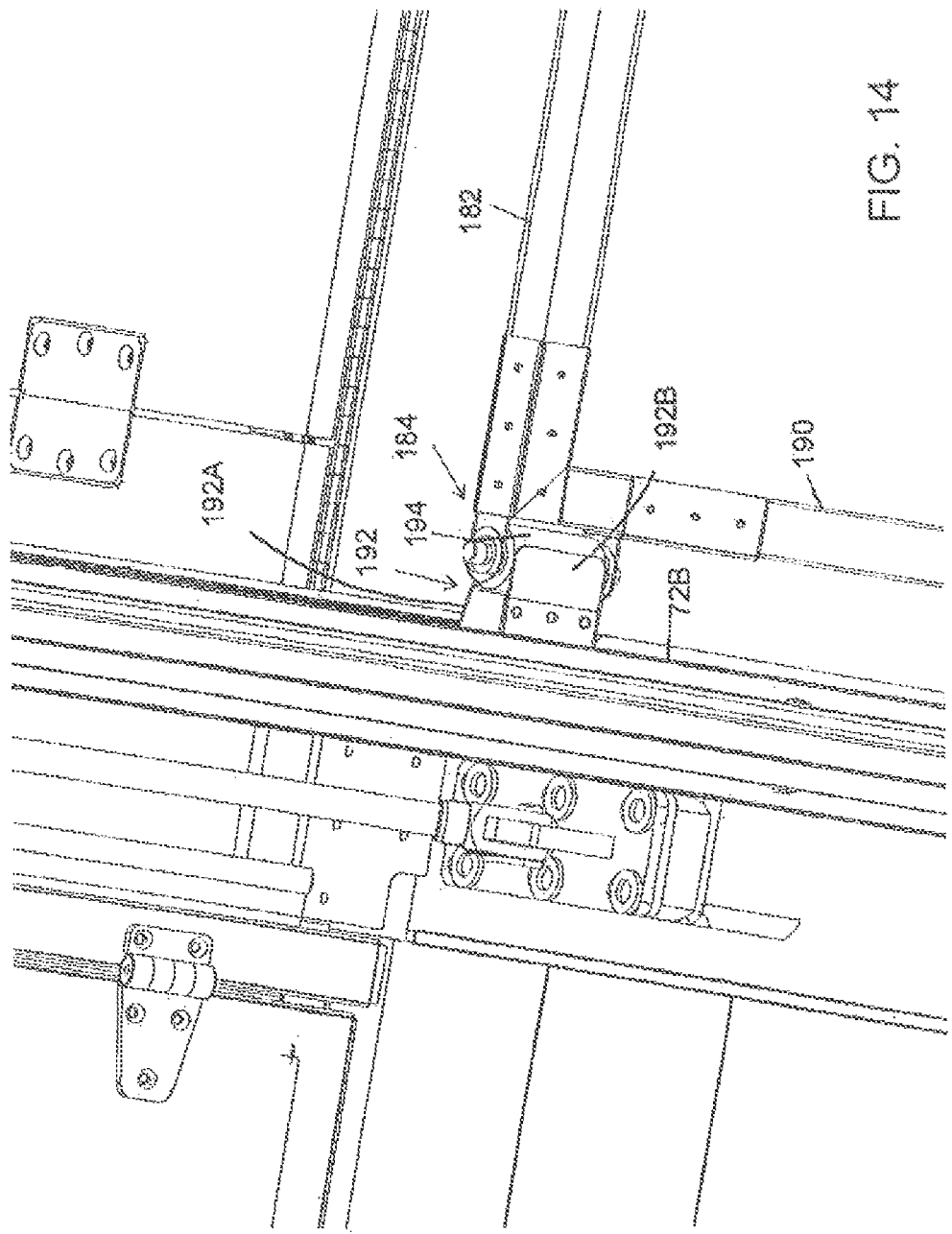
FIG. 14 is a detailed view of a collapsible support rail.

FIG. 14 illustrates end 184 in detail. A clasp 192 is mounted to wall segment 72B and releasably receives a projection 194 comprising end 184. The clasp 192 preferably includes clasp components 192A, 192B (fingers, plates, etc.) connected together with one or more springs, or one or more of the clasp components 192A, 192B being for example made of at least somewhat flexible material act like springs. The components 192A, 192B spread apart from each other under tension when the projection 194 is inserted into the clasp 192. In the embodiment illustrated, the clasp 192 releases the projection 194 when the end 184 is pulled away from the clasp 192.

In a further embodiment illustrated in FIG. 12, a panel 180A can be mounted to one or more of the supports 182, 188, 190 comprising the rectangular support frame 180. A portion of the panel 180A is broken away so that surface 21A of platform 21 can be seen; however, typically, the panel 180A will extend along the complete length of the support frame 180. When the support frame 180 is erect and in place between the wall assemblies, the panel 180A provides a covering over the flexible fabric material 17 forming the side wall of the camper between the wall assemblies. The panel 180A thus protects the fabric material 17 from damage when items may be placed adjacent the side fabric walls of the camper. When the support frame 180 includes additional components to function as a cot, table bench or the like as discussed below, the panel 180A can provide a sense of security to an individual that may be sleeping below cot, table, bench or the like.

Figure 15:
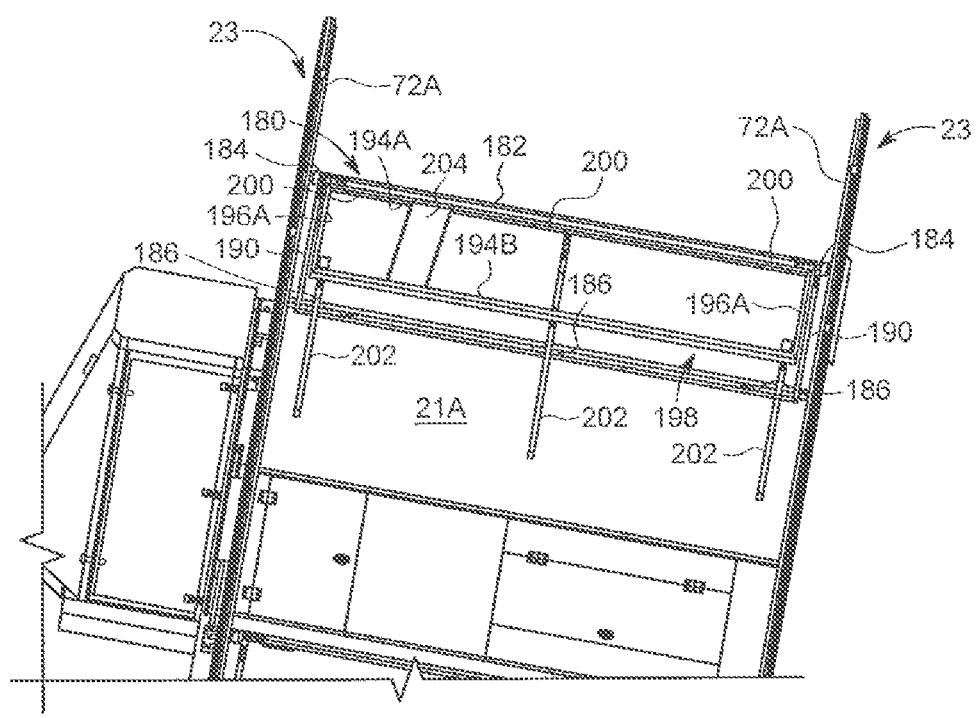
FIG. 15 is a partial perspective view of the enclosure with parts removed.

FIG. 15 illustrates that the support frame 180 can be used to form collapsible structures useful inside the camper 10. An example of such a structure is illustrated between wall segments 72A of each of the opposed wall assemblies 23. In this example, the collapsible side support frame 180 includes a plurality of horizontal supports 194A, 194B secured to each other with lateral supports 196A to form an upper support frame 198 that is elevated above the major surface 21A of the platform 21 when the elongated horizontal support 182 is in the elevated position where ends 184 of the support frame 180 engage each of the wall assemblies 23. In a preferred embodiment horizontal support 194A is joined to support 182 with hinges 200, allowing the upper support 198 to nest within support frame 180 when in a collapsed position either when the support frame 180 is erect between the opposed wall assemblies 23 or lying against platform 21 in a storage position. To hold the upper support frame 198 in an elevated position, secondary vertical supports 202 are preferably pivotally joined to the upper support frame 198 at locations spaced apart from each other. Each of the secondary vertical supports 202 can also nest within support frame 180, herein also nesting within upper support frame 198. In one embodiment, the upper support frame 198 can also include a rigid panel, a small portion of which is illustrated at 204. In this manner, the collapsible support frame 180 can function as a table or a bench depending on the height of the upper support frame 198 above the surface 21A. The panel 204 can be used to provide a support sleeping surface such as with a mattress to form a bed. If desired, portion 204 can also represent a portion of fabric that can be stretched across the upper support frame 198 so as to provide a cot as the sleeping surface.

With the various components nested as described, the support frame 180 with the upper frame 198 and the secondary vertical supports 202 can lay flat against the surface 21A of the primary platform 21 as illustrated in FIG. 3. Being fixedly secured to the primary platform 21, the collapsible support frame 180 will remain secured to the primary platform 21 when the primary platform 21 is raised to its folded position 52. The height of the hinges 81 connecting the wall segments 72A, 72B of the wall assemblies 23 to the stationary platform 28 and primary platforms 21 are of height so that the wall segments 72A, 72B lie or flat relative to each other and the surface 21A and trap the collapsible support frame 180 between the wall segments 72A, 72B and the surface 21A.

In another embodiment illustrated in FIG. 12A, the upper support frame 198 is extendable to have at least two different operable widths, for example, where the first operable width position corresponds to a width suitable for one person to sleep when functioning as a cot, while a second operable width position corresponds to a width suitable for two people to sleep (such as wide enough to accommodate a standard queen size mattress, about 60 inches in width). In FIG. 12, the upper support frame 198 is in a first operable width position where the upper support frame 198 has a width similar to that as illustrated in FIG. 15, while FIG. 12A illustrates the upper support frame 198 in a second operable width position that is wider than the first operable width position. Note that in the second operable width the upper support frame 198 extends beyond the hinged, joined edges 32 of the primary platform 21 and the stationary platform due to the location of the legs 202, which are supported by the stationary platform 28 in FIG. 12A versus the primary platform 21 in FIG. 12.

In the embodiment of FIGS. 12 and 12A, the lateral supports 196A, 196B are formed from extendable portions that are connectable together in the two operable positions such as being of telescoping parts. Additional legs 203 can be provided, for example, hinged to the lateral supports 196A, 196B so as to fold like legs 202. In the embodiment illustrated, legs 203 remain in the same position whether the upper support frame 198 is configured in the first or second operable width, while legs 202 move to different locations. In other words, each leg 203 is pivotally connected to an associated lateral support 196A at one end, while the second end of each leg 203 contacts surface 21A. If desired, another horizontal support 194C can extend between lateral supports 196A and have a pivotally connected leg similar to the middle pivotally connected leg 202 connected to horizontal support 194B.

Each lateral support 196B is movably connected to each associated lateral support 196A such as sliding relatively to each other, for example in a telescoping manner Legs 202 at the ends of support 194B are pivotally connected to support 194B or remote ends of lateral supports 196B. In the second operable width, the legs 202 contact the stationary platform 28.

In FIGS. 12 and 12A, the upper support frame 198 supports an optional panel 205 that can be used to form a support surface for a one or two person mattress or the like. In FIGS. 12 and 12A the panel 205 is broken away so as to illustrate legs 203 pivotally joined to lateral support 196A. The panel 205 can comprise two portions 205A, 205B, where the width of panel portion 205A is sufficient for the first operable width and together the panel portions 205A, 205B are of sufficient width for the second operable width. If desired, the panel portions 205A, 205B can be hinged together, where when the upper support frame 198 is configured with the first operable width, panel portion 205B overlaps panel portion 205A. Hence, the panel 205 can be folded and laid flat with the upper support frame 198, when the upper support frame 198 lays flat relative to the primary platform 21.

In yet a further embodiment illustrated in FIG. 12b, the upper support frame 198 is extendable to the second operable width by attaching a second portion 198A (schematically illustrated) to the supports 194B, 196A rather than having supports 196A, 196B be extendable relative to each other. The second portion 198A includes a support 207 that is substantially parallel to support 194B, while supports 209A and 209B are substantially parallel to supports 196A, 196B. The second portion 198A includes legs 211, which can be hinged to or removable from the supports 207, 209A and/or 209B.

It should be noted additional legs, lateral or horizontal supports can be included where needed to provide the desired rigidity to the panel 205 in any of the foregoing embodiments.

Removable Rear Cover Functions as a Support Surface

Another aspect of the invention is a rear cover 250 (FIG. 16) of the camper 10 that can be relocatable and secured to other components of the camper 10 to function as a table. The rear cover 250 has a lower edge 252, an upper edge 254 shorter than the lower edge 252 (when mounted to the camper 10 in the folded, travel position) and a pair of side edges 256. Each side edge 256 extends from a corner of the lower edge 252 to a corner of the upper edge 254 at an angle substantially coinciding with an angle corresponding to the angle of inclination of the primary platform 21 with the stationary platform 28 in each folded position thereof. Latches 258 secure the rear cover 250 to each of the primary platforms 21, while a pair of mounts 260 (one of which is illustrated in FIG. 17) are secured to the frame 15. Each mount 260 includes a hook 263 that removably receives a pin 265 of a portion or coupler 264 secured to the lower edge 252 of the rear cover 250.

Figure 18:
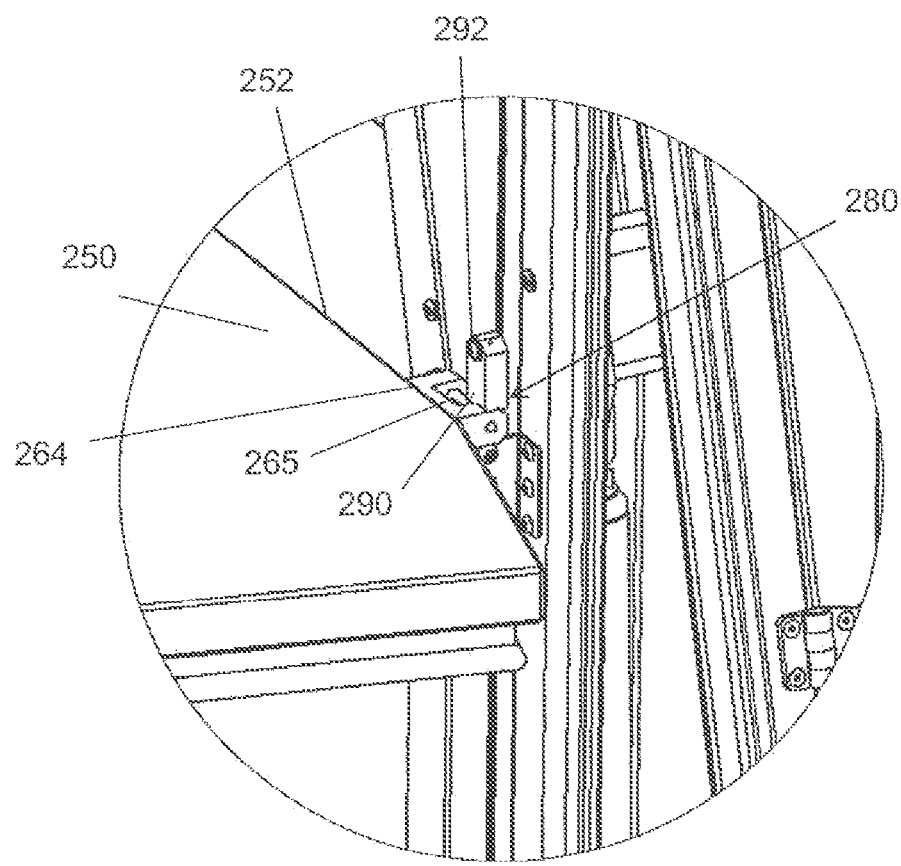
FIG. 18 is a detailed view of a rear-panel of the enclosure.
Figure 19:
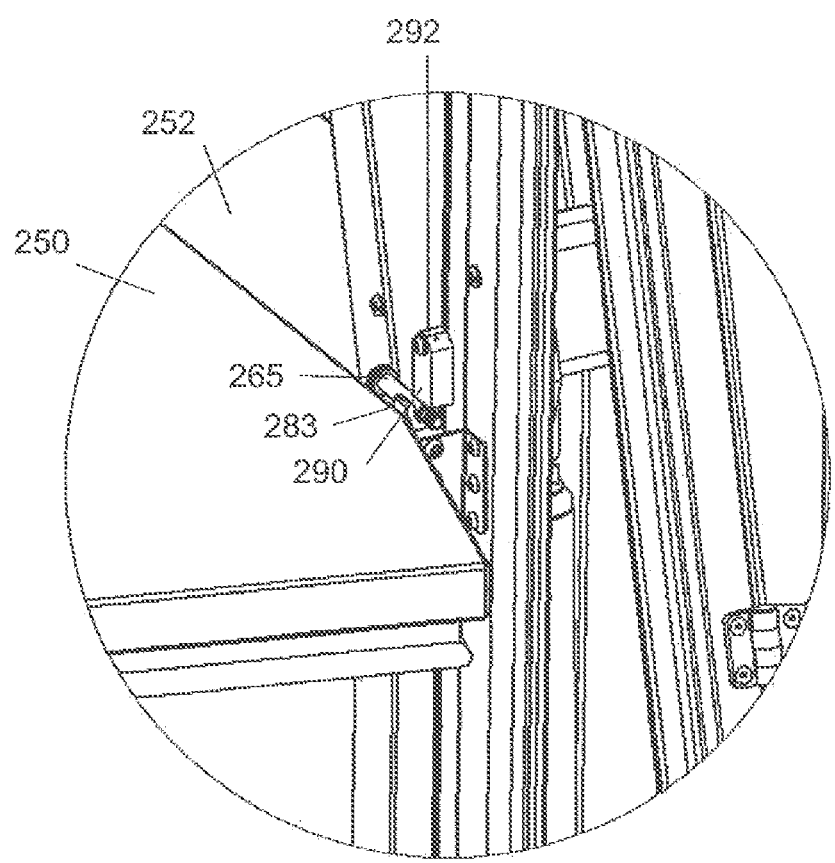
FIG. 19 is a detailed view of a rear-panel of the enclosure.

With the latches unlocked and the rear cover 250 removed from its location at the back of the camper 10, the rear cover 250 can be located at any one of numerous locations in or outside the camper 10 to function as a table. FIG. 8 illustrates a first exemplary position where the rear cover 250 is mounted to wall segment 72A across opening 111. Referring to FIGS. 18 and 19, a mount 280 is provided on each side of the opening 111 secured to wall segment 72A. The mount 280 also includes a hook 283 that receives pin 265 of the coupler 264. A stop or flange element 290 inhibits upward movement of the pin 265 out of the hook 283 unless the stop 290 is moved out of the way. In the embodiment illustrated, the stop 290 pivots from pin 292 hanging in a downwardly direction under the influence of gravity to maintain its position inhibiting pin 265 from departing hook 283. When it is desired to remove the rear cover from the mount 280, stop 290 is rotated so as to no longer be a blocking element.

Referring back to FIG. 8, the rear cover 250 is supported by a leg 300 at an end generally close to edge 254. In a preferred embodiment, the leg 300 is at least partially removably attached to an inner surface of the rear cover 250. For instance, the leg 300 can be joined at one end to an inner surface of the rear cover 250 such that when desired, the leg 300 can be rotated or pivoted downwardly substantially orthogonal to the inner surface of the cover 250. When not functioning as a table leg, leg 300 can be rotated so as to be substantially parallel to the inner surface of the cover 250 when mounted back on the camper to function as a rear cover secured to the primary platforms 21.

Figure 20:
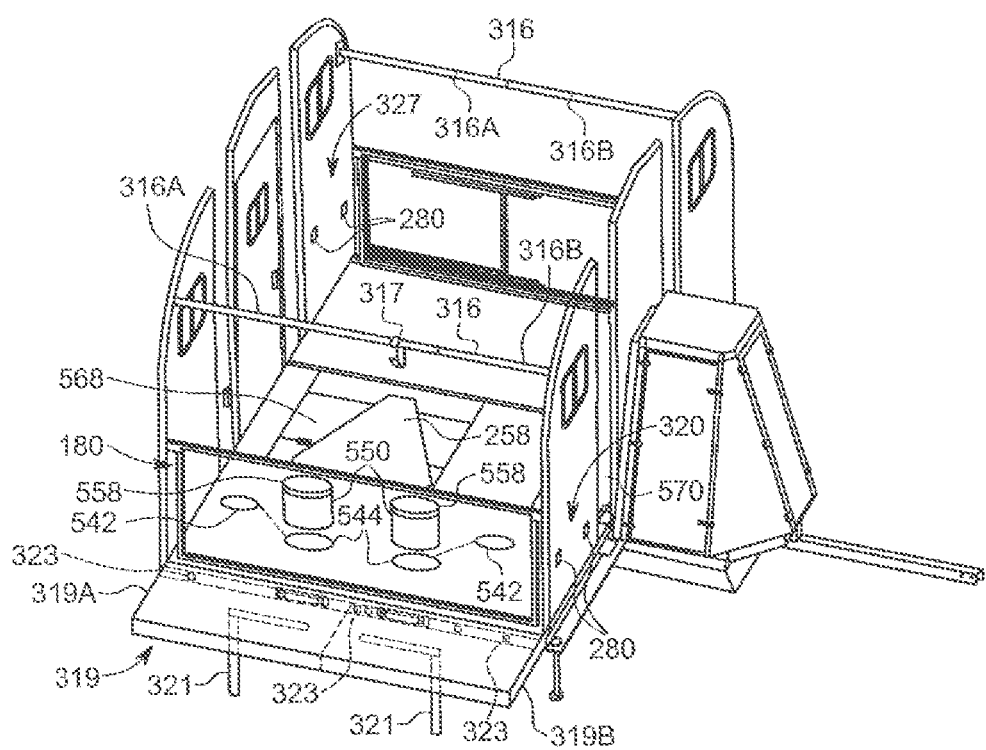
FIG. 20 is a perspective view of the enclosure with parts removed.
Figure 20A:
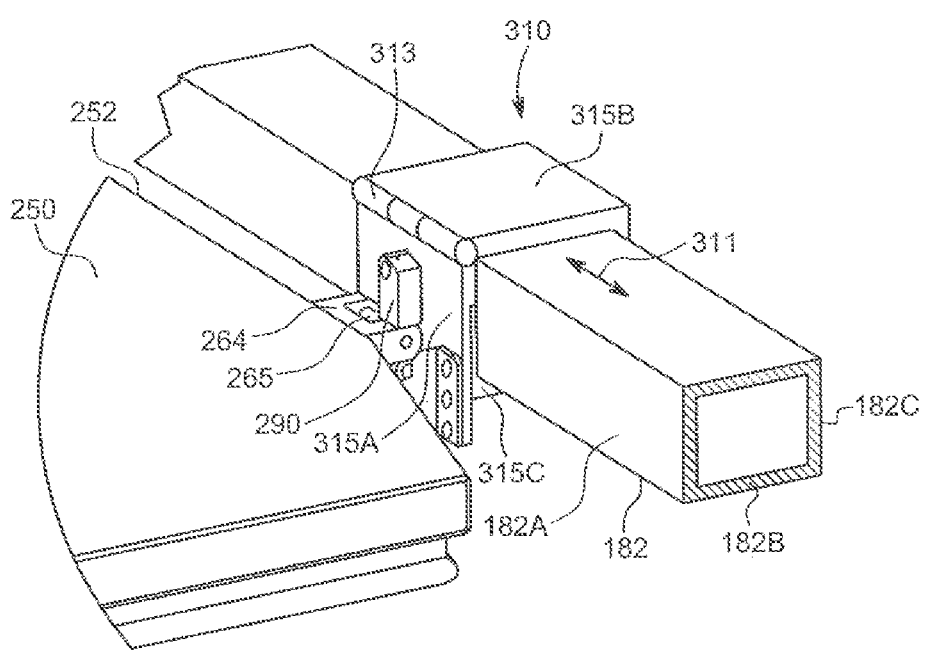
FIG. 20A is a detailed view of a rear-panel of the enclosure.

As indicated above, the rear cover 250 can be mounted to numerous locations on the camper that is wherever a pair of mounts similar to mounts 280 described above are provided. Referring to FIGS. 3, 20 and 20A, the edge 252 of the rear cover 250 can be secured to components of the collapsible support frame 180, for example to horizontal support 182. If desired, mounts 310 similar to mounts 280 can be moveably secured to support 182 such that the mounts 310 and the rear cover 250 can be easily moved as desired along the support 182 as indicated by double arrow 311.

If desired, rear cover 250 can also be tilted upwardly so as to free up floor space within the camper 10. In the embodiment illustrated, mount 310 includes a hinge 313 between members 315A and 315B of mount 310. Hook 283 and stop 290 are mounted to member 315A and rotate with rear cover 250 to a vertical position or at least vertically inclined, elevated position. Support portion 315C, which extends from an inwardly facing surface 182A of support 182, around a lower surface 182B, along a back surface 182C and is joined to or made integral from a single unitary body with member 315B inhibits all motion of the mount 310 except in the direction indicated by double arrow 311, if desired. A hinge similar to hinge 313 can be used to mount hook 283 and stop 290 in the location similar to that illustrated in FIG. 19, if desired.

If the rear cover 250 is configured to tilt upwardly, a hook or catch 317 can be provided as illustrated in FIG. 8 to hold the rear cover 250 in the elevated position. Preferably, the leg 300 is also hinged so that it can be removably secured to the downwardly facing surface of the rear cover 250 in the elevated position. When the rear cover 250 is mounted to support 182 a support strut 316 illustrated in FIG. 20 extending between the wall assemblies 23 can be provided.

If the rear cover 250 is mounted to the support rail 182, the catch 317 can be slidably mounted to the strut 316 to again support the rear cover 250 in the elevated position.

Referring again to FIG. 20, pairs of mounts 280 can be provided on other wall segments such as on outer surfaces of the wall segments such as at 320, other inner surfaces of the wall segments such as at 322. If desired, the rear cover 250 can also be attached to the primary platforms 21 if mounts are provided on outer edges such as at 324. Depending on the location and/or a desired height of the rear cover, the leg 300 can be adjustable in length such as comprising telescoping portions.

Removable Upper Cover

Figure 16:
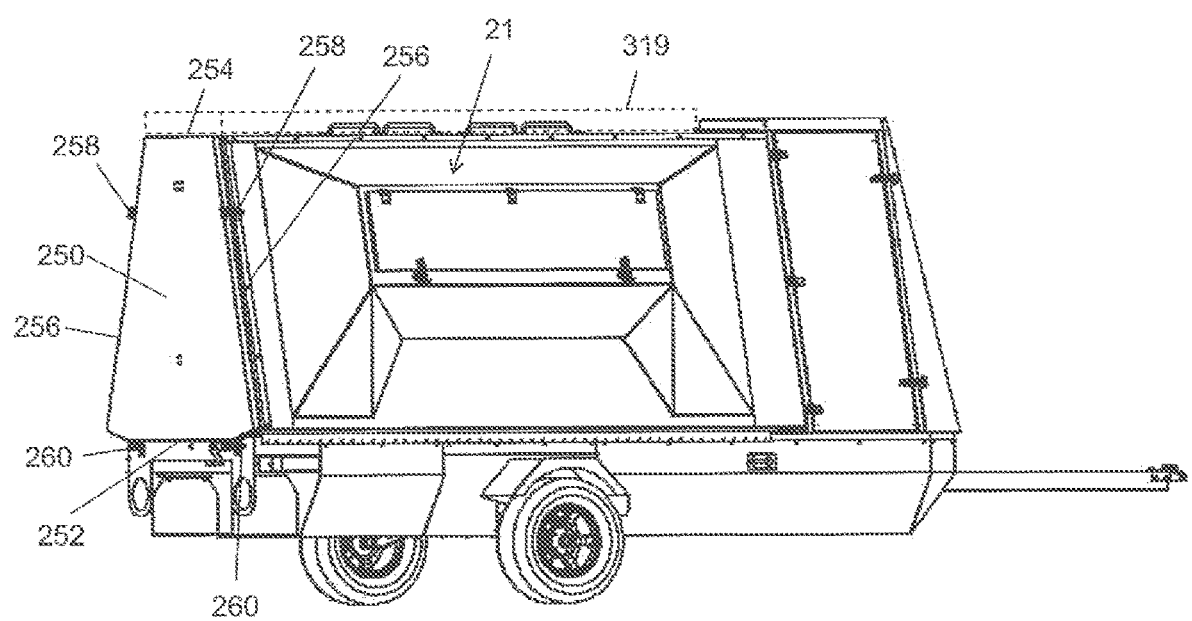
FIG. 16 is a perspective view of the enclosure.
Figure 17:
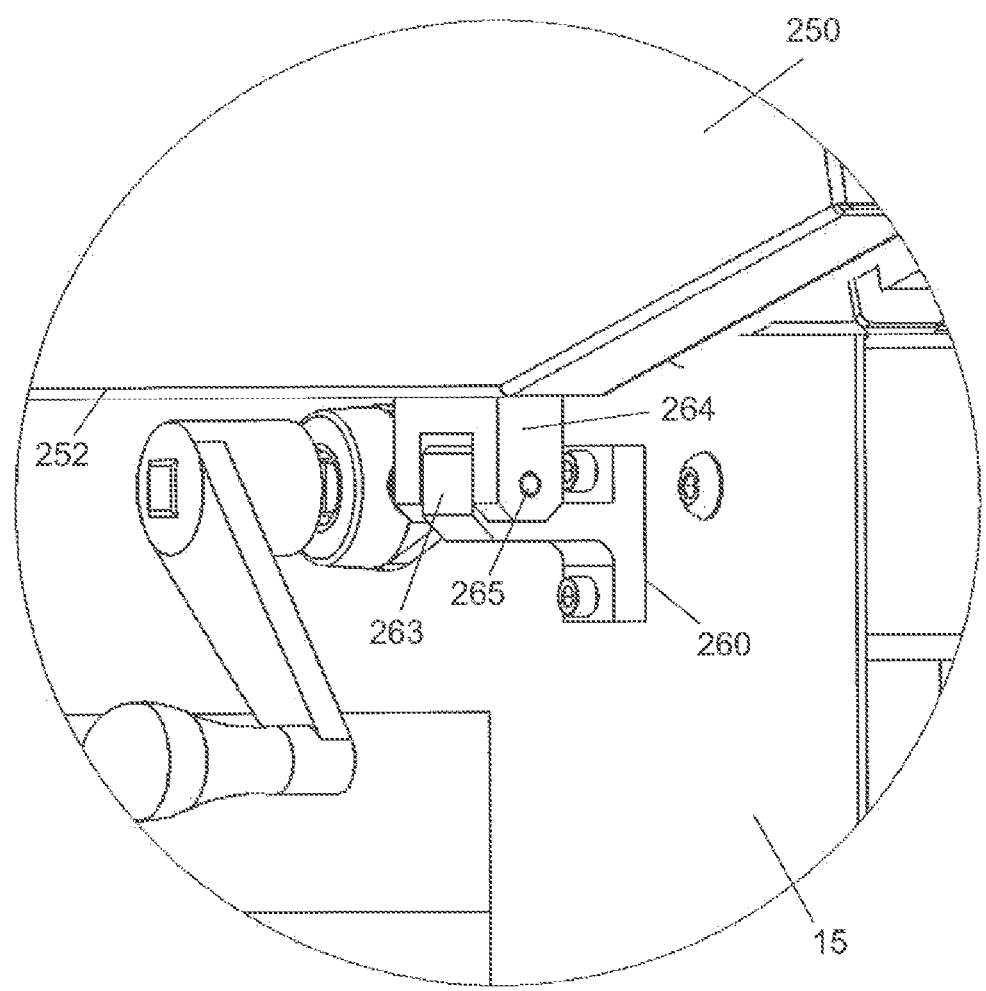
FIG. 17 is a detailed view of a rear-panel of the enclosure.

In a similar manner, an upper cover 319 of the camper 10 (used when the camper 10 is in the completely folded position, illustrated in FIG. 16 in dashed lines, to cover the outer edges 21B of the primary platforms 21, or work with the outer edges 21B so as to enclose the space between folded portions of the wall assemblies 23 from above) can also be used at table or shelf for example as illustrated in FIG. 20. The upper cover 319 includes suitable clips, clasps or other fasteners, not shown, to hold the upper cover 319 in place when the camper 10 is being transported. When it is desired to set up the camper 10, the upper cover 319 is removed from its position illustrated in FIG. 16. In one embodiment, the upper cover 319 an be attached to camper 10 such as to one of the outer edges 21B as illustrated in FIG. 20 using a mounting element (schematically illustrated at 323) such as a suitable clip, clasps or other fastener, the form of which can vary. If desired, one or more legs 321 can also be used to help support the upper cover 319 when functioning as a table or shelf. The legs 321 can be adjustable in length such as being telescoping. In a manner similar to leg 300 for rear cover 250, the leg(s) 319 can be attached to an inner or lower surface when not in use as illustrated in dashed lines in FIG. 20, and also can be pivotally attached to the lower surface such that the leg(s) 321 can be easily moved from a storage position to a position when the leg(s) 321 are used as supports. It should also be noted that the upper cover 319 can comprise two or more panels 319A, 319B (each with one or more legs 321), allowing panels 319A, 319B to be used at different locations attached to portion(s) of the camper 10, or as a free standing table with a suitable number of legs 321.

Figure 16A:
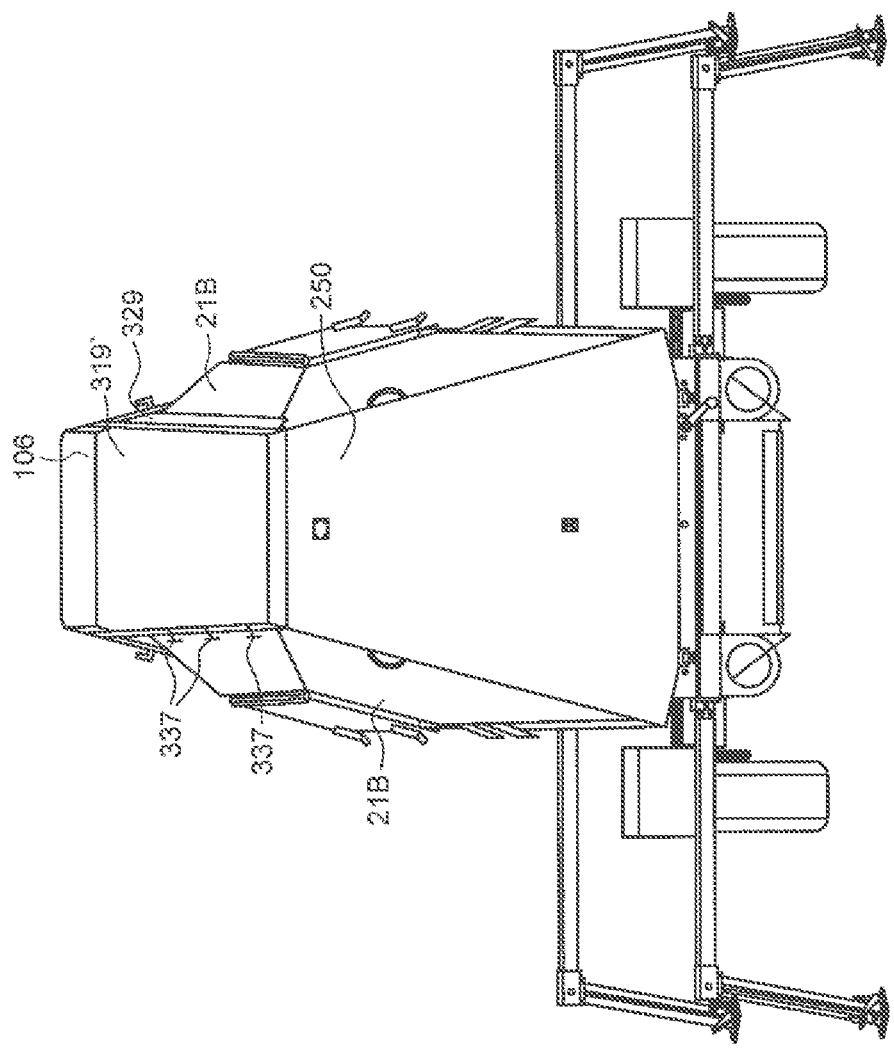
FIG. 16A is a perspective view of the enclosure.
Figure 16B:
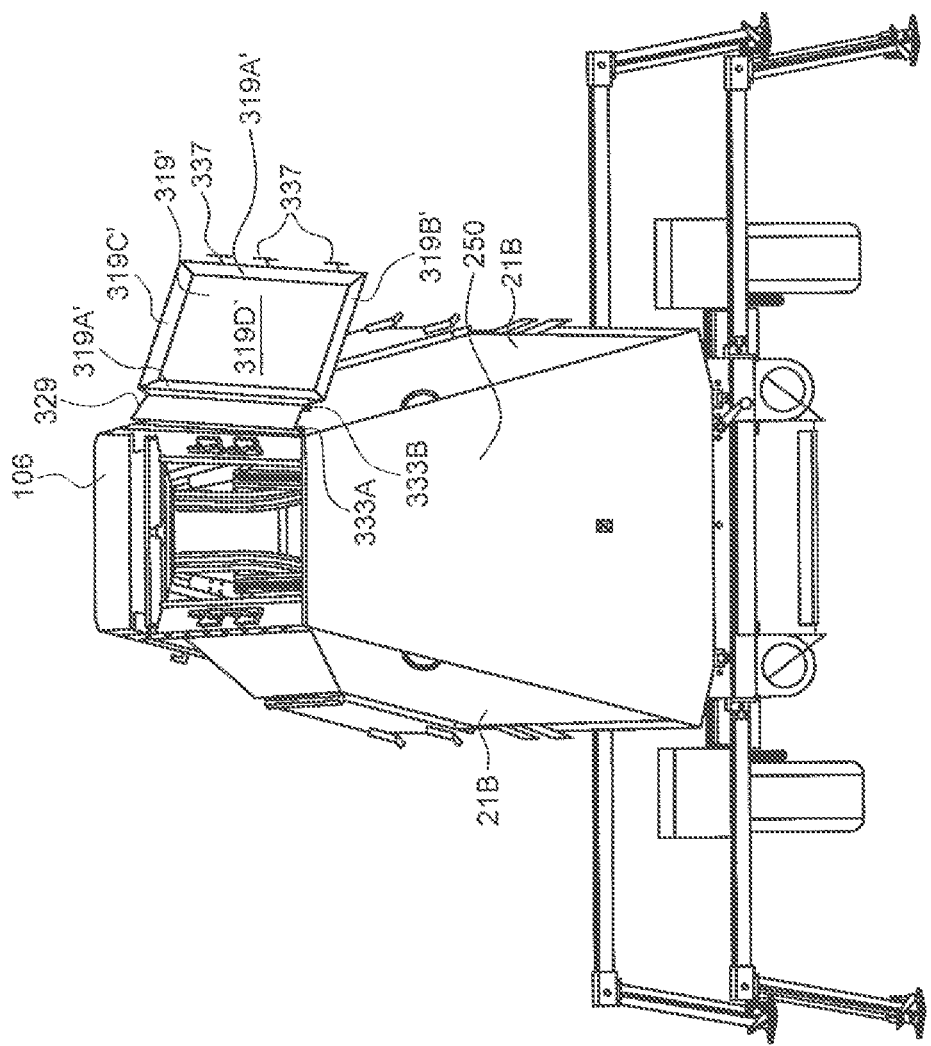
FIG. 16B is a perspective view of the enclosure.

FIGS. 16A and 16B illustrate another form of cover 319' of the camper 10 (used when the camper 10 is in the completely folded position, illustrated in FIG. 16 in dashed lines, to cover the outer edges 21B of the primary platforms 21, or work with the outer edges 21B so as to enclose the space between folded portions of the wall assemblies 23 from above). The cover 319' can have side walls 319A' that overlap outwardly facing edge portions 21B of the walls of the primary platforms 21. Similarly a rear wall 319B' overlaps a portion of rear cover 250. A front wall 319C' can be provided to abut a portion of the storage compartment 106 or a seal connected thereto.

In this embodiment, the cover 319' is hinged along one longitudinal edge with a hinge mechanism 329. The hinge mechanism 329 can take any number of forms. In one embodiment, the hinge mechanism 329 allows the cover 319' to be uncoupled from primary platform 21 when desired. In the exemplary embodiment, the hinge mechanism 329 is formed from a flexible fabric 329A coupled on one longitudinal edge to cover 319' and on the opposite longitudinal edge to primary platform 21. Each of the longitudinal edges of the fabric 329A edges can have enlarged edges inserted in the slotted channels 333A, 333B which can be formed for example from fabric tubing or awning rope, such as sold by Keder of Shenzhen, China. This form of fabric connection is discussed in more detail below with respect to other fabrics connected to various portions of the camper 10. Fasteners 337 hold the cover 319' down on the longitudinal side opposite hinge mechanism 329. The fasteners 37 can comprise snaps, hook and loop fasteners, latches, ties, etc. connected to flexible and/or stretchable straps if desired. In the embodiment illustrated, elastic connectors 337 are illustrated. If desired, when the platform 21 is lowered, the cover 319' can remain attached to the platform 21 so that the cover 319' hangs substantially vertically. This can be advantageous in forming a more protected area below the primary platform 21 to shield items placed under the platform 21 from rain, etc.

In one embodiment, a major portion 319D' and walls 319A', 319B' and 319C' can be formed integral, for example, from rigid panels connected to one another in a rigid manner, or stamped or formed as a single unitary body. In another embodiment, one or more of the major portion 319D' and walls 319A', 319B' and 319C' can be connected to each other in a flexible manner, allowing the joined panels to move slightly with respect to each other. In yet another embodiment, one or more of the major portion 319D' and walls 319A', 319B' and 319C' can be formed of flexible fabric. If needed additional fasteners can be provided to connect major portion 319D' and/or walls 319A', 319B', 319C' to the walls of the primary platform 21B, storage compartment 106 and/or rear cover 250.

Support Struts for Wall Assemblies and Storage Thereof

Referring to FIGS. 8, 20, 20B and 20C depending on the longitudinal length of the inside of the camper from opposed wall assemblies 23 versus a vertical height of ends of the struts 316 on the opposed wall assemblies 23, it may be advantageous that each of the struts 316 as well as struts 71 be telescoping, herein represented where each strut 71 comprises telescoping portions 71A and 71B, and each strut 316 comprises telescoping portions 316 an 316B.

Figure 20C:
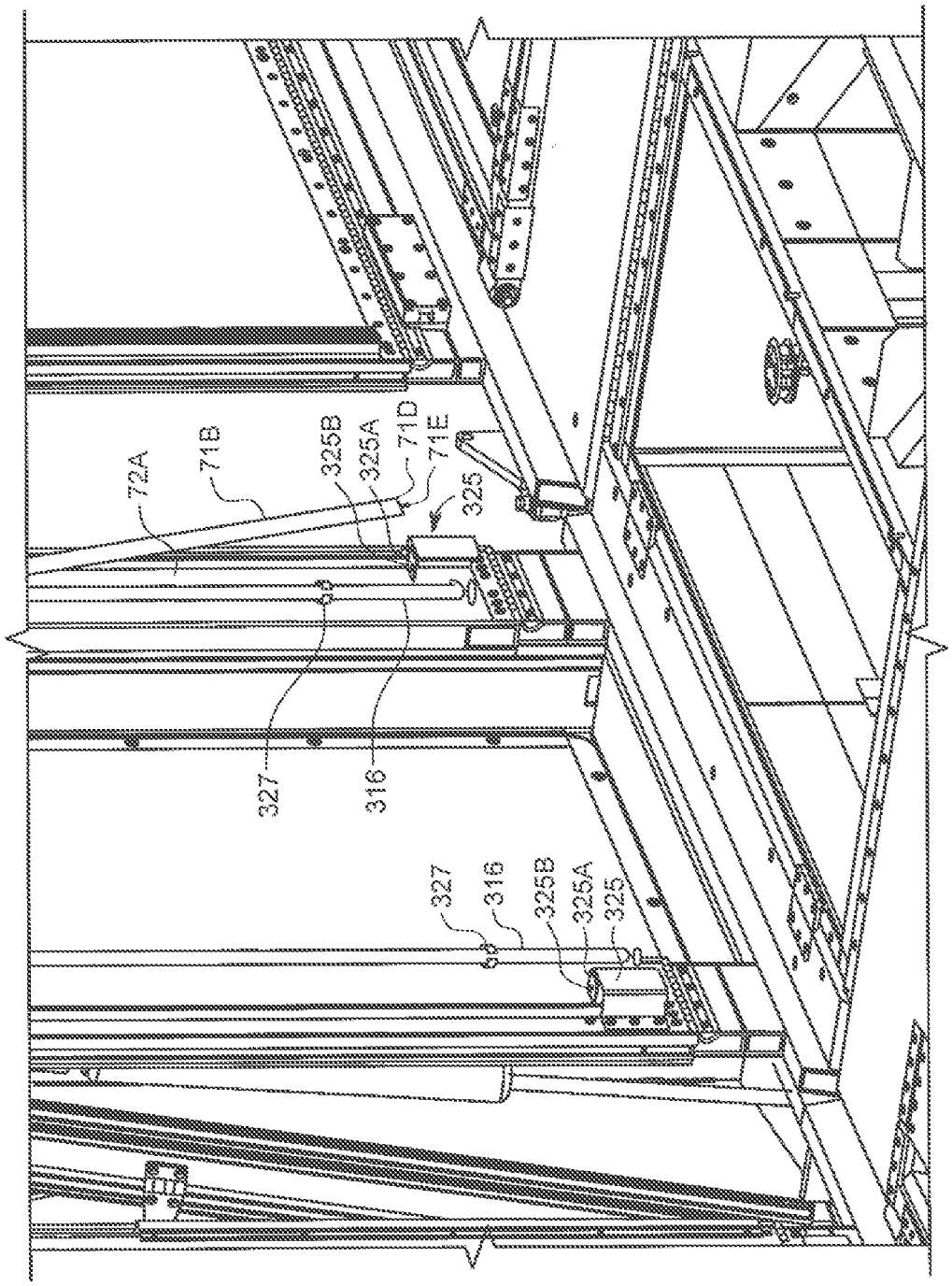
FIG. 20C is a perspective view of a portion of a wall assembly.

In a particular advantageous embodiment, struts 71 and/or struts 316 can be secured in a stationary manner when the camper is the folded position as illustrated for example in FIG. 16. Referring first to struts 71 as illustrated in FIG. 20B, a first end 71C of each strut is fixedly but pivotally secured to wall segment 72A of front wall assembly 23 so as to allow each strut 71 to hang from the first end 71C downwardly generally parallel to wall segment 72A when not extended such that end 71D is positioned closer to stationary platform 28 (FIG. 20C). Preferably, a lower holding device 325 is provided on wall segment 72A of the front wall assembly 23 to hold end 71D in a fixed, but removable manner such that each strut 71 will remain generally parallel to wall segment 72A as the wall segment 72A is moved from or to the upright position illustrated in FIG. 8 from a lower position when the wall assembly 23 lies generally parallel to the stationary platform 28. The lower holding device 325 can take numerous forms such as but not limited to a clasp, a strap, a clip, a latch, a socket, a hook and loop fastener to name just a few. In the embodiment illustrated, end 71D includes a narrower protrusion 71E extending out from end 71D. The lower holding device 325 comprises a slightly compliant plate member 325A having an aperture 325B configured to receive the protrusion 71E but not the entire end 72D. The plate member 325A deflects slightly so that the protrusion 71E can be inserted in the aperture 325B. The plate member 325A then springs back so as to inhibit the protrusion 71E from exiting the aperture 325B as the wall assembly 23 is raised or lowered.

If desired, struts 316 can also be stored on wall assembly 23 as it is raised or lowered. In a particular convenient location, each strut 316 is disposed adjacent to one of the struts 71. One or more holding members 327 are provided on wall segment 72A to hold each of struts 316 generally parallel to one of the struts 71. In the embodiment illustrated, two spaced apart holding members 327 are provided. Like holding devices 325, holding members 327 can take numerous forms such as but not limited to a clasp, a strap, a latch, a socket, a hook and loop fastener to name just a few. In the embodiment illustrated holding members 327 comprise clips configured to partially surround an outer surface of the strut 316 with sufficient pressure to hold the strut 316 in a fixed position relative to the holding members 327.

Removable Portions of Canopy

In an advantageous embodiment illustrated in FIGS. 21-24, the canopy 17 comprises an outer fabric layer 17A and an inner fabric layer 17B, each of which are fixedly connected to the wall assemblies 23 from when the wall assemblies 23 are in the folded transport configuration of the camper 10 to the extended configuration where the wall assemblies 23 are unfolded from the platforms 21 and are erected. As illustrated in FIG. 21, camper 10 can also include a plurality of fabric support connections 350A and 350B for outer fabric layer 17A and inner fabric layer 17B, respectively. The fabric support connections 350A and 350B extend along the edges 352 and 354 of the front and rear wall assemblies 23, respectively, and extend along the edges 21B of the primary platforms 21. The fabric support connections 350A and 350B are spaced apart from each other so as to hold fabrics 17A and 17B away from each other in the extended or unfolded position of the camper 10 so as, if desired, to trap air therebetween and thereby provide an insulated roof and side walls.

Figure 22:
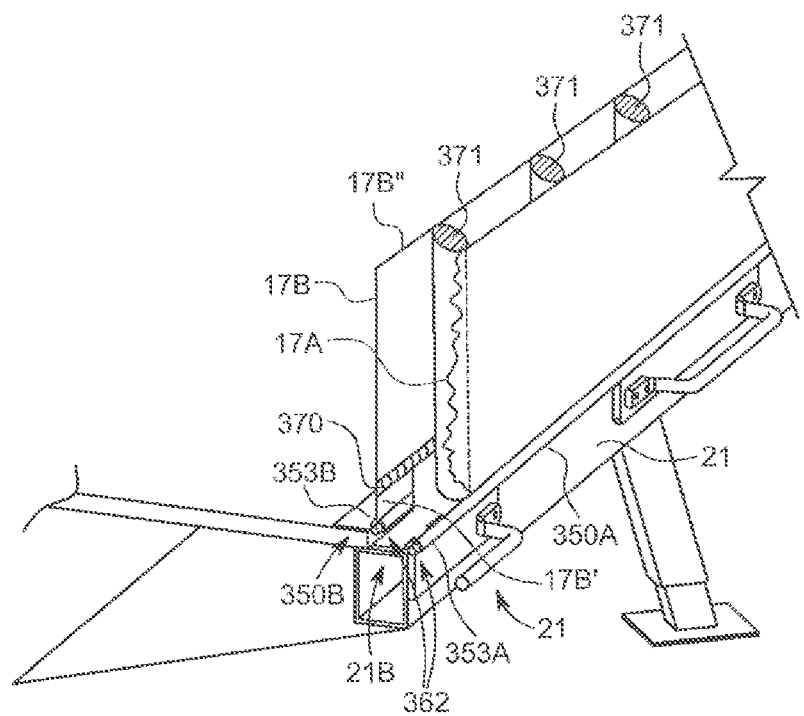
FIG. 22 is a detailed view of a portion of a platform.

By way of example with reference to edge 352 in FIGS. 10, 21 and 22, the fabric support connections 350A, 350B each have a lateral edge support 342 for elongated slotted channels 343A, 343B, respectively. The fabrics 17A, 17B extend out of the slot of the slotted channels 343A, 343B. The slotted channels 343A, 343B can be integrally formed together from a single unitary body such as from a single extrusion 344. In the embodiment illustrated for the wall assemblies 23, the extrusion 344 is L-shaped where slotted channel 343A for the outer fabric 17A is disposed along the outer edge of the wall segments 72 and where the lateral edge supports 342 of each of the connections 350A and 350B connected together form support portions 345A and 345B of the extrusion 344. Support portion 345A covers the outer edge of the wall segments 72 of the wall assemblies 23, while support portion 345B is disposed on inwardly facing surfaces of the wall segments 72 of the wall assemblies 23. In another embodiment, the elongated slotted channels 343A and 343B are not integral (i.e., formed of a single unitary body) but rather are separate pieces connected, if desired, by way of a fastener such as but not limited to an adhesive and/or a plurality of pins 345 attached to the wall segments 72.

As illustrated in FIGS. 10 and 22, the fabric support connections 350A, 350B for primary platform 21 also include slotted channels 353A, 353B for fabrics 17A, 17B and are substantially similar to the slotted channels 343A, 343B disposed on edges 342, 344 in that they are spaced apart from each other and have slots, herein opening upwardly, with portions of the fabrics 17A, 17B extending therethrough. As with the slotted channels 343A, 343B disposed on edges 342, 344 the slotted channels 353A, 353B disposed along edges 21B can be separate parts (as illustrated) secured to edges 21B of each of the platforms 21 or integrally formed from a single unitary body.

At this point it should be noted that the fabrics 17A, 17B at edges thereof have enlarged ends 362 inserted in the slotted channels 343A, 343B and 353A, 353B which can be formed for example from fabric tubing or awning rope, such as sold by Keder of Shenzhen, China.

Figure 1A:
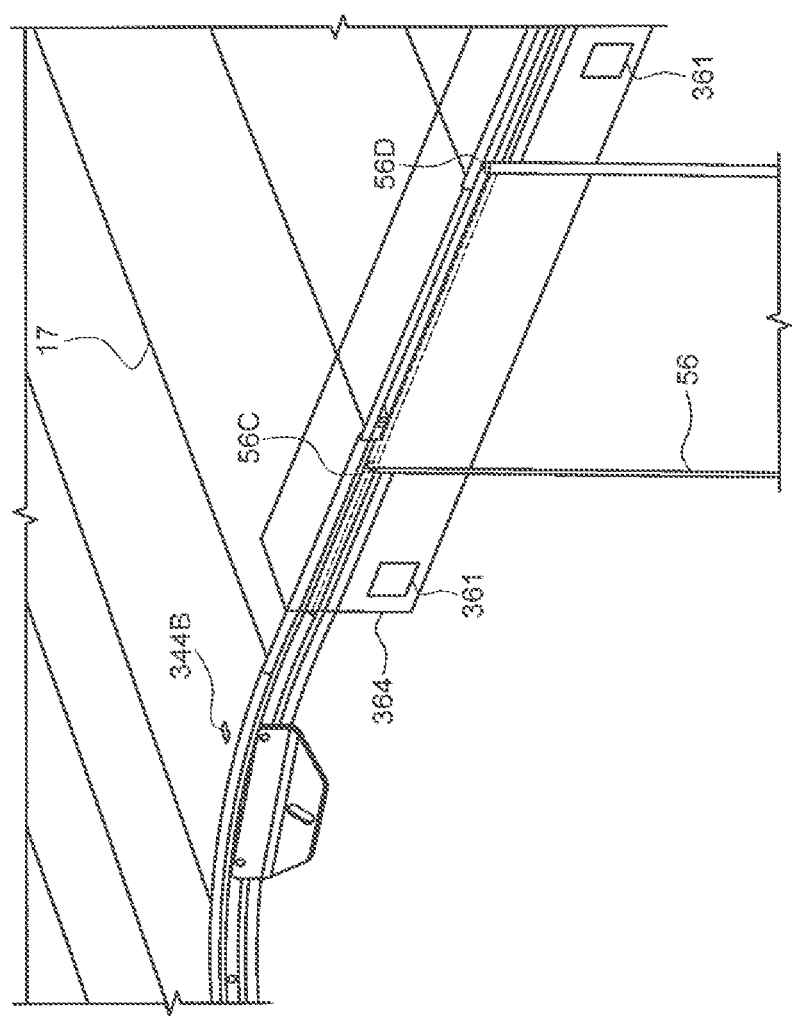
FIG. 1A is a detailed view of a portion of the enclosure.

In the illustrated embodiment in FIGS. 1 and 1A, the extrusion 344 for the front and rear wall assemblies 23 does not extend continuously along edges thereof, but rather comprises three sections. A first section 344A of the extrusion 344 starts at one of the side edges of the wall assembly 23 and extends longitudinally through the top edge of the wall assembly 23 until it encounters a first end 56A of the hinge 56. A second extrusion section 344B of the side extrusion 344 begins at a second end 56B of the hinge 56 and curves around to a first end 56C of a second hinge 56. A third section 344C of the side extrusion 344 starts at a second end 56D of the second hinge 56 and slightly curves at top edge and extends downwardly alongside vertical edge. In other words, extrusion 344B is disposed along the upper edge of the middle wall segment 72A of each of the wall assemblies 23, while extrusions 344A and 344C are disposed along the edges of the side wall segments 72B, 72C of each of the wall assemblies 23. Each of the fabric connections 350A, 350B of ends adjacent extrusions 344A, 344B, 344C are aligned with each other such that the enlarged ends 362 of fabrics 17A, 17B can extend from one extrusion to another extrusion.

Flaps or covers 364 are provided so as to cover the hinges 56 where the fabric connections 350A, 350B on the wall segments 72A-72C are separated from each other (because of the hinges 56 between the wall segments 72A-72C). The covers or flaps 364 help seal any open gaps that may exist between the ends of the fabric connections 350A, 350B (herein formed as extrusions 344A-344C). Portions of the covers or flaps 364 can be secured to the fabric 17A and/or hinge 56 such as by bonding or sewing. If desired one end of the covers or flaps 364 can be loose and after configuration of the trailer in the extended position, then the loose portion can be secured to the fabric 17A or wall segment 72 by fasteners such as hook and loop fasteners 361. Covers 364 can be separate elements or formed integrally as a single unitary body from fabric 17A or the material forming hinge 56.

In one embodiment, the material of the inner fabric 17B may be different than the material of the outer fabric 17A. For example, the inner fabric 17B may be lightweight and allow moisture to transfer through it. In another configuration as mentioned above, both the inner fabric 17B and the outer fabric 17A can trap air inside for insulation, yet still allow for moisture to travel through.

In a further embodiment, the inner fabric 17B can comprise separable portions such as illustrated in FIG. 22 and FIG. 23 (where fabric 17A has been removed). Generally, separable portions allow the inner fabric 17B to be removed such as when two fabrics canopies are not needed, but also allow different fabrics of different materials and/or fabric weights to be used depending on for example the season of use. In a particularly advantageous embodiment, the inner fabric 17B comprises a first portion(s) 17B' that remains secured to fabric connection 350B such as being mounted in slotted channels 343B and 353B using enlarged fabric ends 362. Second portion(s) 17B" are removably secured to portion 17B' with a fastening device 370. In the embodiment illustrated fastening device 370 comprises a zipper; however, other fastening devices include snaps, buttons, hook and loop fasteners, etc. The inner fabric 17B from edge 21B of one primary platform 21 to the edge 21B of the other primary platform is an inverted U-shape or arch since it is also secured to edges 352 and 354 of the front and rear wall assemblies 23. The fastening device 370 can comprise a single device such as a single zipper, or a plurality of fastening device portions such as a separate portion (e.g. zipper) for each of the edges 21B and/or edges 352, 354. FIG. 23 illustrates a portion of fastening device 370 as it extends along the platform 21 and then transitions to wall segment 72B. If desired, outer fabric 17A could also comprise separable portions similar to inner fabric 17B so as to allow different materials and/or fabric weights to be used when desired, or when maintenance or replacement is required.

Canopy Fabric Separators

As mentioned above, it can be desirable to maintain separation of the outer fabric 17A and the inner fabric 17B so as for example to provide an insulated canopy 17. Referring to FIGS. 1 and 22, if desired, one or more spaced apart separators 371 can be disposed between the outer fabric 17A and inner fabric 17B to help maintain separation. Referring to FIG. 22, the separators 371 are elongated and if desired can extend along the length of the canopy 17 (as one single continuous length or as spaced apart portions) from the outer edge 21B of one primary platform 21 to the outer edge 21B of the other primary platform 21 as schematically illustrated in FIG. 1. The separators 371 can take numerous forms but preferably is rigid enough to maintain separation of the outer fabric 17A and the inner fabric 17B when the canopy 17 is extended between the wall assemblies 23. In a further embodiment, if desired, each separator 371 is flexible or compressible enough such that it can remain between the outer fabric 17A and inner fabric 17B, when the camper 10 is folded up in a transport position. Each separator 371 can comprise a compressible foam, loose material, inflatable bladder, or the like or combinations thereof. Each separator 371 can be permanently secured to the outer fabric 17A and/or the inner fabric 17B such by an adhesive, bonding, etc. The separator 371 can also be removably secured to the outer fabric 17A and/or the inner fabric 17B such as by clips, clasps, loops or other fastening devices including hook and loop fasteners.

Figure 22A:
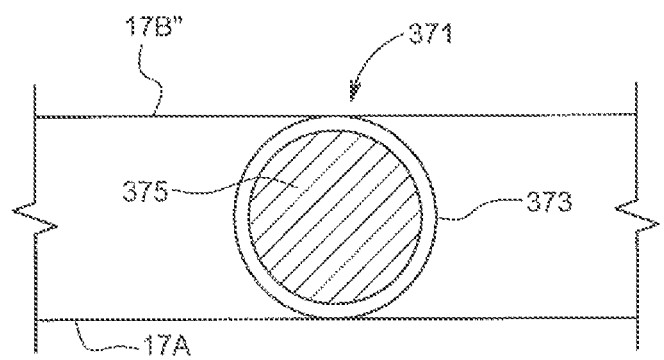
FIG. 22A is a schematic view of a wall separator.

If the inner fabric 17B is removable or includes a removable portion 17B", the separator(s) 371 can be removed from between the inner fabric 17B and the outer fabric 17A when the inner fabric 17B or the fabric portion 17B" is removed. FIG. 22A illustrates the separator 371 comprising a support sleeve 373 joined to at least one of the inner fabric 17B or the outer fabric 17A with an inner filler 375 being an elongated foam rod or tube. If desired, the support sleeve 373 can include a fastening device(s) such as snaps, clips, ties, hook and loop tape, zipper or the like that allows the inner filler 375 to be removed from the support sleeve 373, while the support sleeve 373 remains attached to the fabric and/or to disconnect the support sleeve 373 (and the inner filler 375 to be removed as a unit) from the fabric(s) 17A and/or 17B.

It should also be noted separator(s) 371 can also be present in the hinges 56 as illustrated in FIG. 1.

Canopy Attachment

Figure 24:
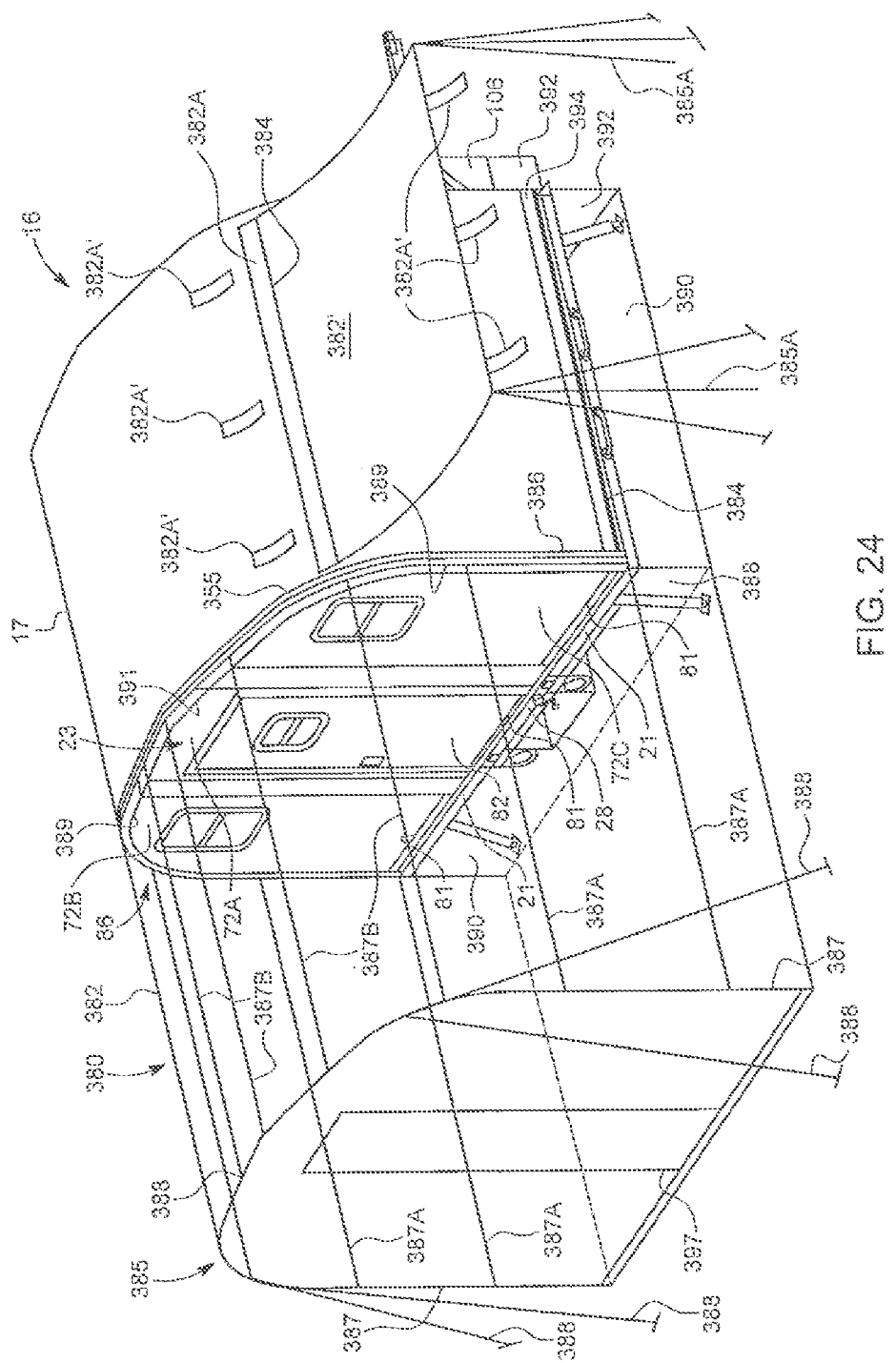
FIG. 24 is a perspective view of the enclosure.
Figure 24A:
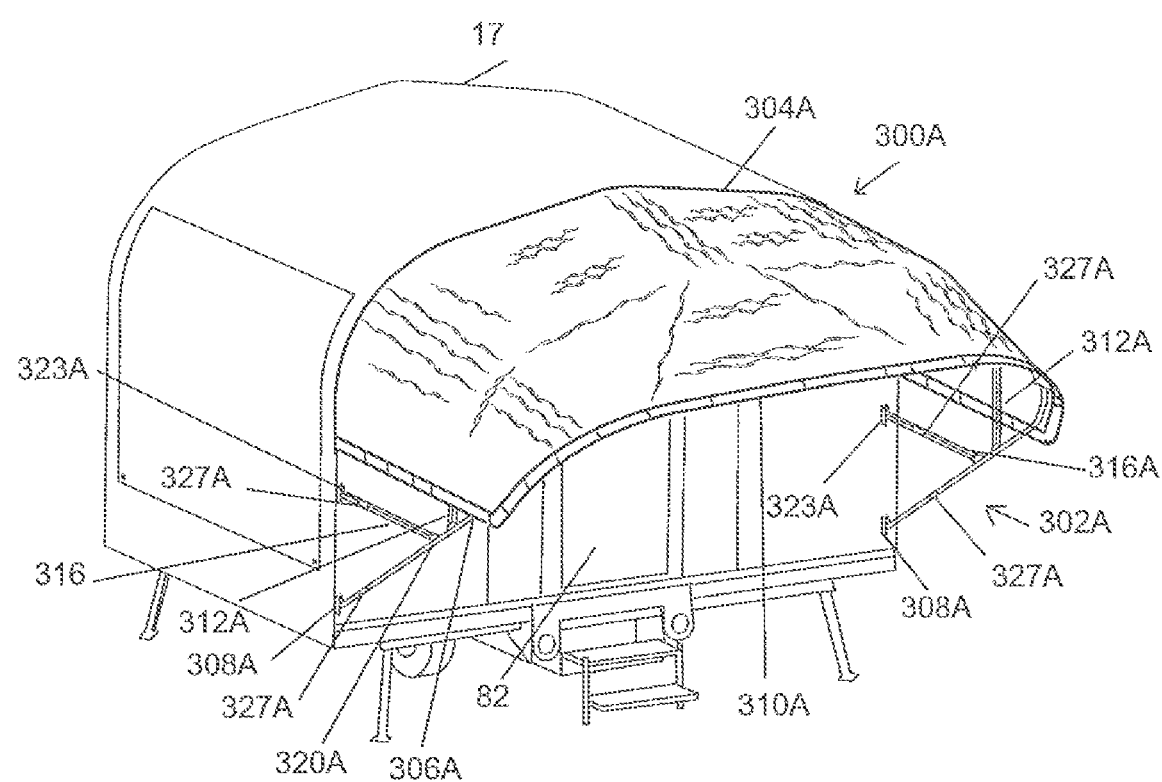
FIG. 24A is perspective view of the enclosure.
Figure 24B:
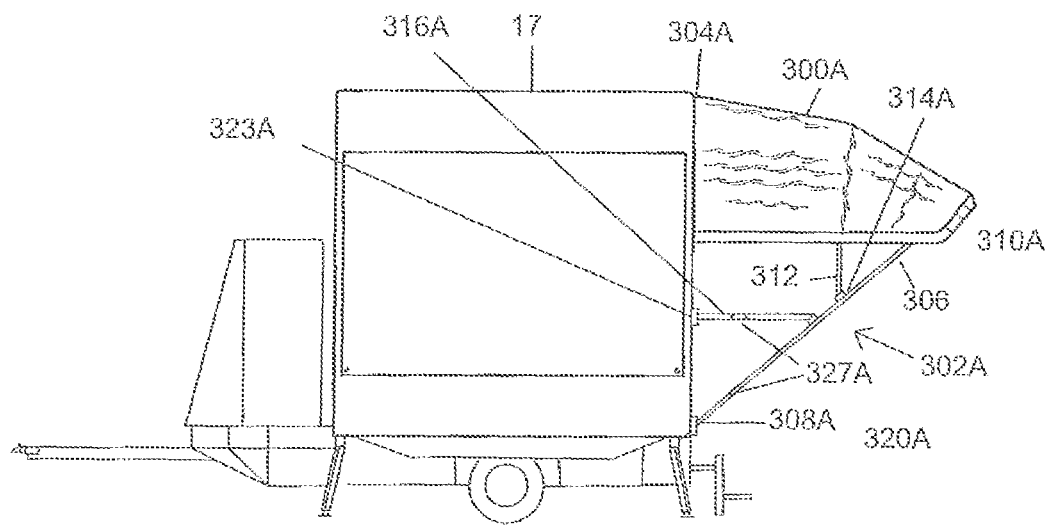
FIG. 24B is a left-side elevational view of the enclosure.
Figure 24C:
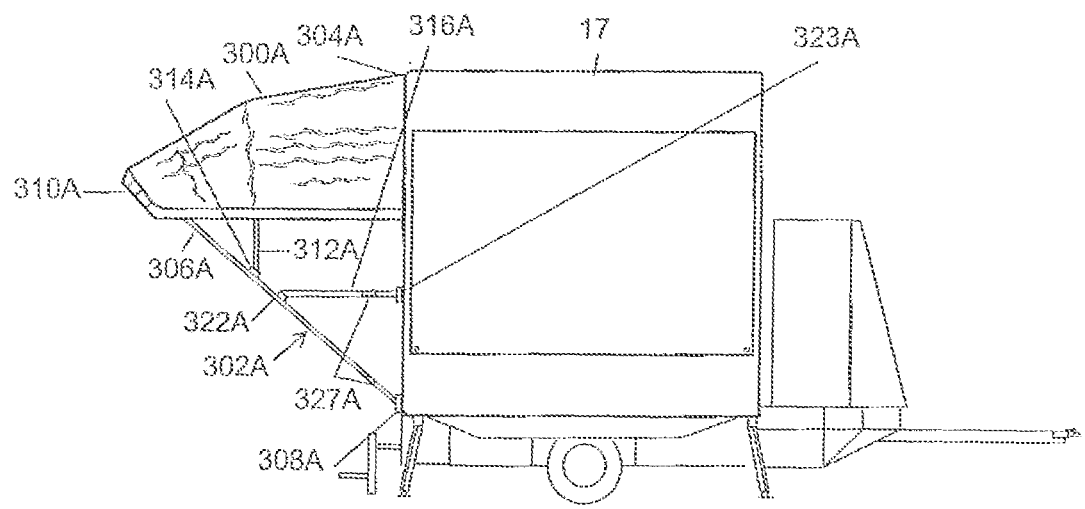
FIG. 24C is a right-side elevational view of the enclosure.

FIG. 24 illustrates attachment 380 that can be used to provide an enclosed outdoor space. Generally, the canopy attachment 380 includes a fabric 382 that is secured to at least a portion of the wall assembly 23. In the illustrated embodiment, the fabric 382 is secured proximate edge 355 so as to form an enclosed space at a rear end of the camper 10; however, this should not be considered limiting. Likewise, although illustrated as being secured proximate to the entirety of edge 355, this should not be considered limiting in that if desired a smaller space could be formed by securing the canopy to only a portion of edge 355.

At a position(s) remote from the connection of the fabric 382 to the camper 10, a frame support 385 is provided so as to support the fabric 382 above a ground surface remote from the camper 10. The frame support 385 can take any number of forms depending upon the desired shape of the enclosed space. In the embodiment illustrated, vertical supports 387 extend upwardly and are connected together by a center section 388 herein generally in the shape of edge 355. If desired, side supports 387A and/or upper supports 387B can connect to and extend between the vertical supports 387 and the rear wall assembly. Although this specific shape is not required. Frame support 385 can be held in an upright position by guide lines 388, the number of which can vary depending upon the shape of the frame support 385 and/or the canopy attachment 380. In the embodiment illustrated, the canopy attachment 380 includes a passageway 397 herein formed by a loose flap of material, which can be provided with a fastening device such as a zipper or snaps as desired. The fabric 382 can be formed of a single material combinations of material. Typically, the fabric 382 is lightweight where portions may be waterproof so as to provide a cover, while other portions may comprise a screen material so as to allow airflow.

Attachments of the fabric material 382 to the camper 10 can be accomplished in a manner similar to that of inner or outer layers 17A/17B. For example, a slotted channel 389 similar to slotted channel 343 can extend along edge 354 on panels 72B and 72C, while an additional slotted channel 391 can be provided at the top of panel 72A. The fabric 382 can include an enlarged end similar to enlarged end 262 of inner and outer layers 17A and 17B so as to allow the fabric material 382 to extend out through the slots of the slotted channels 389, 391. In a manner similar to that described with respect to inner layer 17B in FIG. 23, the fabric 382 can comprise a first portion that remains secured to the slotted channels 389, 391 provided at edge 354 wherein a fastening device such as a zipper similar to that described above can be provided allowing a majority of the fabric material 382 to be selectively secured to the portion that remains secured to the wall assembly 23.

Figure 25:
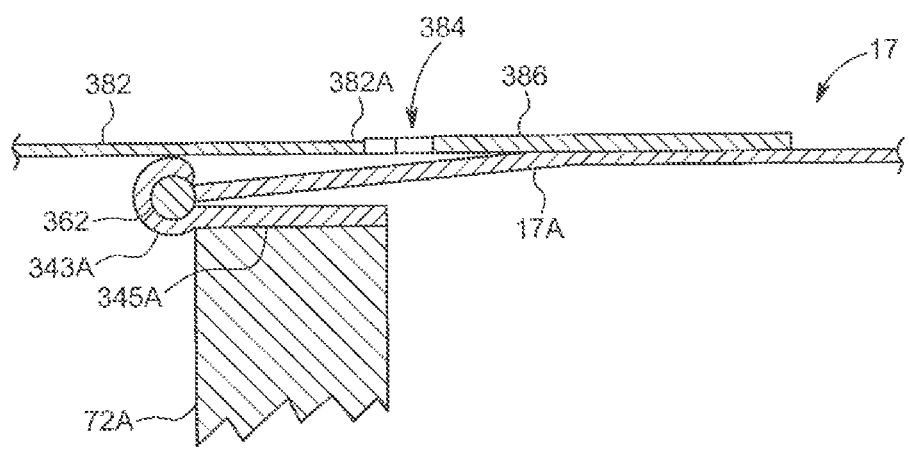
FIG. 25 is a schematic view of a portion of the perspective view of the enclosure with parts removed.

In another embodiment, which eliminates the need for additional slotted channels on the wall assembly 23, a fastening device such as a zipper can be used to secure or fasten the fabric material 382 to the canopy 17. FIG. 25 illustrates an end 382A of fabric 382 fastened to outer layer 17A of the canopy 17 with a fastening device comprising a zipper 384. A first portion of the zipper 384 is secured to a band of material 386 that is secured such as by bonding, sewing or an adhesive to the outer layer 17A. The band 386 is also illustrated in FIG. 24. The second portion of the zipper 384 is secured to end 382A.

Referring back to FIG. 24, in another embodiment, fabric 382' extends in a different orientation from canopy 17. Fabric 382' can be fixed secured to canopy 17 to extend outwardly therefrom. In this embodiment, vertical supports 385A are joined to remote corners of fabric 382', holding them upright so as to form a sunshade. However, it should be noted if desired an enclosure similar to attachment 380 could be oriented in the manner of fabric 382'. Likewise, a simple sunshade can be made to extend rearwardly rather than attachment 380.

The fabric 382' can be permanently joined to canopy 17 and fastening devices such as straps 382A' provided so as roll or foldup fabric 382' when an extending sunshade is not desired. If desired, fabric 382' can be removably attached to canopy 17 using the end 382A permanently joined to the canopy 17 and the zipper 384 in a manner similar to that discussed above with respect to fabric 382.

In addition to the fabric 382, additional panel(s) may be needed to fully enclose the desired space. Referring back to FIG. 24, a panel 388 is secured to the wall segments of the wall assemblies 23 or to the primary platforms 21 and stationary platform 28 so as to extend from these portions down to the ground surface. In addition or in the alternative, side panels 390 are secured to outer edges 21B of the primary platforms 21 while end panel(s) 392 is provided at the front of the camper 10. In view of the storage compartment 106 provided in this embodiment, the end panel(s) 392 may have to extend around the perimeter of the storage compartment 106 in addition to extending to each of the primary platforms 21. The panels 388, 390, 392 can be secured to portions of the camper using any suitable fastener such as snaps, slotted channels as described above and/or fastening devices such as zipper 384 secured to a strip of material 394 illustrated in FIG. 24.

If desired, adjacent panels 388, 390 and/or 392 may be secured together or form from a single sheet of material. For instance, half of panel 388 and half of panel 392 may be secured to panel 390, while the remaining half of panels 388 and 392 are secured to panel 390 on the opposite side of the camper 10. In this manner, half of panel 388, half of panel 392 and panel 390 can be folded upon each other and folded up into the camper when the wall assemblies 23 are laid flat. In this manner, individual attachment of all the panels after assembly of the camper to the extended position is not necessary. Rather, if panel 388 is secured to the primary platform 21 or the outer layer 17A, then the user can simply unfold each of the half panels 388, 392 and secure them to opposite ends of the camper as illustrated. Such securing devices can include clips, hook and loop fasteners, etc.

At this point, it should be noted that use of panels 388, 390 and 392 may be advantageous even if the enclosed space formed by canopy attachment 380 is not used. Use of these panels is particularly helpful in the winter to avoid air movement below the stationary platform 28 and primary platforms 21. The panels 388, 390 and 392 inhibit airflow so as to insulate the bottom of the camper 10. The loose edges of the panels 388, 390 and 392 can be staked or weighted down as desired or necessary.

Other embodiments for providing an overhang or an enclosed outdoor space, preferably, as a vestibule at the rear of the trailer about the door 82 is illustrated in FIGS. 24A-24G. FIGS. 24A-24D illustrate an overhang 300A. The overhang 300A is particularly advantageous because it is support be a frame 302A that in turn is supported by the rear wall assembly of the camper. Hence in this embodiment there are no additional poles, wires or the like that are connected to the overhang and rest upon or are secured to the ground. A perimeter edge 304A of the overhang 300A can be secured to the rear wall assembly using the techniques discussed above. The frame 302A comprises a plurality of U-shaped supports extending the width of the rear wall assembly. A first U-shaped 306A is joined at each end 308A to the rear wall assembly and extends outwardly and upwardly to define an outermost edge 310A of the overhang 300A. A second U-shaped support 312A is connected at ends 314A to support 306A and extends upwardly to a height approximately the same as the height of the canvas 17, or the height of the rear perimeter edge 304A. (It should be noted that the connection of the support 312A to support 306A can be a pivotal connection, which is not disconnectable). Additional side supports 316A are connected to the rear wall assembly 23 at 323A and at least one of the U-shaped supports 306A or 312A, herein illustrated a being connected to support 312A.

In one embodiment, each of the supports 306A, 312A and 316A are removably connected to the rear wall assembly and/or to material forming the overhang 300A. In one particularly advantageous embodiment, the U-shaped supports 306A and 312A are assembled from at least a couple of pieces that can be removably connected together. For instance, each of the U-shaped supports 306A can include two J-shaped portions and a center section that removably connects to each J-shaped extension. The side supports 316A can be pivotally connected to the U-shaped support 306A at end 320A so that when disconnected from the wall assembly, the side support 316A can lie generally flat and against the portion of the support 306A this it is pivotally connected to.

Figure 24D:
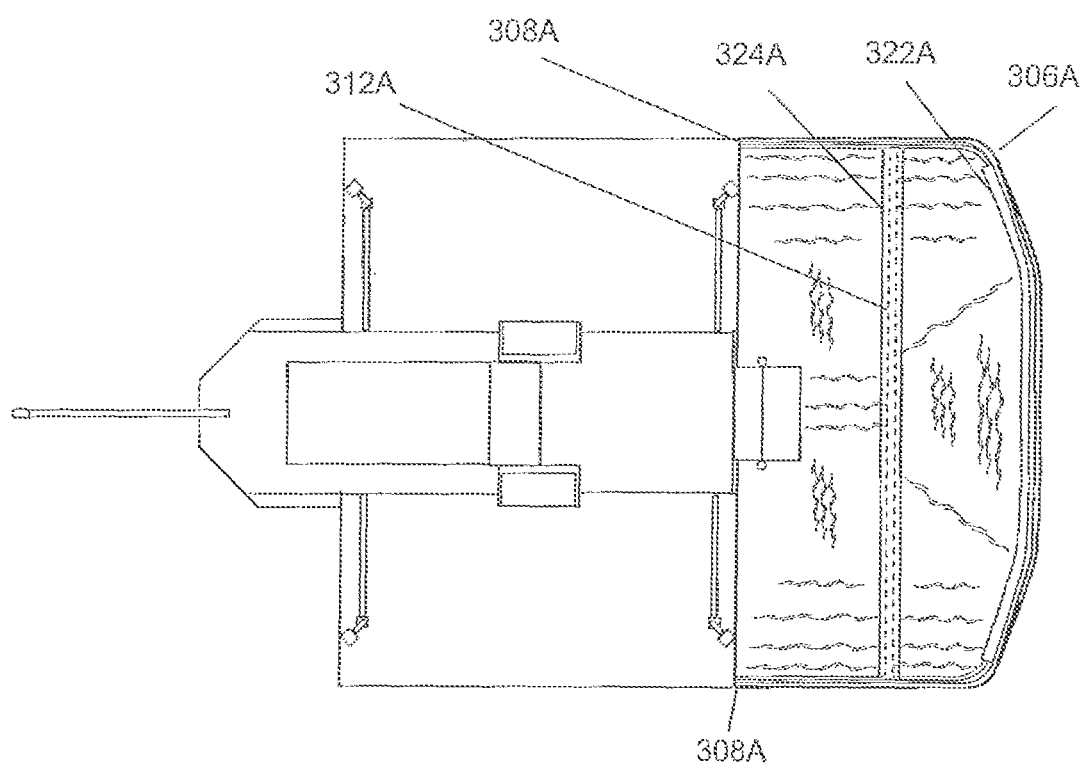
FIG. 24D is a bottom-plane view of the enclosure.

Referring to FIG. 24D, portions of each of the U-shaped supports 306A and 312A can be located in sleeves 322A and 324A, respectively on an underside of the overhang 300A. The sleeves 322A, 324A can include a fastener such as a zipper or a plurality of snaps or the like such that the sleeves can be opened, for instance along their longitudinal length, to allow portions of the U-shaped supports 306A and 312A to be placed therein. When the sleeves 322A, 324A are closed, the sleeves 322A, 324A capture the U-shaped supports 306A, 312A and thereby provide a strong connection between the material of the overhang and the frame 302A. The connection of the frame 302A to the rear wall assembly realizes an overhang structure able to withstand considerable wind loads or weight placed thereon such as by snow. However, with the frame 302A being able to be broken down into individual parts and the material removable from the frame 302A, the material and frame components are configured so that they can be placed within the interior space defined by the wall assemblies 23, when the wall assemblies 23 are in a folded condition such as illustrated in FIG. 16B, while still allowing the rear panel 250 to also be secured.

It should be noted the design of the overhang 300A and frame 302A allows it to be secured to the rear wall assembly 23 when the rear wall assembly 23 still lies flat, i.e. before it is lifted to extend the canvas shell 17 between the front and rear wall assemblies 23. Stated another way, the camper 10 is configured from the travel configuration to its extended position to function as a camper by first lowering each of the primary platforms 21, which yields the front wall assembly 23 lying upon the rear wall assembly 23. The front wall assembly 23 is then lifted to its upright position and connects to the storage compartment 106 at the front of the camper 10. At this point, the rear wall assembly 23 is still flat lying upon floor panels of the camper, i.e. the stationary platform 28 and the primary platforms 21.

The rear perimeter edge 302A can then be joined to the rear wall assembly 23. However it should also be noted that in a further embodiment, this connection could already have been made the material of the overhang 300A can be folded up with the wall assemblies 23 when the wall assemblies 23 are placed in the folded travel configuration.

The components of the frame 302A can then be connected to form the U-shaped supports 306A, 312A. The supports 306A, 312A and 316A are connected to the wall assembly 23 and supports 306A and 312A are located in sleeves 322A and 324A, however, the exact order of connections may vary.

Once the connections have been made, the overhang 302A extends upwardly, while the rear wall assembly 23 lies horizontally flat. The overhang 302A, and in particular portions of the frame 302A can then function as an aid to help lift the rear wall assembly 23 to an upright position, which at that time also extends the canvas 17 between the front and rear wall assemblies 23.

In one embodiment, the support 306A and/or side supports 316A can include couplings 327A that allow the length of the support 306A, 316A to retract and extend over a limited distance. Since the overhang 300A is generally taut when assembled connection of the the supports 306A, 316A to the rear wall assembly 23 may be difficult because the material of the overhang 300A is at that time stretched. With the supports 306A and/or 316A being able to be placed in a condition where they are a little shorter connection of the supports 306A and/or 316A to the rear wall assembly 23 can then be made. After connection has been made, the couplings 327A are manipulated to lengthen the support 306A and/or 316A, which cause the overhang 302A to stretch and assume a taut configuration.

Figure 24E:
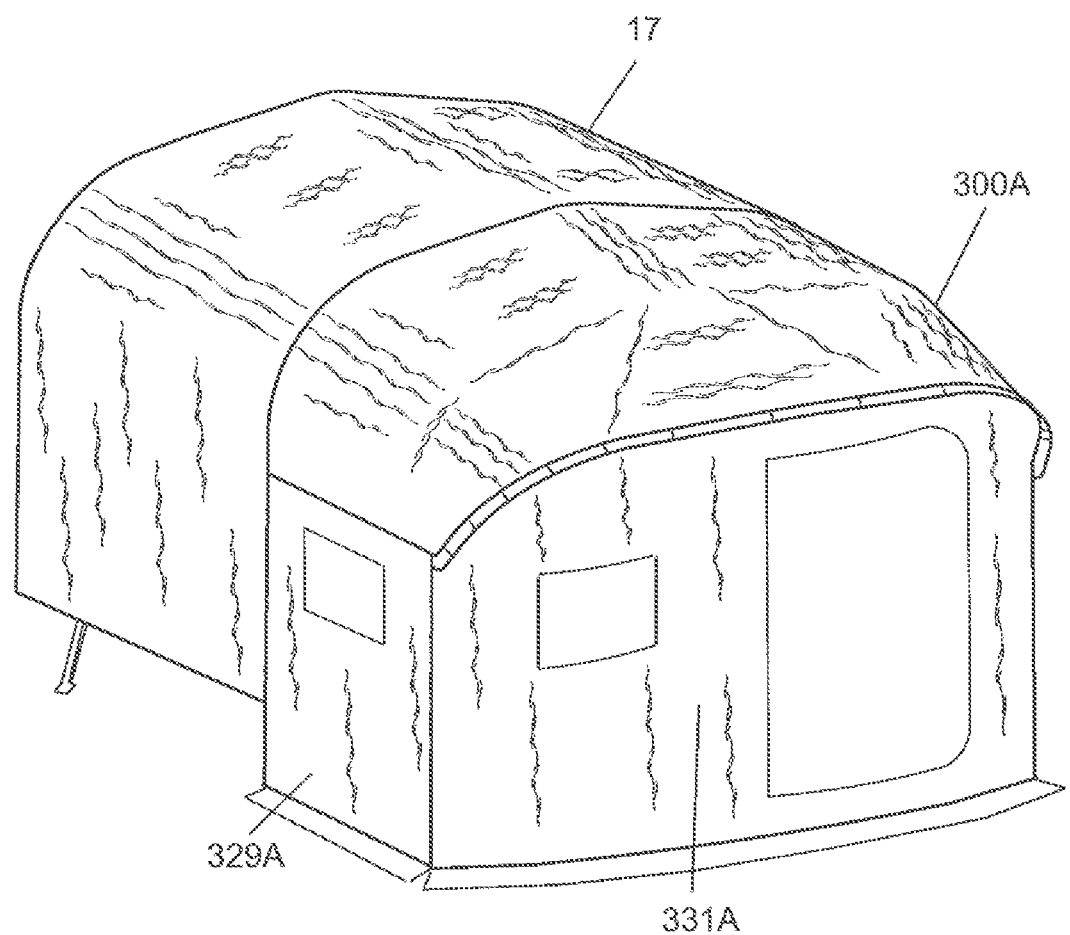
FIG. 24E is a perspective view of the enclosure.
Figure 24F:
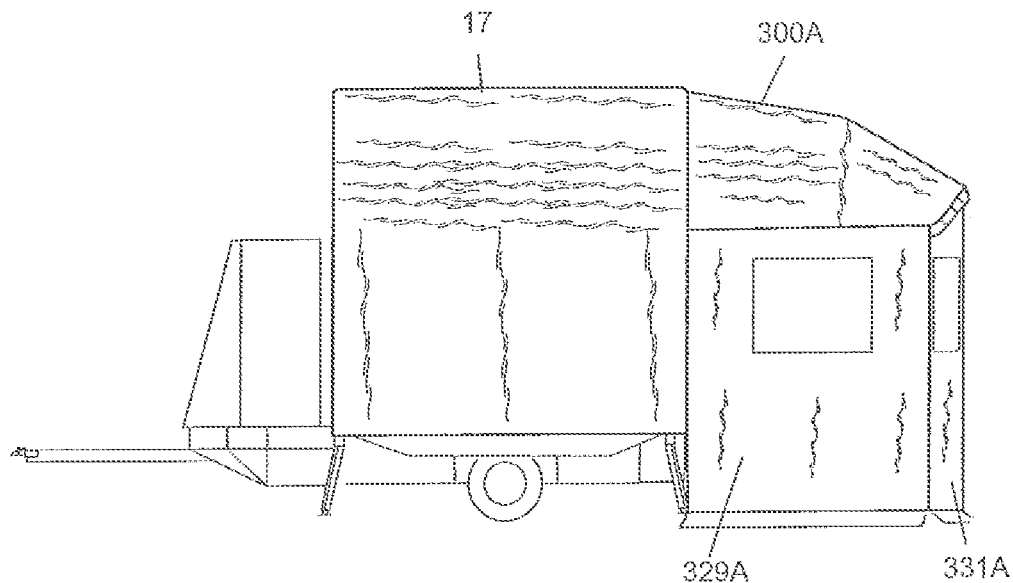
FIG. 24F is a left-side elevational view of the enclosure.
Figure 24G:
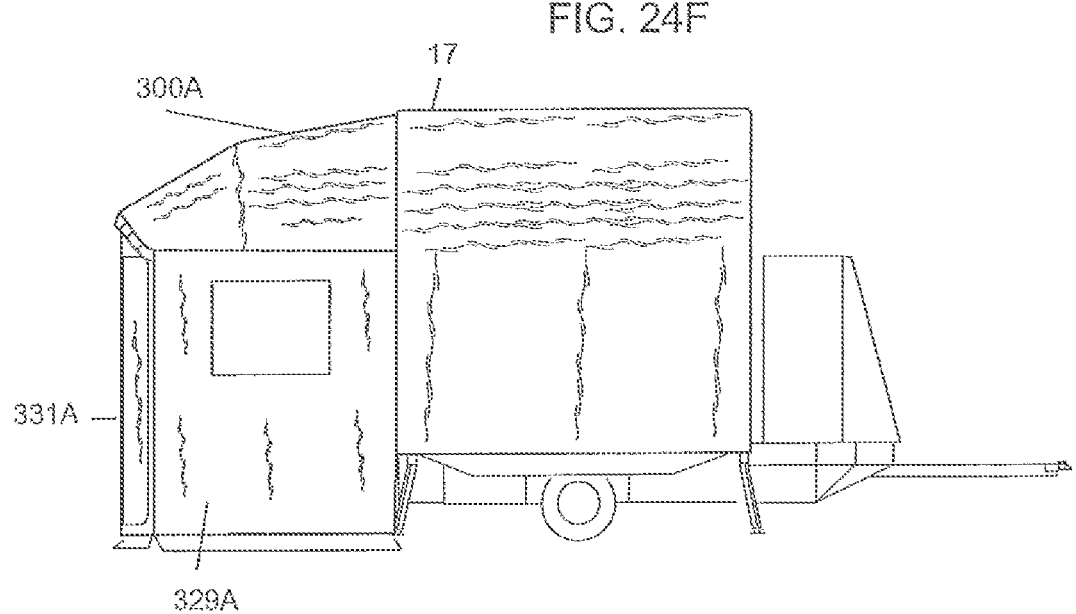
FIG. 24G is a right-side elevational view of the enclosure.

FIGS. 24E-24G illustrate side walls or panels 329A and a front wall or panel 331A that can be joined to the overhang 300A such that the overhang 300A and the frame 302A supports the panels 329A and 331A in an upright position without the need of any additional frame supports, although such could be provided in a further embodiment. The panels 329A and 331A are joined to the overhang with suitable fasteners such as zippers that extend along the edges that are joined together. In a further embodiment, the panels 329A, 331A can be made of material that is solid, transparent, translucent or is a screen. In this manner, different panels made of different materials can be used when desired. For instance the panels may comprise screen material, which might be nice in hot environments, while other panels may comprise solid material that forms a wind or rain shield, and which can also be insulated for use during the winter or cold environments.

Hard Side Walls

Figure 26:
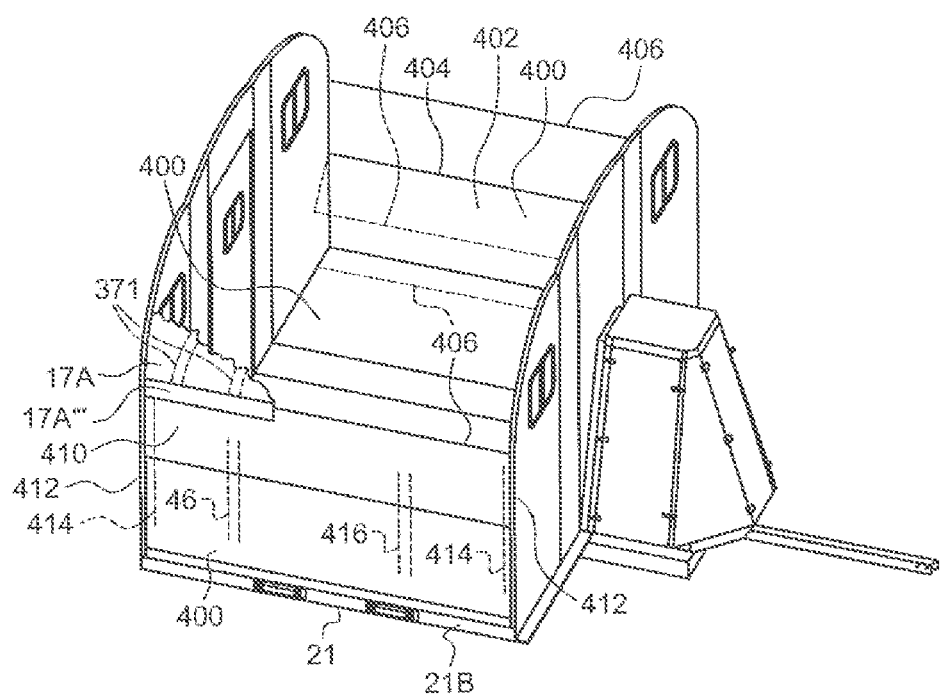
FIG. 26 is a perspective view of the enclosure with parts removed.

FIGS. 26-33 illustrate multiple embodiments where rigid or hard side walls are provided extending between the wall assemblies 23. Referring first to the embodiment of FIG. 26 side walls 400 are hinged to each of the primary platforms 21 along the outer edge 21B from a first position where each side wall 400 is substantially flat with the primary platform 21 to an unfolded, upright position wherein each side wall 400 extends between the wall assemblies 23 when the wall assemblies 23 are each in the unfolded, upright position. FIG. 26 illustrates side wall 400 in each of these positions. It should be noted that the side walls 400 can be used to help support the wall assemblies 23 in the upright positions. In addition, the side walls 400 can be used along with the hinge collapsible support rail 180 and/or the rest of the frame members described above to function as a cot, bench or table. Typically, the support rail 180 would be hingeably mounted to the primary platform 21 such that it is inward of the side walls 400, or stated another way, the side walls 400 are the outer most elements hingeably joined to the primary platform 21. As appreciated by those skilled in the art, the location of the hinged connection of the side wall 400 to the primary platform 21 would be such that the side wall 400 can lay upon the support rail 180 and other frame members connected thereto in the folded position where the side wall 400 is substantially flat or planar with the primary platform 21.

In a further embodiment, the side wall 400 can include an optional portion 402 that is moveable with respect to the side wall 400. In a first embodiment, the portion 402 is joined to an upper edge 404 of the side wall 400 with hinge(s), not shown, such that the portion 402 can rotate relative to edge 404 of the side wall 400. An intermediate position of the portion 402 is illustrated with dashed lines in FIG. 26. The portion 402 can be folded upon the side wall 400 and will also lay substantially flat on the primary platform 21. In FIG. 26 a longitudinal edge 406 of the portion 402 is identified in its uppermost position with a solid lines and with dashed lines in the intermediate position and when laid flat upon the primary platform 21.

A second embodiment illustrating movement of a portion 410 is also illustrated in FIG. 26. In this embodiment, the portion 410 is slidably mounted to the side wall 400 wherein in a first embodiment, edges 412 of the portion 410 are slid relative to the side wall 400 and the wall assembly 23 with guides 414, illustrated schematically. The guides 414 can include separate guide elements mounted to the side wall 400 as well as to the wall assemblies 23 to allow sliding movement of the portion 410. In other words, complementary guide members can be mounted on the edges 412 and on the wall assemblies 23 so as to cooperate with each other when the portion 410 is slid upwardly and downwardly with respect to the wall assemblies 23. In another embodiment, edges 412 directly engage the guides 414. If desired, other guides 416 can be provided between the side wall 400 and the portion 410 so as to cooperate with each other and allow sliding movement of the portion 410 relative to the side wall 400.

Figure 27:
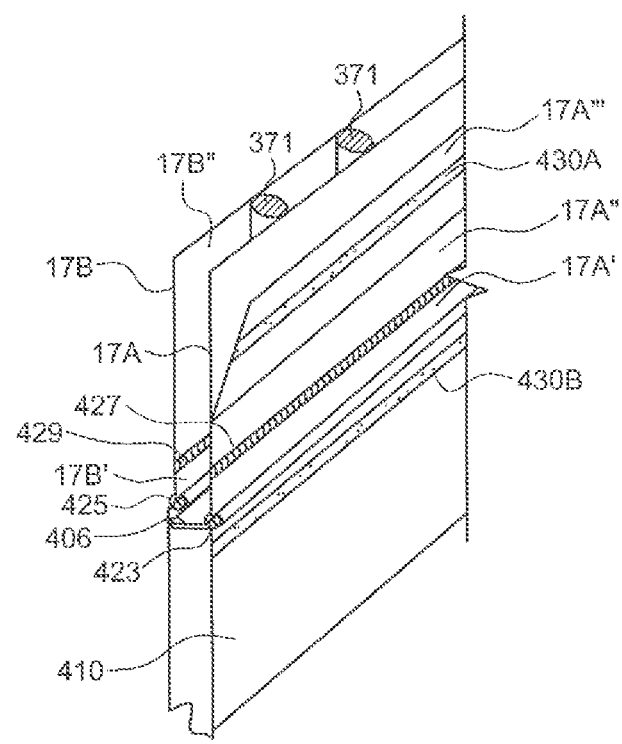
FIG. 27 is a detailed view of a portion of a wall.

Referring also to FIG. 27, in a first embodiment, the canopy 17 can be removably joined to an upper edge of the side wall 400, or portion 402 or portion 410 is provided. Referring to the portion 410 by way of example, outer fabric 17A and/or inner fabric 17B can be removably secured to or proximate to upper edge 406. As described above with respect to securing the fabric 17A and 17B to the primary platform 21 various forms of fasteners can be used including snaps, hook and loop fasteners and/or zippers to name a few. In a manner similar to that described above, if desired, slotted channels 423 and 425 can be fixed to edge 406. The slotted channels 423 and 425 can removably receive and secure outer fabric 17A and/or inner fabric 17B. In a preferred embodiment, the outer fabric 17A and/or the inner fabric 17B comprises a first portion 17A', 17B' and a second portion 17A" and 17B" wherein the fastener, herein zippers 427 and 429, respectively, join the respective portions of the fabrics 17A and 17B together. If desired, outer fabric 17A can also include a hinged flap or portion 17A''' that includes a hook and loop fastener 430A and 430B that provides a cover over the zipper or fastener 427 so as to provide a waterproof outer layer. Separator(s) 371 as described above can also be provided as illustrated in FIGS. 26 and 27 and FIG. 30 by way of example.

Figure 28:
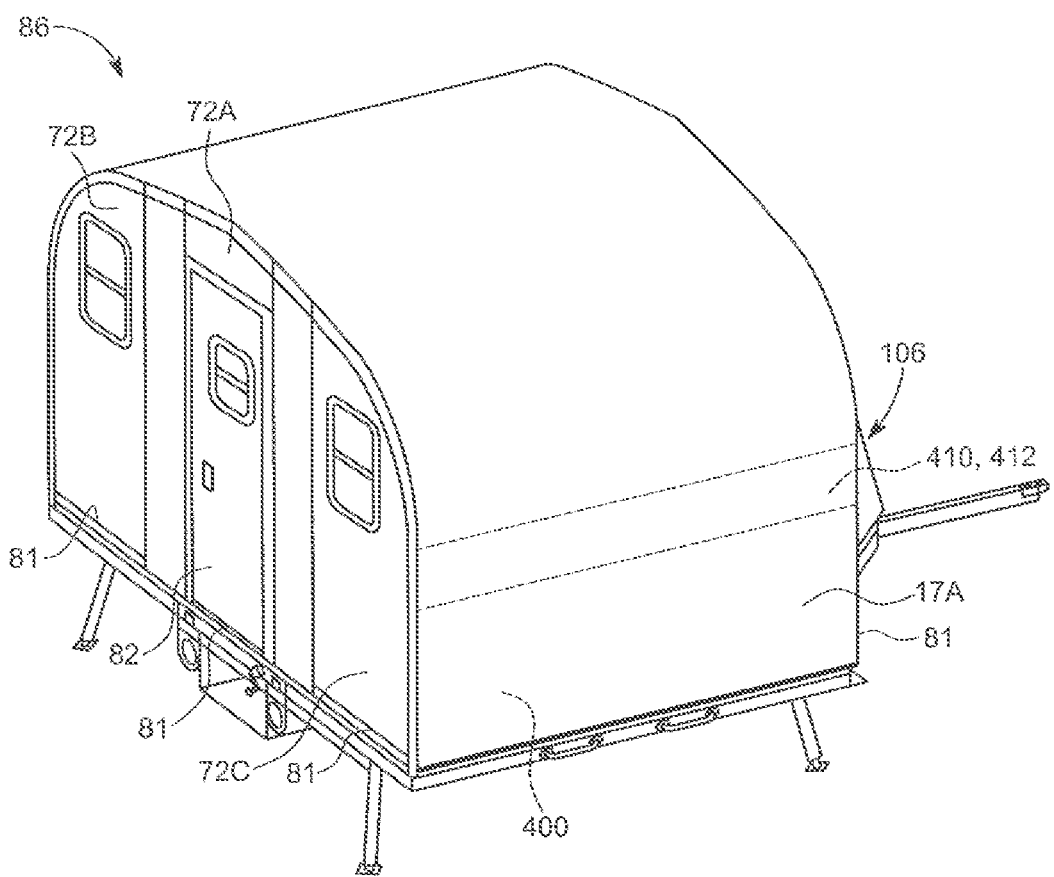
FIG. 28 is a perspective view of an enclosure.
Figure 29:
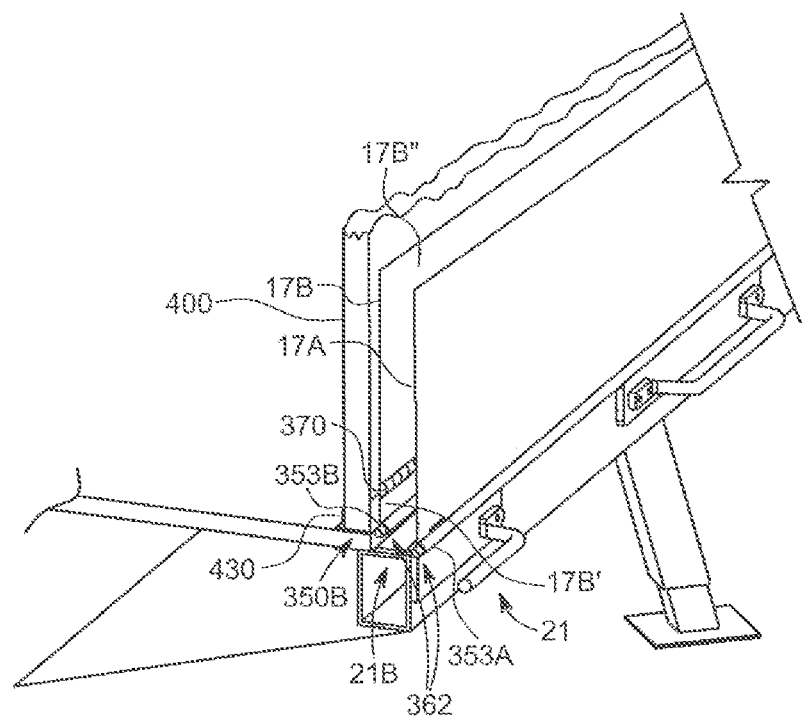
FIG. 29 is a detailed view of portion of a wall.

In an alternative embodiment illustrated in FIG. 28, the side walls 400, with or without optional portion 402 or 410 moveably secured thereto, does not form the outermost panel of the camper but rather, is hingeably joined to the primary platform 21 such that the canopy 17 remains as the outermost covering of the camper 10 along the side walls. This embodiment is advantageous in that waterproof seals between the edges of the side walls 400 and optional portions 402, 410 are not needed with respect to the wall assemblies 23 because the waterproof seal is provided by the outermost fabric 17A. FIG. 29 illustrates side wall 400 mounted to the interior of the canopy 17 with a hinge 430 allowing the side wall 400 to lay flat with respect to the primary platform 21.

Figure 30:
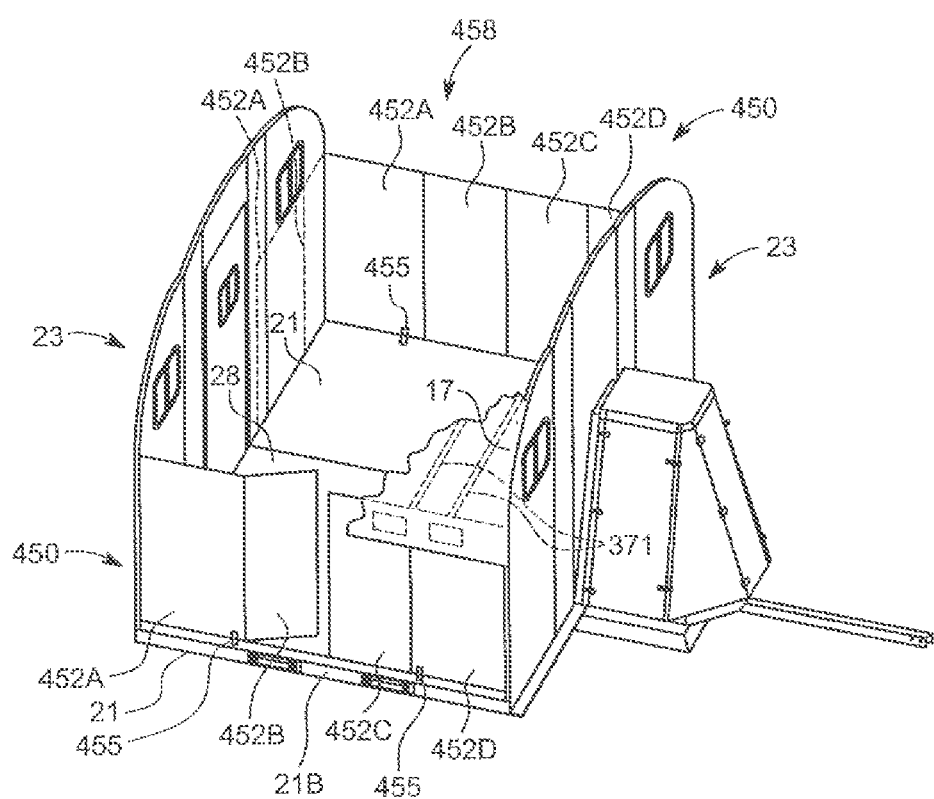
FIG. 30 is a perspective view of the enclosure with parts removed.

FIG. 30 illustrates another side wall 450 that can extend between wall assemblies 23 on each side of the camper 10. In this embodiment, side walls 450 are hinged to the wall assemblies 23 rather than to the primary platform 21. Each side wall 450 would typically include multiple portions that are hinged together. In the embodiment illustrated, four portions 452A, 452B, 452C and 452D are illustrated although this should not be considered limiting in that the number of portions typically comprise two or more portions for each side wall 450 wherein the number of portions may depend upon the length of the primary platform 21. In this embodiment, portions 452A are hinged to an outer edge of the wall assemblies 23 on each side of the camper. The portion 452A can be moved from a first position wherein it lays flat against the wall assemblies 23 as illustrated with dashed lines to a second position illustrated with solid lines wherein a lower portions of 452A aligns with the edge 21B of the primary platform 21. Since the portions 452A hinges between the first and second positions, the second position extending along the primary platform 21, and since the wall assemblies 23 hinge with respect to the stationary platform 28 and the primary platforms 21, the portion 452A can also be used to hold the wall assembly 23 in an upright position. A catch 455 is schematically illustrated. Catch 455 selectively holds portions 452A in a fixed position on the primary platform 21 such that the wall assembly 23 to which it is attached is held in an upright position.

In this embodiment, portion 452B is also connected with a hinge to rotate with respect to portion 452A. In a first position, portion 452B is illustrated with dashed lines and lays substantially parallel to portion 452A in a folded position against the wall assembly 23. Once the portion 452A has been moved into position, portion 452B can then also be rotated so as to align with primary platform 21 generally along edge 21B. In this embodiment, portions 452A and 452B form one half of the wall assembly 450. Portions 452D operate in a manner similar to portions 452A, while portions 452C operate in a manner similar to portions 452B. Thus, in this embodiment, one half of each wall assembly 450 will lay substantially flat against the rear wall assembly 23 in a folded position while the other half of side wall 450 is folded upon the other opposing or front wall assembly 23. The canopy 17 can be removeably secured to an upper edge 458 of the side wall 450, where the upper edge 458 comprises upper edges of each of the wall portions 452A-452D. Slotted channels, zippers, snaps, hook and loop fasteners can be used to secure the outer fabric 17A and optional inner fabric 17B in a manner similar to that illustrated in FIG. 27 if desired. As appreciated by those skilled in the art, separate fastening portions may be needed for each of the portions 452A-452D. In yet another embodiment, the side wall 450 can be mounted inwardly of the canopy 17 in a manner similar to that illustrated in FIG. 28 such that the canopy 17 again forms the outermost element of the camper 10.

Figure 31:
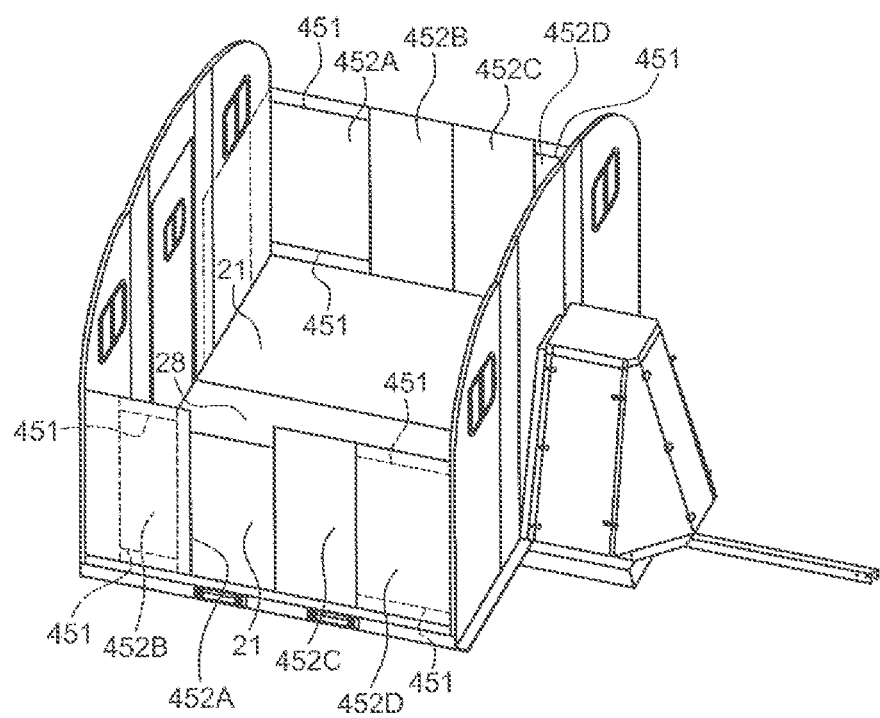
FIG. 31 is a perspective view of the enclosure with parts removed.

In FIG. 31, portions 452B and 452C slide relative to portions 452A and 452D, respectively on guides 451 schematically illustrated. If desired, some overlap may exist between portions 452A, 452B and 452C, 452D when the side wall 450 is fully extended between the wall assemblies 23.

Figure 32:
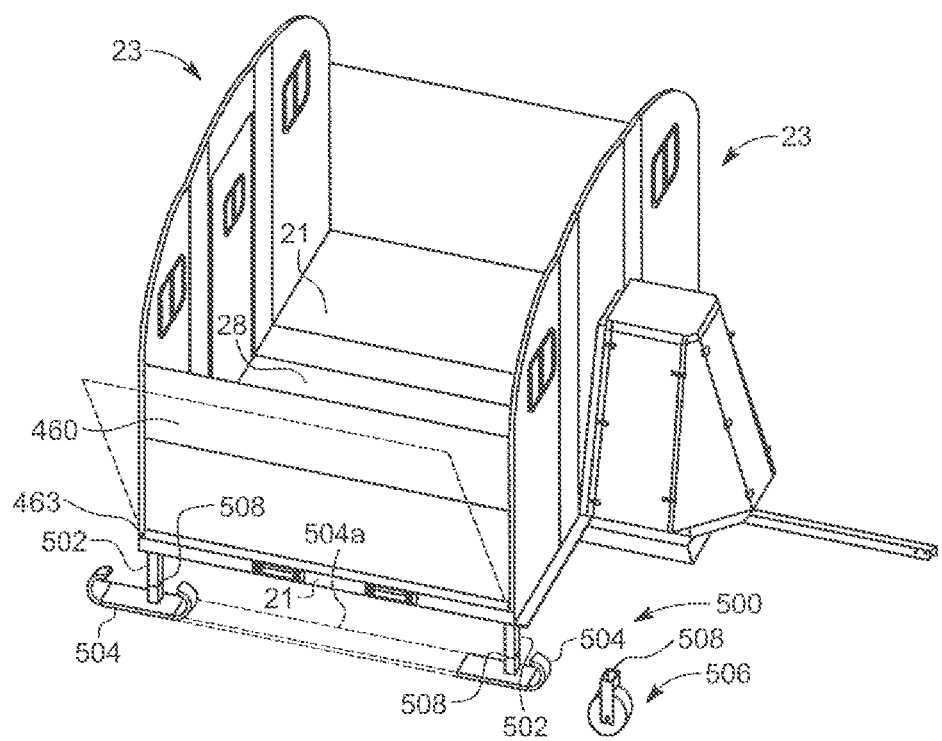
FIG. 32 is a perspective view of the enclosure with parts removed.

In yet another embodiment illustrated in FIG. 32, side walls 460 are removeably secured to edges or outer edges of the wall assembly 23. In this embodiment, side walls 460 are joined to primary platform 21 along the outer edge 21B with hinges, not shown, such that the side walls 460 hinge outwardly with respect to the wall assembly 23, as illustrated. In one embodiment, the side walls 460 are the last walls put in place when the camper 10 is in its extended position or set up. As such, each of the wall assemblies 23 are moved to the upright position and may be held in this position by the support rail 182 or other members extending between the wall assemblies 23. The side walls 460 are then rotated inwardly so as to engage the outer edges of the wall assemblies 23.

Figure 33:
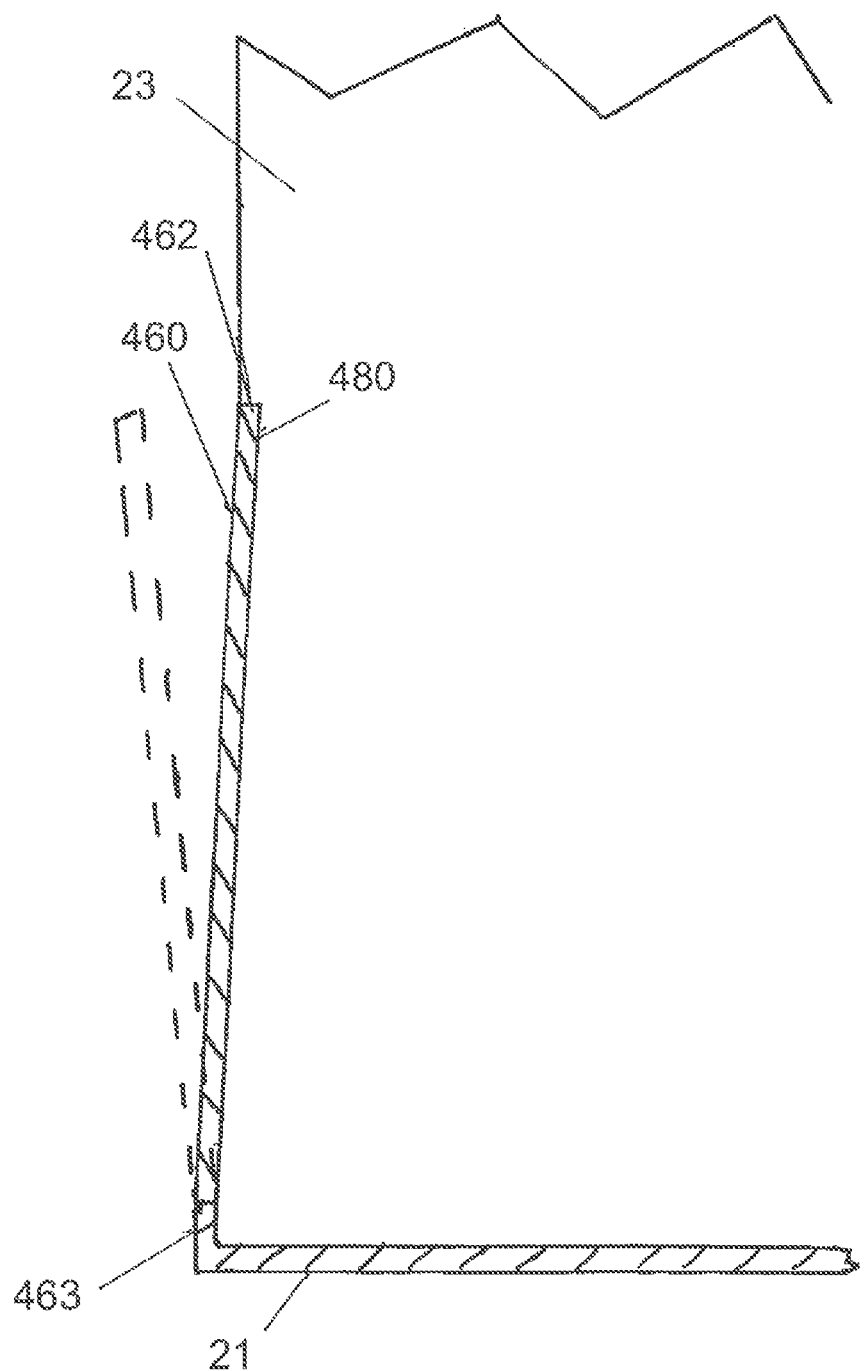
FIG. 33 is a schematic view of a wall assembly.

In this embodiment, the side walls 460 lay upon or over the wall assemblies 23 when the wall assemblies 23 are laid upon the primary platforms 21 and the stationary platform 28. In order to allow the side wall 460 to assume this position, an edge of the side wall 460 attached to the primary platform 21 can be elevated by flange 463 as illustrated also in FIG. 33 a distance so as to accommodate both of the wall assemblies 23 when laid flat. FIG. 33 also illustrates that the side wall 460 can engage a notch 480 formed in the wall assemblies 23 so that an upper edge 462 of the side wall 460 is located inwardly from the outer edge of the wall assemblies 23. In a manner similar to that above and illustrated with respect to FIG. 27, the canopy 17 can be removeably secured to upper edge 462 of the side wall 460.

Figure 34:
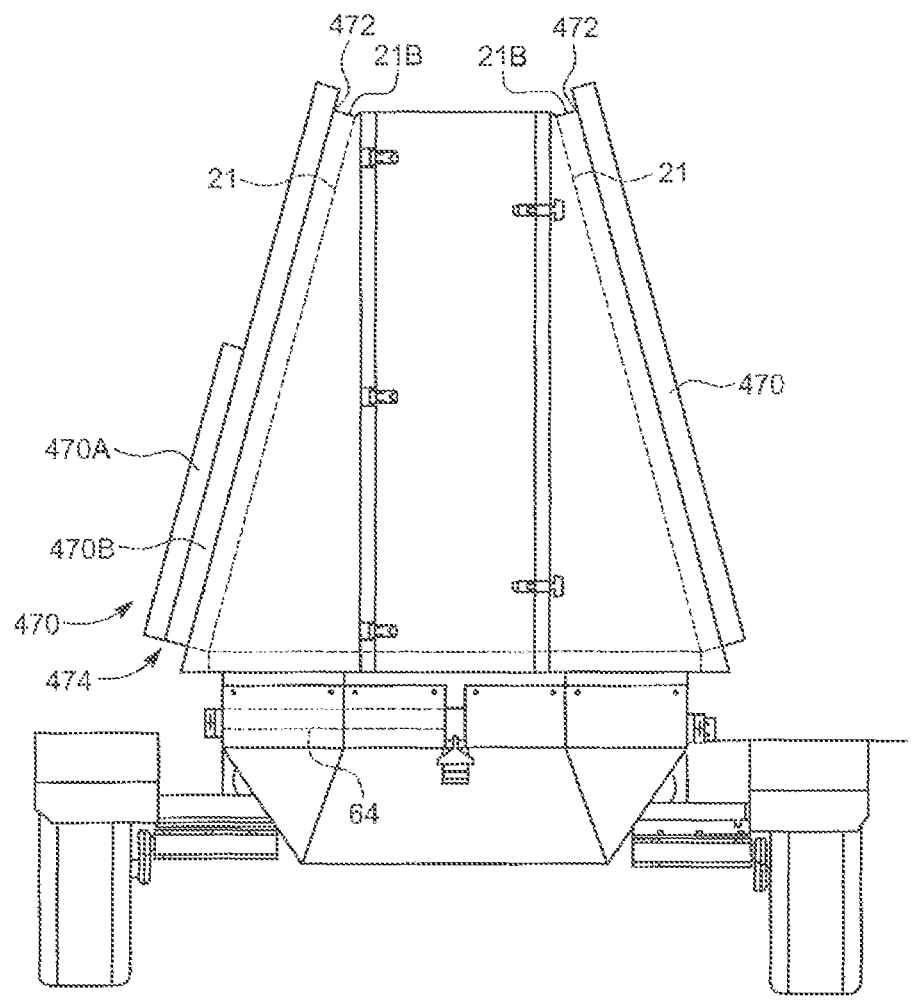
FIG. 34 is a front-elevational view of an enclosure.
Figure 35:
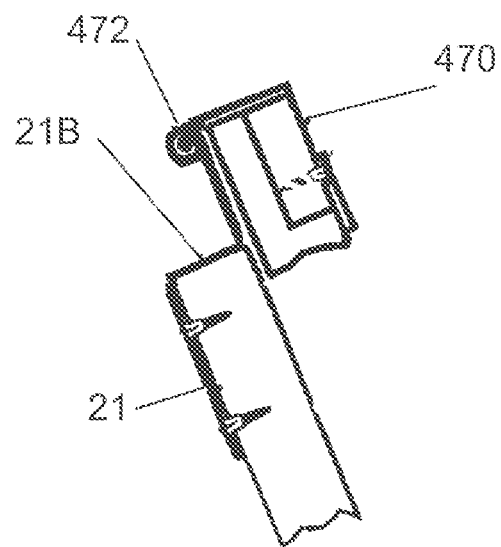
FIG. 35 is a schematic panel.
Figure 36:
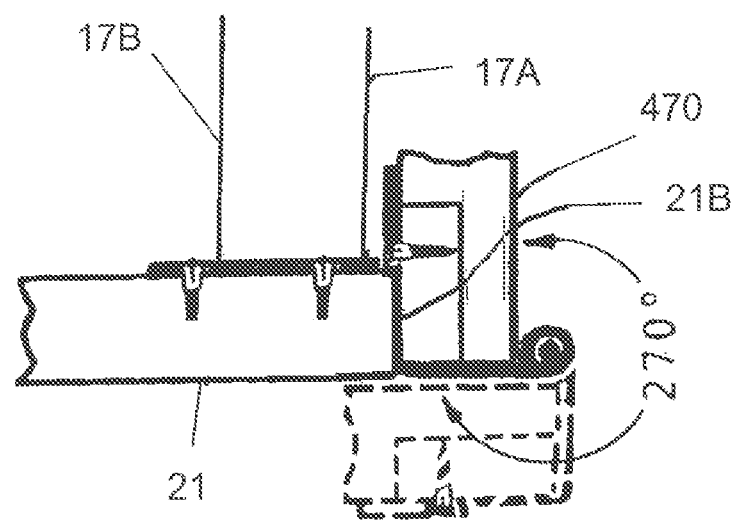
FIG. 36 is a schematic view of panels.

FIGS. 34-36 illustrate another embodiment a side wall is hinged to edge 21B of platform 21. For purposes of understanding wall 460 in FIG. 32 illustrates how the side wall is attached to wall assemblies 23 that being after the wall assemblies 23 have been erected to their unfolded positions. However, unlike wall 460 that lies lay upon or over the wall assemblies 23 when the wall assemblies 23 are laid upon the primary platforms 21 and the stationary platform 28, each wall 470 is connected to edge 21B with a 270 degree hinge 472 as illustrated in FIG. 35. FIG. 35 is an enlarged portion of the right hand platform 21 and wall 470 illustrated in FIG. 34 in a transport or storage position. FIG. 36 schematically illustrates the relationship between platform 21 and wall 470 when the wall 470 is erected in a manner similar to wall 460 in FIG. 32. Suitable fasteners such as clips, clasps, hooks and the like can secure wall 470 in position against side edges of the wall assemblies 23 when the wall 470 is secured. Referring back to FIG. 34, wall 470 can comprise a single panel as shown on the right hand side of the camper 10, or if desired, can comprise multiple panels 470A, 470B pivotally connected together with a hinge 474. In the storage or transport position the panel 470A lies upon panel 470B. In FIG. 32 panels 470A and 470B have also been illustrated.

The canopy 17 can be secured to an upper edge of the side wall 470 in a manner similar to that discussed above with respect to portion 410 illustrated in FIG. 27 or as described with respect to wall 450 in FIG. 30. However, it yet another embodiment, canopy 17 can remain attached to platform 21 along the side wall 470 as illustrated in FIG. 36 where wall 470 is to the exterior of canopy 17 (herein by way of example including layers 17A and 17B). In this manner, the seal between wall 470 and side edges of the wall assemblies need not be perfect since the inside of the camper 10 is sealed by layers 17A and/or 17B. However, it should be noted it may be desirable to include panel 17A''' as illustrated in FIG. 27 so that water and/or debris does not fall down between layer 17A and wall 470, but rather is shed to the outside surface of wall 470.

Ground Supports Configured to Move Trailer when Unfolded

FIG. 32 also illustrates another aspect of the invention that being ground supports 500 allowing movement of the camper 10 when the trailer is in the unfolded configuration. In FIG. 32 two ground supports allowing such movement of the camper 10 are illustrated, where the other side comprises similar ground supports, not shown. In one embodiment, each ground support 500 includes a vertical support 502 and a ski 504 connected thereto. The ground supports 500 are disposed preferably at each remote corner of each primary platform 21 being directly secured thereto, or in an alternative embodiment using the lateral supports 64 in the manner described above. If desired, a single ski 504A, illustrated with dashed lines, can be connected to each of the vertical supports 502 to extend along the length of the primary platform 21. If further desired, the skis 504 or 504A can be coupled to the ground supports 58, for example, in a selectively operable manner, such as where the ski 504, 504A can be removed if desired. Whether a single ski 504A or multiple skis 504 on each side of the camper 10, the skis 504A or 504 can have upturned portions on each end allowing the camper 10 to be moved either forwardly or backwardly with ease.

The ground supports 500 are advantageous when it is desired to move the camper 10 when set up rather than, at least partially, folding the camper 10 up. For example, when the camper 10 is used during ice fishing and user desires to move to a different location on the lake. Allowing the camper 10 to be moved with the primary platforms 21 unfolded can save a considerable amount of time, where the ground supports 500 can inhibit the camper 10 from tipping over. In another embodiment, each ground support 500 can be connected, for example in a removable manner, to a wheel assembly 506, one of which is illustrated. Hence, movement of the camper 10 in the unfolded configuration is not limited to use only with skis 504, 504A and/or only upon snow. In one embodiment, the wheel 506 and the skis 504 include a receiver 508 configured to receive an end of the vertical support 502, although other forms of fastening mechanisms can be used.

Inner Access Panel on Movable Floor Platform

Referring back to FIGS. 2, 4, 20 and 37, one, or in the embodiment illustrated, each primary platform 21 includes a storage cavity or bin 530 with a openable cover panel 532, herein hinged with hinges 534, but could be completely removable, if desired. Latches 536 secure the cover panel 532 when desired. The primary platforms 21 provide a floor for users when unfolded and the wall assemblies 23 have been erected. A back wall 540 (FIG. 37) of the cavity 530 functions as a portion of the floor of each primary platform 21. If desired, one or more removable portions 542 of the panel member forming the floor/back wall 540 can be provided as illustrated in FIG. 20. In a preferred embodiment, the removable portions 542 are removed from the inside of the trailer after the primary platforms 21 have been unfolded and the end wall assemblies 23 have been erected to form the enclosed, inside space of the camper 10. Removal of one or more of the portion(s) 542 provides access to each respective storage bin 530 from the inside of the trailer. Note the shape of the covers need not be circular as shown.

Removing one or more of the removable portions 542 can create an opening 544 to outdoor space below the primary platform 21 from within the camper 10 (if the cover 532 is open or removed). In one embodiment one or more of the openings 544 are of size to allow fishing from within the camper 10 when the camper 10 is deployed on ice of a body of water. The opening(s) 544 can take any convenient shape such as a polygon, circle or oval.

In view that each primary platform 21 when unfolded is elevated, it may be desirable to provide a shielded passageway 550 from or proximate the opening 544 or fishing hole in the ice to or at least proximate each opening 544 in the opening of the back wall 540 of the bin or floor of the camper 10. The passageway(s) 550 can take any convenient shape such as a polygon, circle or oval. In one embodiment, each passageway 550 is provided for a single ice hole and opening 544, but if desired the passageway 550 can be sized to accommodate more than one, for example, two or three. The passageway 550 can be formed of one or more materials such as but not limited to metal, plastic, fabric. The passageway 550 can include insulating material or constructed, for example, to create one or more open and/or closed air cavities. In another embodiment, the passageway 550 can be made of a material such as fabric that telescopes due to an inner coil wire, where a longitudinal length of the coil can vary.

If desired, passageway 550 can include an annular or partly annular end lip or flange 558 on an end that can limit insertion of the passageway 550 through the opening 544. If desired, passageway 550 can be formed from a planar sheet of rigid, but compliant material such as plastic. The planar sheet can be of size such that longitudinal edges abut or overlap. Holding devices such as latches, clips, straps or the like can be provided if desired although the opening 544 may be sufficient to retain at least one end of the passageway 550, while at an opposite end, the passageway 550 can be provided with an end that allows the passageway 550 to be inserted in ice shavings proximate the ice hole, the ice shavings retaining the edges in position so as to retain the tubular shape of the passageway 550. If formed of sheet of material, the passageway 550 uncoils to return to a planar or generally planar shape for storage.

Figure 37:
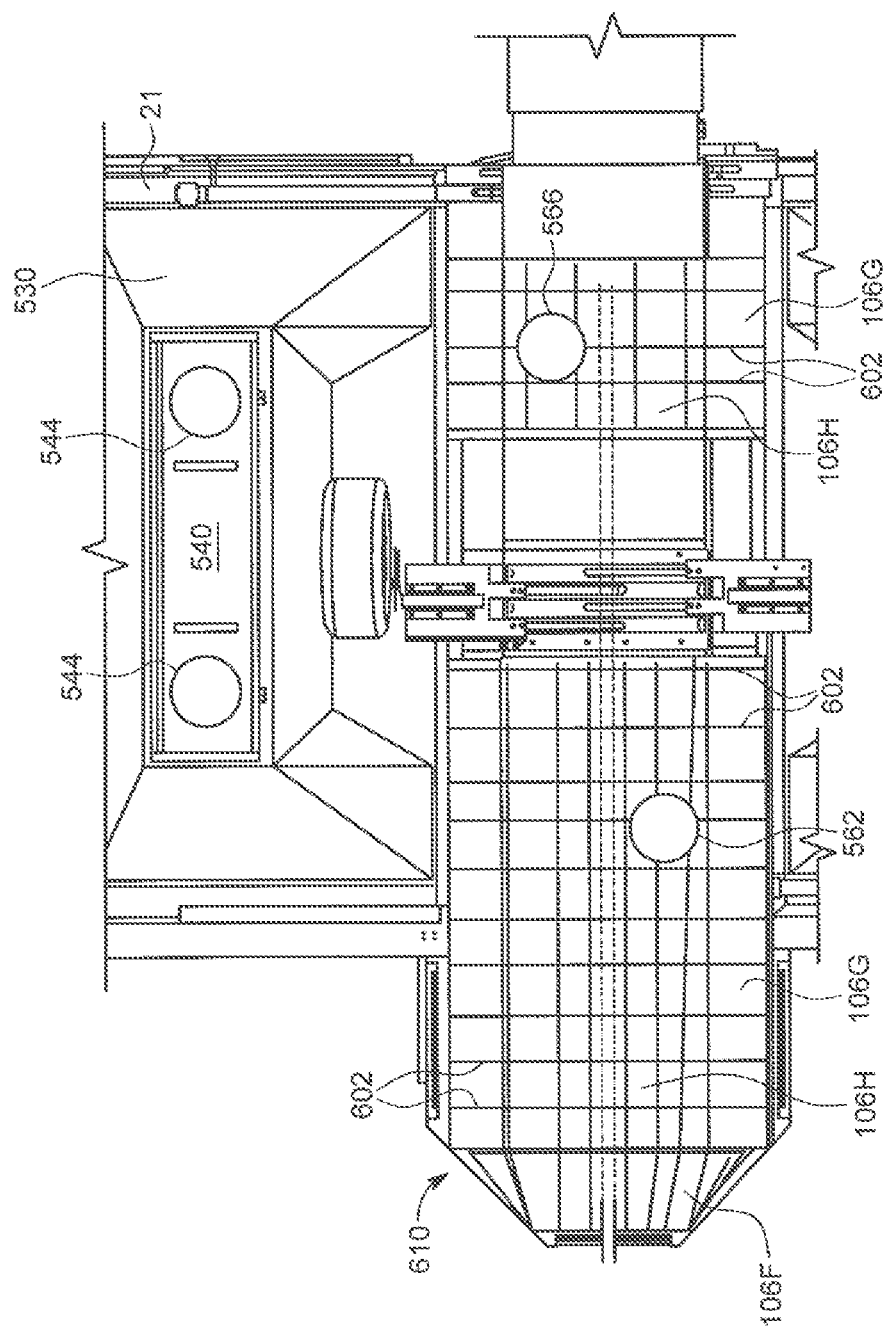
FIG. 37 is a partial bottom-plane view of the enclosure.

It should be noted location of holes in the camper 10 for purposes of ice fishing is not limited to holes through the primary platforms 21. FIG. 37 is a view of a portion of the camper 10 from below. In another embodiment, one or more openings can be located in the center of the trailer such as illustrated at 562 and 566. Each of these holes correspond to holes through lower storage compartments provided below the stationary panel 28 and accessible from within the camper through covers such as indicated at 568 and 570, respectively in FIG. 20. Like openings 544 suitable removable covers can be provided like covers 542 for openings 562 and/or 566.

Lower Body Protection Assembly

Referring back to FIGS. 4A, 7B and 37, a lower body portion 106D of the camper 10 that is below the stationary platform 28 and the storage area 106 is used for storage as desired by the user. However the panels 106F, 106G and 106H forming the lower body portion 106D are susceptible to damage from rocks and other debris that may be present particularly when the camper 10 is being pulled on an offroad trail. To provide some protection for the panels of the lower body portion 106A, a lower body protection assembly 600 can be mounted over the panels 106F, 106G and 106H of the lower body portion 106A, and in one embodiment spaced slightly apart from the panels 106F, 106G and 106H. Generally, the lower body protection assembly 600 can comprise a plurality of support members 602 along the sides panel and lower panel of the lower body portion 106D. Referring to FIG. 4A, an upper end of preferably each support 602 is mounted to the frame member supporting the stationary platform 28 since this is a rigid structure as compared to the panels of the lower body portion 106D. Suitable fasteners include threaded bolts that extend through apertures in each support member 602 and are received in threaded apertures secured to the frame member supporting the stationary platform 28. This should not be considered limiting in that other types of fasteners can be used. Each support member 602 extends downward alongside the side panels 106F or 106G of the lower body portion 106D and also alongside the lower panel 106H. Stated another way the support members 602 together form a protection cage for the lower body portion 106. The spacing between the support members 602 is selected depending on the type of debris, rocks or obstacles that protection is desired for. In one embodiment, one or more skid panels 604 (a portion of which is illustrated in FIG. 4A) can also be provided to provide yet more protection. The skid panel(s) 106K can be mounted in a replaceable so as to be replaced when damage is incurred. Likewise, if desired, the support members 602 can secured together in a replaceable manner to be replaced if desired.

Although the subject matter has been described in language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A transportable fold-out at least partial enclosure, comprising:
   a frame;
   a stationary platform supported by the frame and having a major surface defining a stationary plane, a plurality of side edges, a front edge and a back edge;
   two primary platforms, each primary platform having a major surface defining a primary plane, an inside edge, an outside edge, a front edge, a back edge, the inside edge each primary platform being joined to the stationary platform, each primary platform having a folded position in which the associated primary plane and stationary plane are oblique or orthogonal, and each primary platform having an extended position where the primary platform is unfolded from the stationary platform; and
   a side support structure removably secured to the frame when the primary platforms are in the folded position, the side support structure configured to support an article in an elevated position when the primary platforms are folded.

2. The transportable fold-out at least partial enclosure of claim 1 and further comprising an end wall assembly having two segments, each segment having a major surface defining a segment plane, side edges, a top edge and a bottom edge, the side edges of the segments being joined to each other, the bottom edges of each segment being joined to one of the stationary platform and the primary platform, the end wall assembly having an extended position in which the segment planes are at an angle to both the stationary plane and the primary plane, and the end wall assembly having a folded position.

3. The transportable fold-out at least partial enclosure of claim 1 and a set of four leveling legs removably secured to the frame, each leveling leg adjustable in length to level a portion of the at least partial enclosure when the primary platforms are in the extended position.

4. The transportable fold-out at least partial enclosure of claim 3 wherein the side support structure is configured to be removably mounted to portions of the at least partial enclosure frame that are used to mount the leveling legs on one side of the at least partial transportable enclosure.

5. The transportable fold-out at least partial enclosure of claim 4 wherein the side support structure comprises support members configured to support a bicycle.

6. The transportable fold-out at least partial enclosure of claim 4 wherein the side support structure comprises support members configured to support a paddle board.

7. The transportable fold-out at least partial enclosure of claim 4 wherein the side support structure comprises support members configured to support a plurality of containers.

8. The transportable fold-out at least partial enclosure of claim 4 wherein the frame includes a plurality of receivers on each side of the enclosure, each configured receiver configured to receive a lateral support adjustably extendable out of the receiver to provide support for the side support structure.

9. The transportable fold-out at least partial enclosure of claim 8 wherein the support structure includes members extending over a top of the at least partial enclosure when the primary platforms are in the folded position.

10. The transportable fold-out at least partial enclosure of claim 9 wherein the members comprise longitudinally extending members being parallel to inside edge, and members extending transverse to the inside edge.

11. The transportable fold-out at least partial enclosure of claim 8 and further comprising lifting cables connected at a first end to each lateral support and at a second end to a lift ring.

12. The transportable fold-out at least partial enclosure of claim 11 wherein the frame includes an elongated support with a hitch; wherein a cable is connected at a first end to the elongated support or the hitch and at a second end to the lift ring.

13. A transportable fold-out at least partial enclosure, comprising:
   a frame;
   a stationary platform supported by the frame and having a major surface defining a stationary plane, a plurality of side edges, a front edge and a back edge;
   two primary platforms, each primary platform having a major surface defining a primary plane, an inside edge, an outside edge, a front edge, a back edge, the inside edge each primary platform being joined to the stationary platform, each primary platform having a folded position in which the associated primary plane and stationary plane are oblique or orthogonal, and each primary platform having an extended position where the primary platform is unfolded from the stationary platform;
   wherein the frame includes a plurality of receivers on each side of the enclosure, each configured receiver configured to receive a lateral support adjustably extendable out of the receiver to provide support for the side support structure; and
   lifting cables connected at a first end to each lateral support and at a second end to a lift ring.

14. The transportable fold-out at least partial enclosure of claim 13 wherein the frame includes an elongated support with a hitch; wherein a cable is connected at a first end to the elongated support or the hitch and at a second end to the lift ring.

* * * * *